(12) United States Patent
Suitoh

(10) Patent No.: US 10,593,014 B2
(45) Date of Patent: Mar. 17, 2020

(54) IMAGE PROCESSING APPARATUS, IMAGE PROCESSING SYSTEM, IMAGE CAPTURING SYSTEM, IMAGE PROCESSING METHOD

(71) Applicant: Hiroshi Suitoh, Kanagawa (JP)

(72) Inventor: Hiroshi Suitoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/356,362

(22) Filed: Mar. 18, 2019

(65) Prior Publication Data

US 2019/0295216 A1    Sep. 26, 2019

(30) Foreign Application Priority Data

Mar. 26, 2018 (JP) ................... 2018-058883
Mar. 12, 2019 (JP) ................... 2019-044537

(51) Int. Cl.
*G06T 3/00* (2006.01)
*H04N 5/232* (2006.01)
(Continued)

(52) U.S. Cl.
CPC ............ *G06T 3/0087* (2013.01); *G06T 5/006* (2013.01); *G06T 5/009* (2013.01); *G06T 11/60* (2013.01);
(Continued)

(58) Field of Classification Search
None
See application file for complete search history.

(56) References Cited

U.S. PATENT DOCUMENTS 5,990,941 A * 11/1999 Jackson ................ G06T 3/0062
348/207.99
6,002,430 A * 12/1999 McCall .............. H04N 5/23238
348/143
(Continued)

FOREIGN PATENT DOCUMENTS

JP          2016-096487       5/2016
JP          2018-109946       7/2018
WO      WO2012/166293 A1    12/2012

*Primary Examiner* — Jefferey F Harold
*Assistant Examiner* — Mustafizur Rahman
(74) *Attorney, Agent, or Firm* — Oblon, McClelland, Maier & Neustadt, L.L.P.

(57) ABSTRACT

An information processing apparatus calculates a first corresponding area in a first image in first projection, corresponding to a second image in second projection, through first homography transformation; transforms a projection of a peripheral area including the first corresponding area to generate a peripheral area image; calculate a second corresponding area in the peripheral area image through second homography transformation; calculate a third corresponding area in the second image, corresponding to a third image in the second projection, through third homography transformation; reversely transform a projection of the second corresponding area to generate first location information based on a first specific corresponding area in the first image; calculate a fourth corresponding area in the peripheral area image through the second homography transformation; and reversely transform a projection of the fourth corresponding area to generate second location information based on a second specific corresponding area in the first image.

14 Claims, 41 Drawing Sheets

(51) Int. Cl.
  *G06T 11/60* (2006.01)
  *G06T 5/00* (2006.01)
(52) U.S. Cl.
  CPC ............ *H04N 5/23238* (2013.01); *G06T 2207/10024* (2013.01); *G06T 2207/20208* (2013.01)

(56) References Cited

U.S. PATENT DOCUMENTS

| | | | | |
|---|---|---|---|---|
| 6,426,774 | B1* | 7/2002 | Driscoll, Jr. | G02B 13/06 348/335 |
| 7,382,399 | B1* | 6/2008 | McCall | H04N 5/2254 348/207.99 |
| 8,345,144 | B1* | 1/2013 | Georgiev | G03B 11/00 348/335 |
| 10,165,181 | B2* | 12/2018 | Ono | G02B 13/0065 |
| 2008/0002041 | A1* | 1/2008 | Chuang | H04N 9/3185 348/241 |
| 2009/0041379 | A1* | 2/2009 | Shih | G06K 9/32 382/276 |
| 2012/0098926 | A1* | 4/2012 | Kweon | G06T 1/00 348/36 |
| 2016/0035110 | A1* | 2/2016 | Kiyota | B60R 1/00 348/148 |
| 2016/0323504 | A1* | 11/2016 | Ono | H04N 5/2259 |
| 2016/0328854 | A1* | 11/2016 | Kimura | G01C 3/08 |
| 2016/0346693 | A1* | 12/2016 | Minato | G03B 21/14 |
| 2017/0023492 | A1* | 1/2017 | Olsson | G01N 21/954 |
| 2017/0104929 | A1* | 4/2017 | Ono | G02B 13/00 |
| 2018/0126903 | A1* | 5/2018 | Herrmann | G06T 3/0018 |
| 2018/0176465 | A1* | 6/2018 | Chen | G06T 3/4038 |
| 2018/0181358 | A1 | 6/2018 | Asai et al. | |
| 2018/0182065 | A1 | 6/2018 | Yoshida et al. | |
| 2018/0184001 | A1 | 6/2018 | Yoshida et al. | |
| 2018/0270417 | A1 | 9/2018 | Suitoh et al. | |
| 2018/0329927 | A1* | 11/2018 | Garg | G06T 3/0012 |
| 2018/0343388 | A1* | 11/2018 | Matsushita | H04N 5/23238 |
| 2019/0001887 | A1* | 1/2019 | Guerreiro | G06T 3/0018 |
| 2019/0007609 | A1* | 1/2019 | Isobe | G06F 3/0488 |
| 2019/0045122 | A1* | 2/2019 | Chiaki | G06T 1/20 |
| 2019/0202356 | A1* | 7/2019 | Cano | H04N 5/272 |
| 2019/0266423 | A1* | 8/2019 | Akiba | G06K 9/00818 |

* cited by examiner

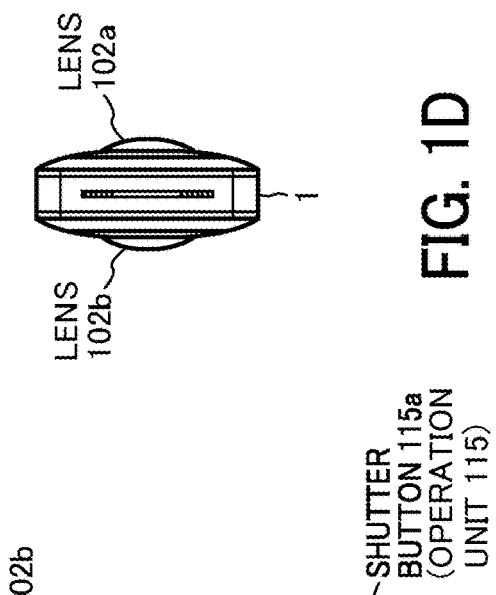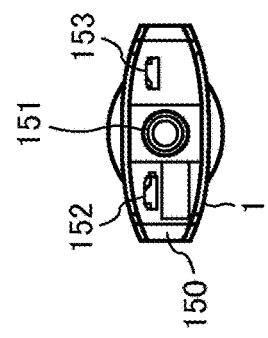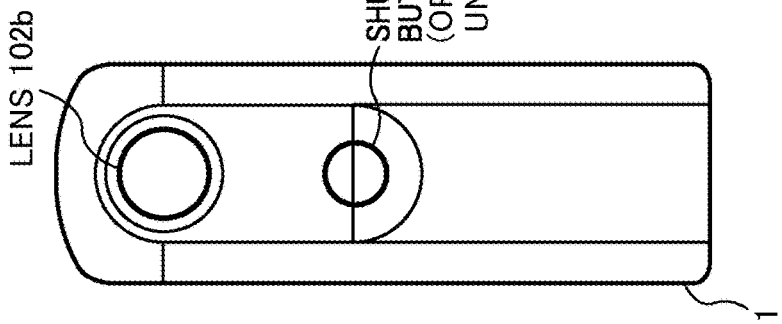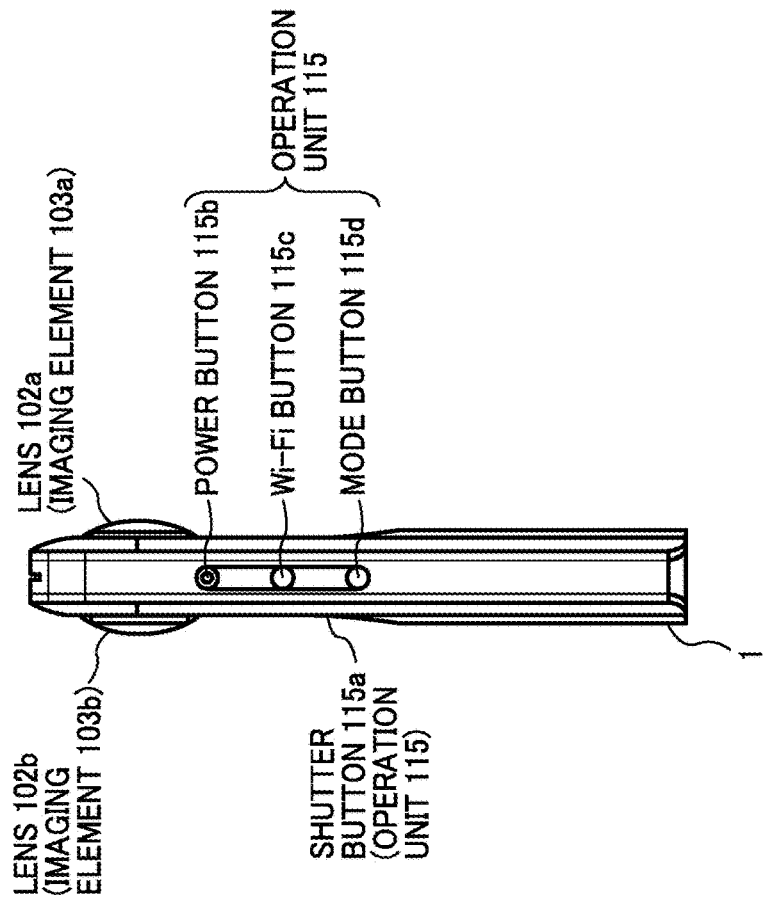

HEMISPHERICAL IMAGE (FRONT)

HEMISPHERICAL IMAGE (BACK)

CAPTURED IMAGE (EQUIRECTANGULAR PROJECTION IMAGE EC)

| LINKING INFORMATION | IP ADDRESS | DEVICE NAME |
|---|---|---|
| MAIN | 1.2.3.4 | k1-camera1 |
| SUB 1 | 1.2.3.5 | theta-camera1 |
| — | 1.2.3.6 | theta-camera2 |
| ⋮ | ⋮ | ⋮ |

FIG. 17

| | | | |
|---|---|---|---|
| PARENT IMAGE INFORMATION | | ID | FILE NAME, UUID, URI | /IMAGE001.JPG |
| | | PROJECTION METHOD | PROJECTION TYPE | EQUIRECTANGULAR PROJECTION |
| TARGET IMAGE ID INFORMATION | | ID | FILE NAME, UUID, URI | /IMAGE111.JPG |
| | | PROJECTION METHOD | PROJECTION TYPE | PERSPECTIVE PROJECTION |
| SUPERIMPOSED LOCATION CALCULATION INFORMATION | SUPERIMPOSED LOCATION CALCULATION IMAGE INFORMATION | PARENT IMAGE INFORMATION | IMAGE SIZE | (500, 500) |
| | | TARGET IMAGE INFORMATION | GENERATION INFORMATION WHEN IMAGE IS EQUIRECTANGULAR PROJECTION IMAGE | POINT OF GAZE (DEGREE) | (30, 100) |
| | | | | ANGLE OF VIEW (DEGREE) | 50 |
| | | | | POSITIONING CORRECTION (DEGREE) (Pitch, Yaw, Roll) | (0, 0, 0) |
| | SUPERIMPOSED LOCATION TRANSFORMATION INFORMATION | | IMAGE SIZE | (900, 600) |
| | | | TRANSFORMATION MATRIX | $\begin{pmatrix} m11 & m12 & m13 \\ m21 & m22 & m23 \\ m31 & m32 & m33 \end{pmatrix}$ |
| METADATA GENERATION INFORMATION | | | VERSION INFORMATION | 0, 1, 1 |

FIG. 18

| | | | | |
|---|---|---|---|---|
| PARENT IMAGE INFORMATION | | ID | UUID, URI FILE NAME, UUID, URI | /IMAGE001.JPG |
| | | PROJECTION METHOD | PROJECTION TYPE | EQUIRECTANGULAR PROJECTION |
| TARGET IMAGE ID INFORMATION | | ID | UUID, URI FILE NAME, UUID, URI | /IMAGE112.JPG |
| | | PROJECTION METHOD | PROJECTION TYPE | PERSPECTIVE PROJECTION |
| SUPERIMPOSED LOCATION CALCULATION INFORMATION | SUPERIMPOSED LOCATION CALCULATION IMAGE INFORMATION | PARENT IMAGE INFORMATION | IMAGE SIZE | (900, 600) |
| | | | GENERATION INFORMATION WHEN IMAGE IS EQUIRECTANGULAR PROJECTION IMAGE | POINT OF GAZE (DEGREE) | Null |
| | | | | ANGLE OF VIEW (DEGREE) | Null |
| | | | | POSITIONING CORRECTION (DEGREE) (Pitch, Yaw, Roll) | Null |
| | | TARGET IMAGE INFORMATION | IMAGE SIZE | (400, 300) |
| | SUPERIMPOSED LOCATION TRANSFORMATION INFORMATION | | TRANSFORMATION MATRIX | $\begin{pmatrix} m11 & m12 & m13 \\ m21 & m22 & m23 \\ m31 & m32 & m33 \end{pmatrix}$ |
| METADATA GENERATION INFORMATION | | | VERSION INFORMATION | 0.1.1 |

FIG. 19

| | | IMAGE ID | /IMAGE111.JPG |
|---|---|---|---|
| PLANAR IMAGE INFORMATION | ATTRIBUTE DATA | 35 mm EQUIVALENT FOCAL LENGTH | 28 |
| SUPERIMPOSED DISPLAY INFORMATION | AREA DIVISION NUMBER INFORMATION | HORIZONTAL (LONGITUDE) DIVISION NUMBER | 30 |
| | | VERTICAL (LATITUDE) DIVISION NUMBER | 20 |
| | COORDINATE OF GRID IN GRID AREA (LOCATION PARAMETER) | | $(LO'_{00,00}, LA'_{00,00}), (LO'_{01,00}, LA'_{01,00}), \cdots,$ $(LO'_{30,20}, LA'_{30,20})$ |
| | CORRECTION VALUE OF BRIGHTNESS AND COLOR (CORRECTION PARAMETER) | | $(R_{00,00}, G_{00,00}, B_{00,00}), (R_{01,00}, G_{01,00}, B_{01,00}), \cdots,$ $(R_{30,20}, G_{30,20}, B_{30,20})$ |

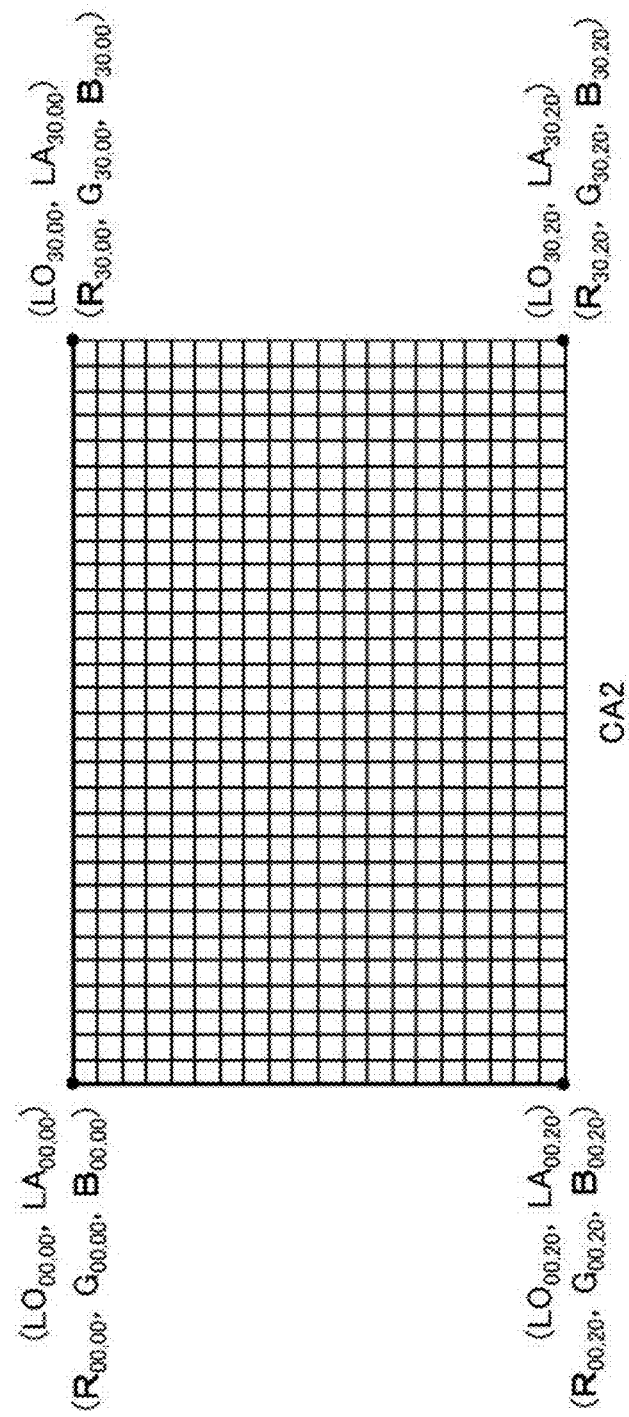

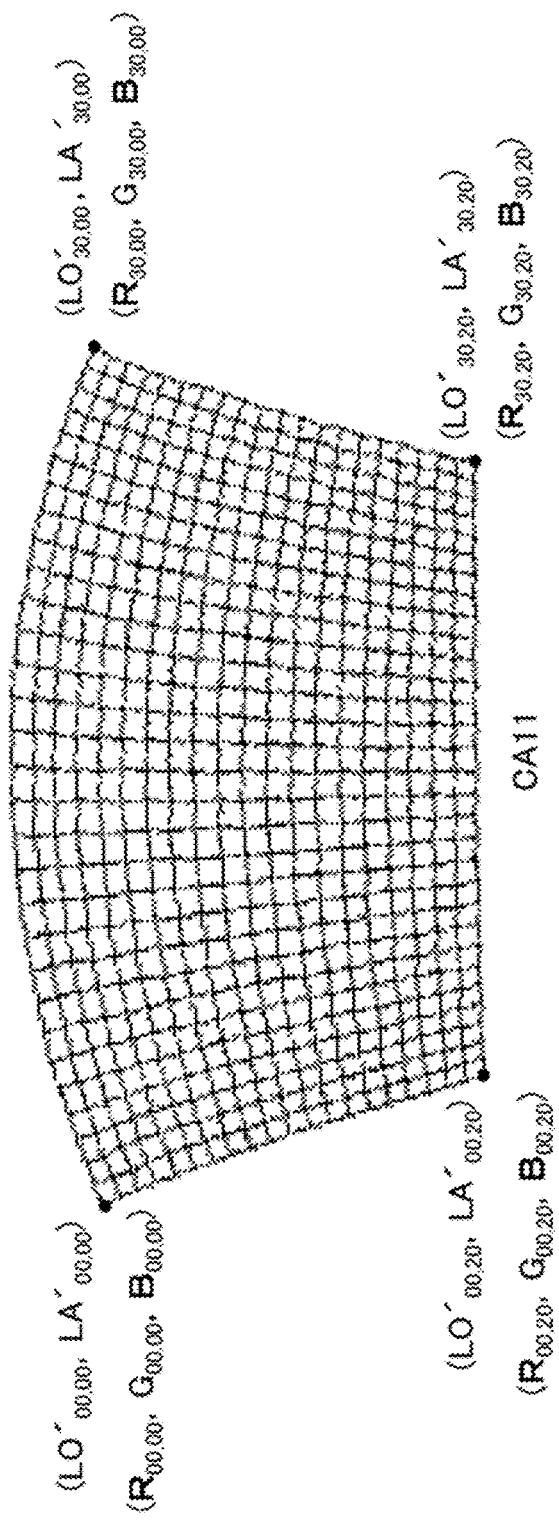

PLANAR IMAGE PA

PERIPHERAL AREA IMAGE PI

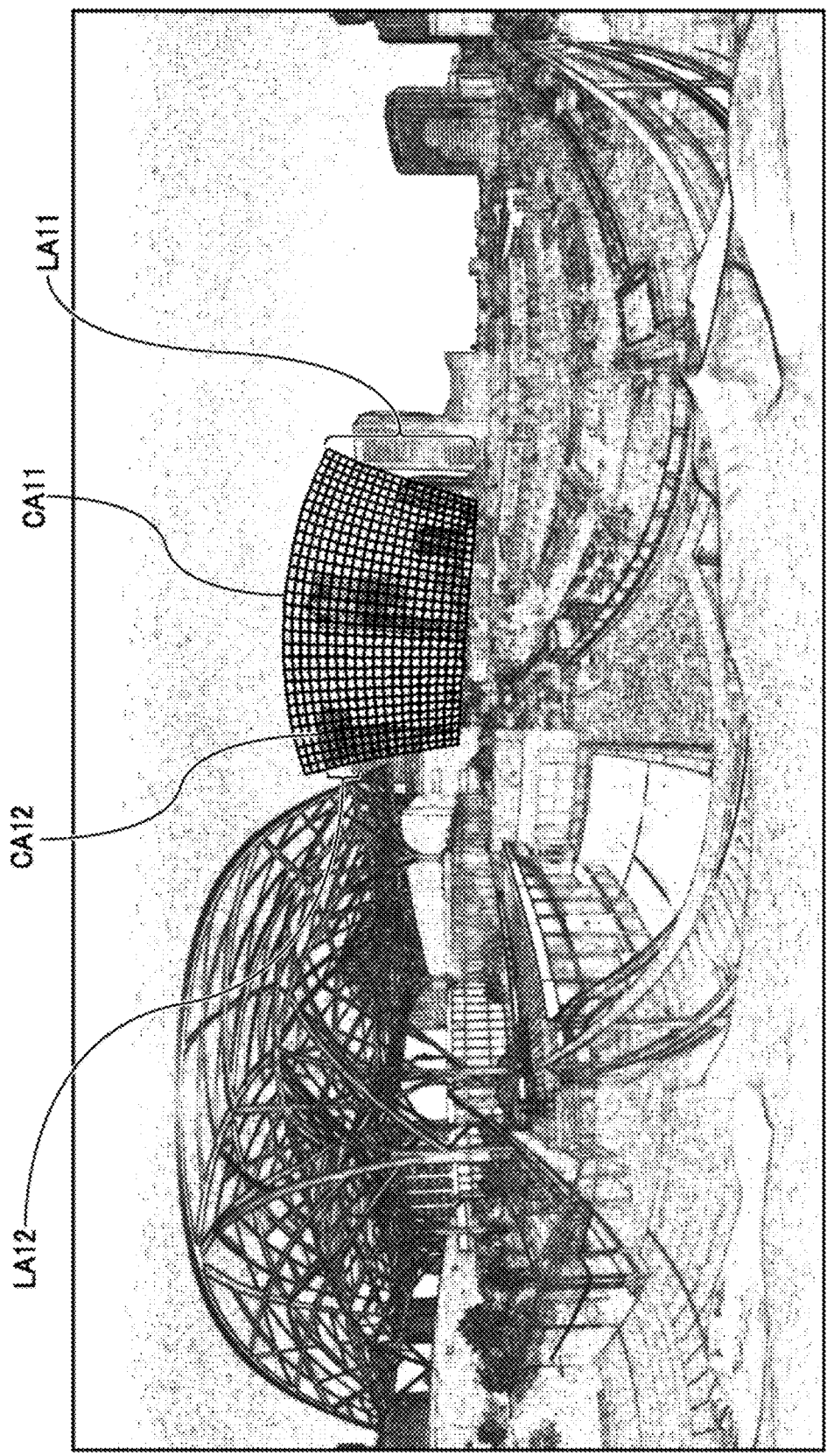

CA2 (CA4)

LA2 (LA4)
(S220-1)

CA2´(CA4´)

LA2´(LA4´)
(S240-1)

PLANAR IMAGE PA (PB)

LAA (LAB)
(S250-1)

FIG. 27A

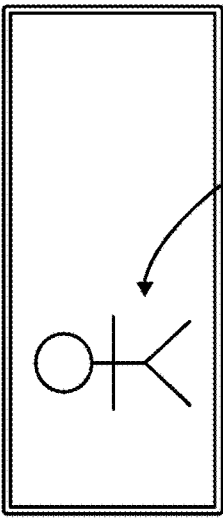
BACKGROUND IMAGE X (EQUIRECTANGULAR PROJECTION IMAGE EC)

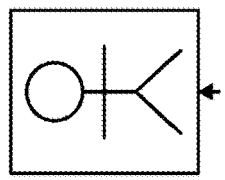
FOREGROUND IMAGE A (PLANAR IMAGE PA)

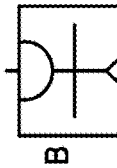
FOREGROUND IMAGE B (PLANAR IMAGE PB)

FOREGROUND IMAGE C (PLANAR IMAGE PC)

CALCULATE SUPERIMPOSED LOCATION 1
CALCULATE SUPERIMPOSED LOCATION 2
CALCULATE SUPERIMPOSED LOCATION 3

FIG. 27B

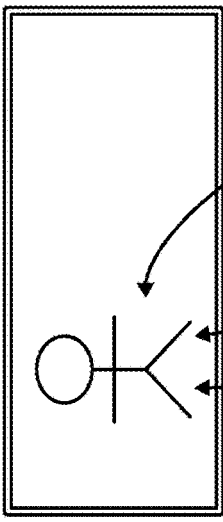
BACKGROUND IMAGE X (EQUIRECTANGULAR PROJECTION IMAGE EC)

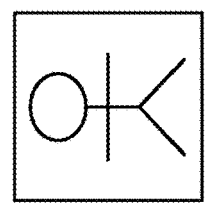
FOREGROUND IMAGE A (PLANAR IMAGE PA)

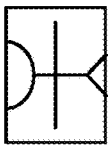
FOREGROUND IMAGE B (PLANAR IMAGE PB)

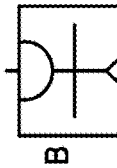
FOREGROUND IMAGE C (PLANAR IMAGE PC)

CALCULATE SUPERIMPOSED LOCATION 1
CALCULATE SUPERIMPOSED LOCATION 2
CALCULATE SUPERIMPOSED LOCATION 3

SPHERICAL IMAGE CE

SPHERICAL IMAGE CE

IMAGE PROCESSING APPARATUS, IMAGE PROCESSING SYSTEM, IMAGE CAPTURING SYSTEM, IMAGE PROCESSING METHOD

CROSS-REFERENCE TO RELATED APPLICATIONS

This patent application is based on and claims priority pursuant to 35 U.S.C. § 119(a) to Japanese Patent Application No. 2018-058883, filed on Mar. 26, 2018, and 2019-044537, filed on Mar. 12, 2019, in the Japan Patent Office, the entire disclosure of which is hereby incorporated by reference herein.

BACKGROUND

Technical Field

The present invention relates to an image processing apparatus, an image processing system, an image capturing system, and an image processing method.

Description of the Related Art

The wide-angle image, taken with a wide-angle lens, is useful in capturing such as landscape, as the image tends to cover large areas. For example, there is an image capturing system, which captures a wide-angle image of a target object and its surroundings, and an enlarged image of the target object. The wide-angle image is combined with the enlarged image such that, even when a part of the wide-angle image showing the target object is enlarged, that part embedded with the enlarged image is displayed in high resolution.

SUMMARY

Example embodiments of the present invention include an information processing apparatus including processing circuitry to: obtain a first image in first projection, a second image in second projection, and a third image in the second projection that is the same as the projection of the second image; calculate a first corresponding area in the first image, which corresponds to the second image, through first homography transformation, based on similarity between a plurality of feature points in the first image, and a plurality of features points in the second image; transform a projection of a peripheral area including the first corresponding area from the first projection to the second projection, to generate a peripheral area image; calculate a second corresponding area in the peripheral area image, which corresponds to the second image, through second homography transformation, based on similarity between a plurality of feature points in the second image, and a plurality of feature points in the peripheral area image; calculate a third corresponding area in the second image, which corresponds to the third image, through third homography transformation, based on similarity between a plurality of feature points in the second image, and a plurality of feature points in the third image; reversely transform a projection of the second corresponding area, from the second projection to the first projection, to generate first location information based on a first specific corresponding area in the first image, which corresponds to the second corresponding area; calculate a fourth corresponding area in the peripheral area image, which corresponds to the third image, through the second homography transformation; and reversely transform a projection of the fourth corresponding area, from the second projection to the first projection, to generate second location information based on a second specific corresponding area in the first image, which corresponds to the fourth corresponding area.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 1A, 1B, 1C, and 1D (FIG. 1) are a left side view, a rear view, a plan view, and a bottom side view of a special image capturing device, according to an embodiment;

FIG. 17 is an illustration of a data structure of a superimposition relationship metadata for a target image, when a parent image of the target image is a spherical image, and the target image is a planar image, according to the first embodiment;

FIG. 18 is an illustration of a data structure of a superimposition relationship metadata for a target image, when a parent image of the target image is a planar image, and the target image is a planar image, according to the first embodiment;

FIG. 19 is an illustration of a data structure of superimposed display data, according to the first embodiment;

FIGS. 20A and 20B are conceptual diagrams respectively illustrating a plurality of grid areas in a second corresponding area, and a plurality of grid areas in a first specific corresponding area, according to the first embodiment;

FIG. 25 is a conceptual diagram for explaining determination of the first and second specific corresponding areas in the equirectangular projection image, according to the first embodiment;

FIG. 27A is a conceptual diagram illustrating correspondence between a foreground image and a background image according to a comparative example;

FIG. 27B is a conceptual diagram illustrating correspondence between foreground images, according to an embodiment;

Figure 2:
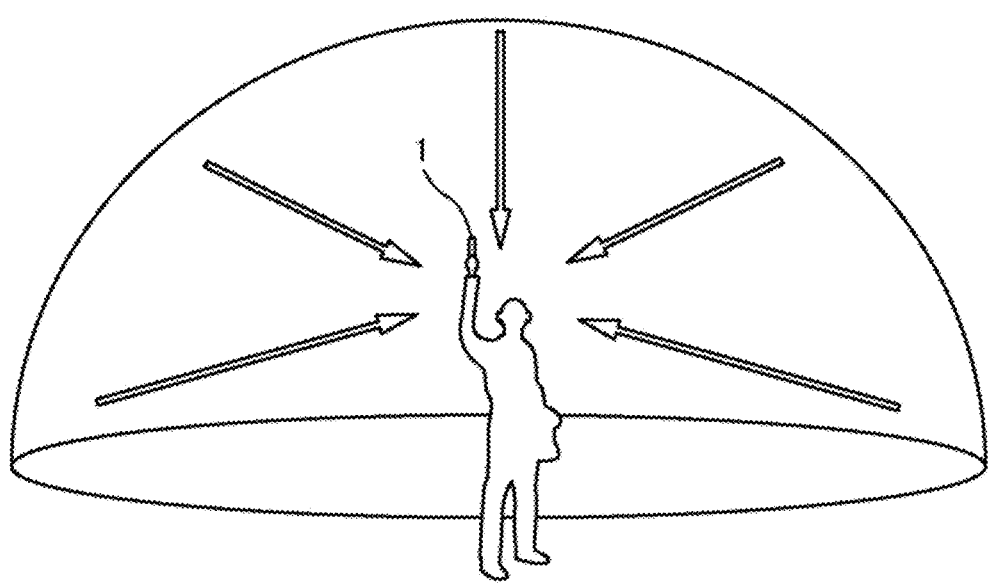
FIG. 2 is an illustration for explaining how a user uses the image capturing device, according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In this disclosure, a first image is an image superimposed with a second image and a third image. In one example, the first image and the second image are different in image type, and the second image and the third image are the same in image type. In one example, the second (or third) image is an image with image quality higher than that of the first image, for example, in terms of image resolution. For instance, the first image may be a low-definition image, and the second (or third) image may be a high-definition image. In another example, the first image and the second (or third) image are images expressed in different projections (projective spaces). Examples of the first image in a first projection include an equirectangular projection image, such as a spherical image. Examples of the second (or third) image in a second projection include a perspective projection image, such as a planar image. In this disclosure, the second (or third) image, such as the planar image captured with the generic image capturing device, is treated as one example of the second (or third) image in the second projection (that is, in the second projective space). The first image and the second (or third) image, if desired, can be image data which have been captured through different lenses, or using different image sensors, or at different times.

Further, any number of third images may be superimposed on the second image, which is superimposed on the first image.

Further, in this disclosure, the spherical image does not have to be the full-view spherical image. For example, the spherical image may be the wide-angle view image having an angle of about 180 to 360 degrees in the horizontal direction. As described below, it is desirable that the spherical image is image data having at least a part that is not entirely displayed in the predetermined area T.

Referring to the drawings, embodiments of the present invention are described below.

First, referring to FIGS. 1 to 7, operation of generating a spherical image is described according to an embodiment.

First, referring to FIGS. 1A to 1D, an external view of a special-purpose (special) image capturing device 1, is described according to the embodiment. The special image capturing device 1 is a digital camera for capturing images from which a 360-degree spherical image is generated. FIGS. 1A to 1D are respectively a left side view, a rear view, a plan view, and a bottom view of the special image capturing device 1.

As illustrated in FIGS. 1A to 1D, the special image capturing device 1 has an upper part, which is provided with a fish-eye lens 102a on a front side (anterior side) thereof, and a fish-eye lens 102b on a back side (rear side) thereof. The special image capturing device 1 includes imaging elements (imaging sensors) 103a and 103b in its inside. The imaging elements 103a and 103b respectively capture images of an object or surroundings via the lenses 102a and 102b, to each obtain a hemispherical image (the image with an angle of view of 180 degrees or greater). As illustrated in FIG. 1B, the special image capturing device 1 further includes a shutter button 115a on a rear side of the special image capturing device 1, which is opposite of the front side of the special image capturing device 1. As illustrated in FIG. 1A, the left side of the special image capturing device 1 is provided with a power button 115b, a Wireless Fidelity (Wi-Fi) button 115c, and an image capturing mode button 115d. Any one of the power button 115b and the Wi-Fi button 115c switches between ON and OFF, according to selection (pressing) by the user. The image capturing mode button 115d switches between a still-image capturing mode and a moving image capturing mode, according to selection (pressing) by the user. The shutter button 115a, power button 115b, Wi-Fi button 115c, and image capturing mode button 115d are a part of an operation unit 115. The operation unit 115 is any section that receives a user instruction, and is not limited to the above-described buttons or switches.

As illustrated in FIG. 1D, the special image capturing device 1 is provided with a tripod mount hole 151 at a center of its bottom face 150. The tripod mount hole 151 receives a screw of a tripod, when the special image capturing device 1 is mounted on the tripod. In this embodiment, the tripod mount hole 151 is where the generic image capturing device 3 is attached via an adapter 9, described later referring to FIG. 9. The bottom face 150 of the special image capturing device 1 further includes a Micro Universal Serial Bus (Micro USB) terminal 152, on its left side. The bottom face 150 further includes a High-Definition Multimedia Interface (HDMI, Registered Trademark) terminal 153, on its right side.

Next, referring to FIG. 2, a description is given of a situation where the special image capturing device 1 is used. FIG. 2 illustrates an example of how the user uses the special image capturing device 1. As illustrated in FIG. 2, for example, the special image capturing device 1 is used for capturing objects surrounding the user who is holding the special image capturing device 1 in his or her hand. The imaging elements 103a and 103b illustrated in FIGS. 1A to 1D capture the objects surrounding the user to obtain two hemispherical images.

Figure 3A:
FIGS. 3A, 3B, and 3C are views illustrating a front side of a hemispherical image, a back side of the hemispherical image, and an image in equirectangular projection, respectively, captured by the image capturing device, according to an embodiment.
Figure 3B:
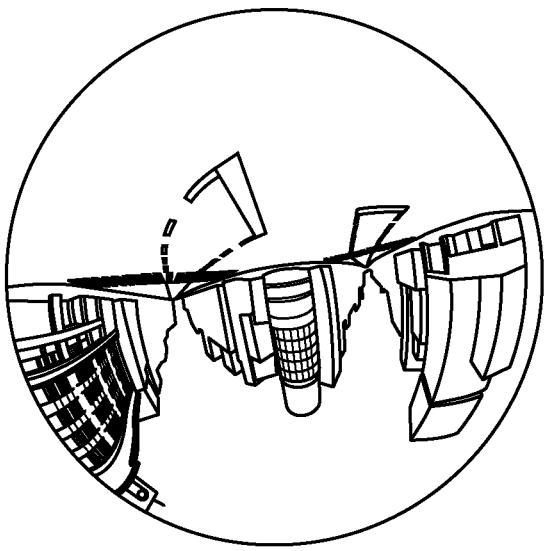
Figure 3C:
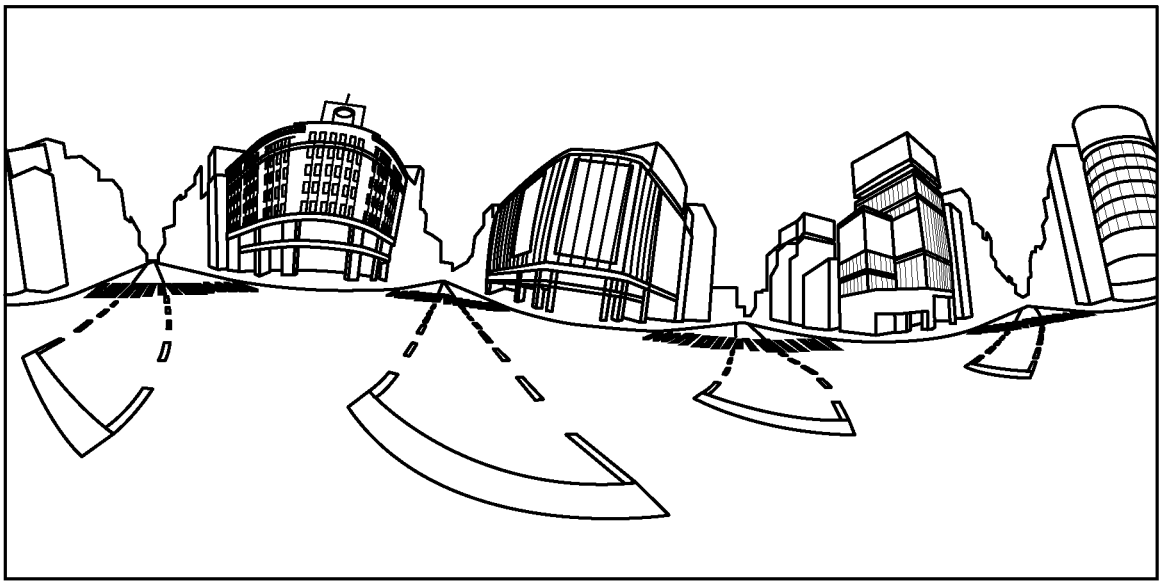
Figure 4B:
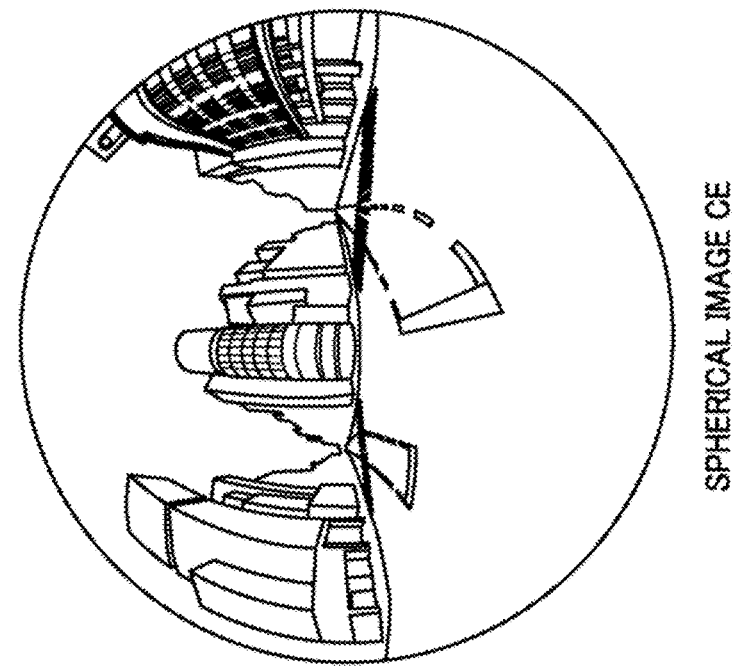
FIG. 4A and FIG. 4B are views respectively illustrating the image in equirectangular projection covering a surface of a sphere, and a spherical image, according to an embodiment.
Figure 4A:
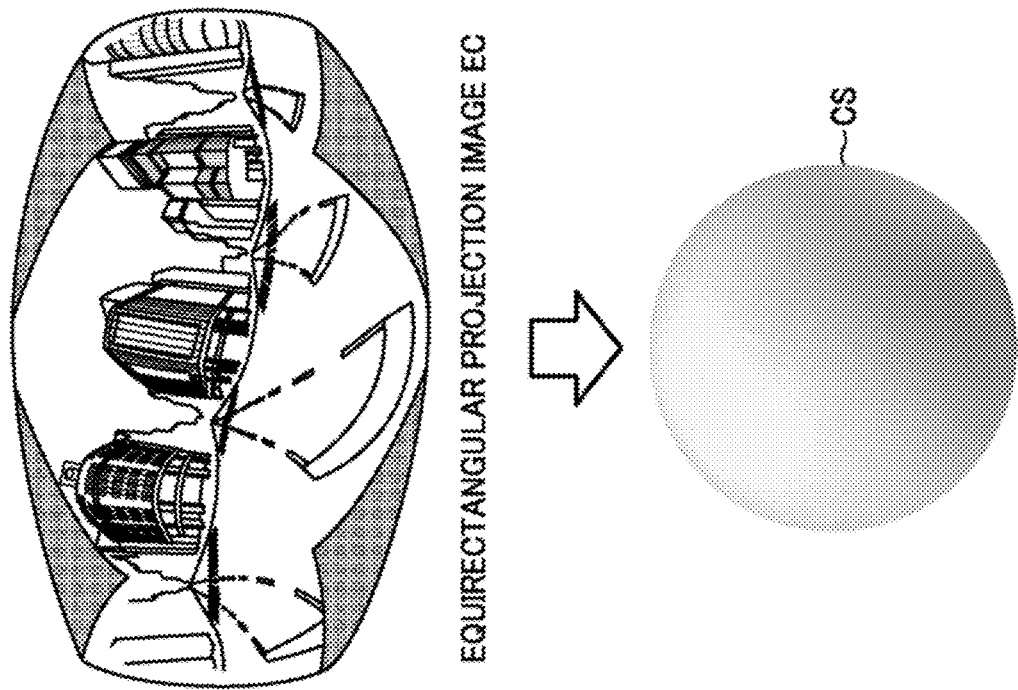

Next, referring to FIGS. 3A to 3C and FIGS. 4A and 4B, a description is given of an overview of an operation of generating an equirectangular projection image EC and a spherical image CE from the images captured by the special image capturing device 1. FIG. 3A is a view illustrating a hemispherical image (front side) captured by the special image capturing device 1. FIG. 3B is a view illustrating a hemispherical image (back side) captured by the special image capturing device 1. FIG. 3C is a view illustrating an image in equirectangular projection, which is referred to as an "equirectangular projection image" (or equidistant cylindrical projection image) EC. FIG. 4A is a conceptual diagram illustrating an example of how the equirectangular projection image maps to a surface of a sphere. FIG. 4B is a view illustrating the spherical image.

As illustrated in FIG. 3A, an image captured by the imaging element 103a is a curved hemispherical image (front side) taken through the fish-eye lens 102a. Also, as illustrated in FIG. 3B, an image captured by the imaging element 103b is a curved hemispherical image (back side) taken through the fish-eye lens 102b. The hemispherical image (front side) and the hemispherical image (back side), which are reversed by 180-degree from each other, are combined by the special image capturing device 1. This results in generation of the equirectangular projection image EC as illustrated in FIG. 3C.

The equirectangular projection image is mapped on the sphere surface using Open Graphics Library for Embedded Systems (OpenGL ES) as illustrated in FIG. 4A. This results in generation of the spherical image CE as illustrated in FIG. 4B. In other words, the spherical image CE is represented as the equirectangular projection image EC, which corresponds to a surface facing a center of the sphere CS. It should be noted that OpenGL ES is a graphic library used for visualizing two-dimensional (2D) and three-dimensional (3D) data. The spherical image CE is either a still image or a moving image.

Since the spherical image CE is an image attached to the sphere surface, as illustrated in FIG. 4B, a part of the image may look distorted when viewed from the user, providing a feeling of strangeness. To resolve this strange feeling, an image of a predetermined area, which is a part of the spherical image CE, is displayed as a flat image having fewer curves. The predetermined area is, for example, a part of the spherical image CE that is viewable by the user. In this disclosure, the image of the predetermined area is referred to as a "predetermined-area image" Q. Hereinafter, a description is given of displaying the predetermined-area image Q with reference to FIG. 5 and FIGS. 6A and 6B.

Figure 5:
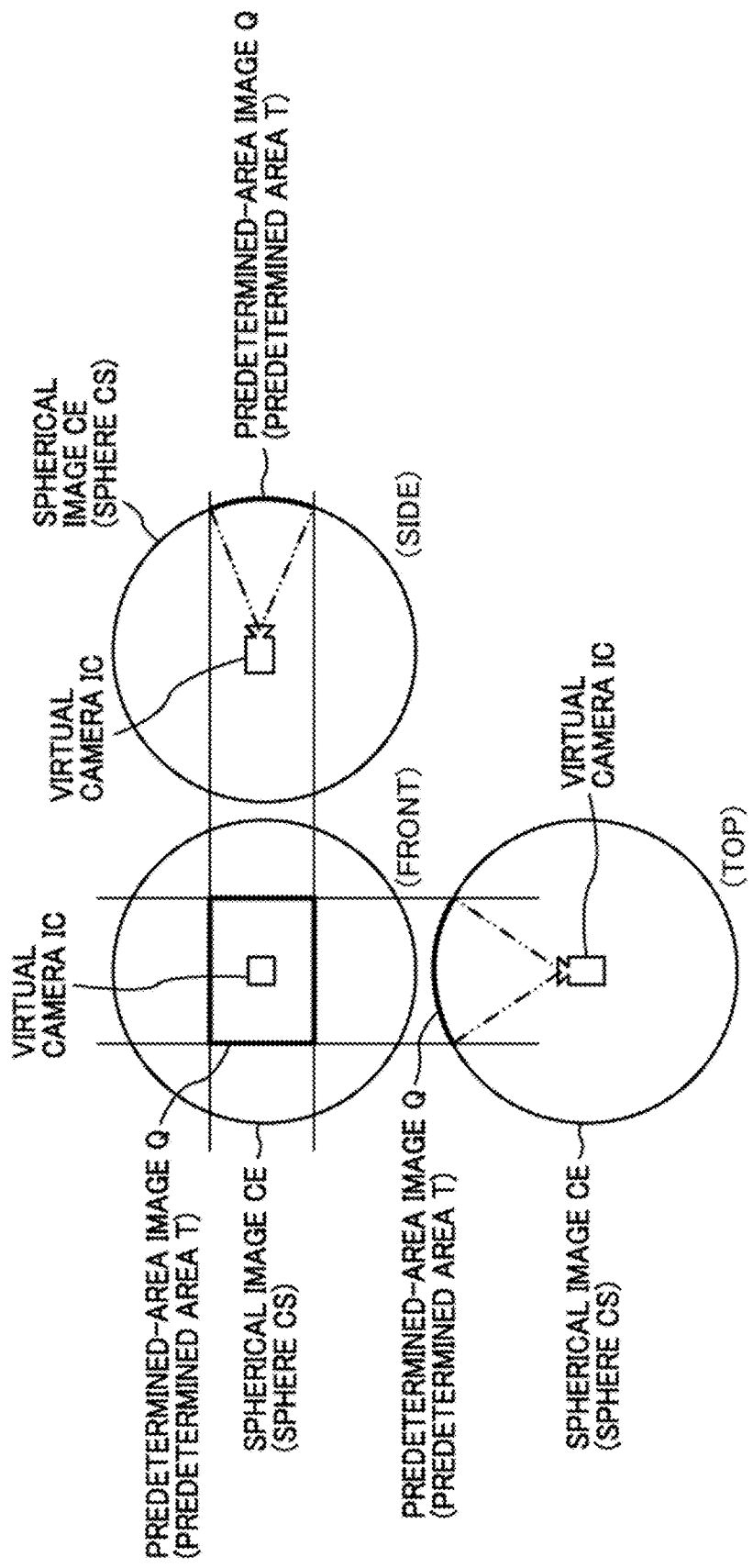
FIG. 5 is a view illustrating positions of a virtual camera and a predetermined area in a case in which the spherical image is represented as a three-dimensional solid sphere according to an embodiment.
Figure 6A:
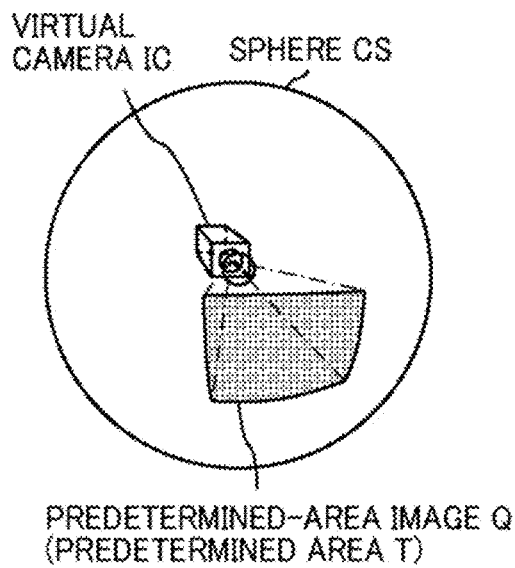
FIGS. 6A and 6B are respectively a perspective view of FIG. 5, and a view illustrating an image of the predetermined area on a display, according to an embodiment.
Figure 6B:
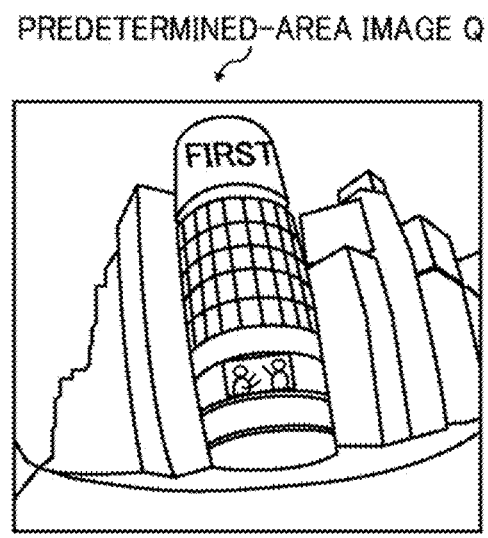

FIG. 5 is a view illustrating positions of a virtual camera IC and a predetermined area T in a case in which the spherical image is represented as a surface area of a three-dimensional solid sphere. The virtual camera IC corresponds to a position of a point of view (viewpoint) of a user who is viewing the spherical image CE represented as a surface area of the three-dimensional solid sphere CS. FIG. 6A is a perspective view of the spherical image CE illustrated in FIG. 5. FIG. 6B is a view illustrating the predetermined-area image Q when displayed on a display. In FIG. 6A, the spherical image CE illustrated in FIG. 4B is represented as a surface area of the three-dimensional solid sphere CS. Assuming that the spherical image CE is a surface area of the solid sphere CS, the virtual camera IC is inside of the spherical image CE as illustrated in FIG. 5. The predetermined area T in the spherical image CE is an imaging area of the virtual camera IC. Specifically, the predetermined area T is specified by predetermined-area information indicating an imaging direction and an angle of view of the virtual camera IC in a three-dimensional virtual space containing the spherical image CE.

The predetermined-area image Q, which is an image of the predetermined area T illustrated in FIG. 6A, is displayed on a display as an image of an imaging area of the virtual camera IC, as illustrated in FIG. 6B. FIG. 6B illustrates the predetermined-area image Q represented by the predetermined-area information that is set by default. The following explains the position of the virtual camera IC, using an imaging direction (ea, aa) and an angle of view α of the virtual camera IC.

Figure 7:
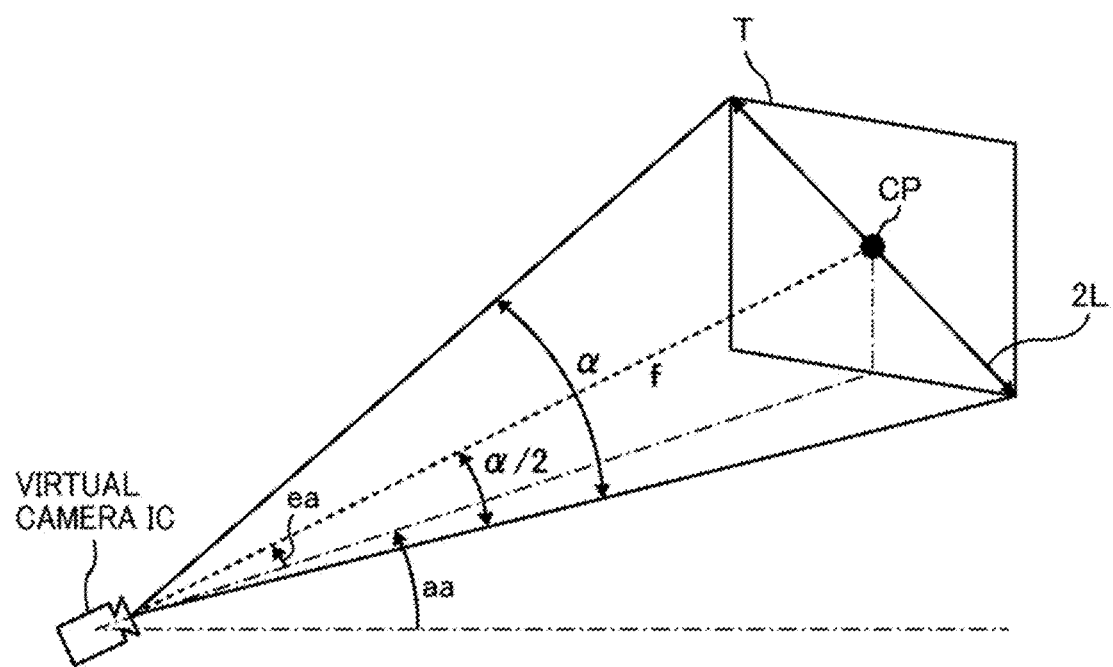
FIG. 7 is a view illustrating a relation between predetermined-area information and a predetermined-area image according to an embodiment.

Referring to FIG. 7, a relation between the predetermined-area information and the image of the predetermined area T is described according to the embodiment. FIG. 7 is a view illustrating a relation between the predetermined-area information and the image of the predetermined area T. As illustrated in FIG. 7, "ea" denotes an elevation angle, "aa" denotes an azimuth angle, and "α" denotes an angle of view, respectively, of the virtual camera IC. The position of the virtual camera IC is adjusted, such that the point of gaze of the virtual camera IC, indicated by the imaging direction (ea, aa), matches the central point CP of the predetermined area T as the imaging area of the virtual camera IC. The predetermined-area image Q is an image of the predetermined area T, in the spherical image CE. "f" denotes a distance from the virtual camera IC to the central point CP of the predetermined area T. "L" denotes a distance between the central point CP and a given vertex of the predetermined area T (2L is a diagonal line). In FIG. 7, a trigonometric function equation generally expressed by the following Equation 1 is satisfied.

$$L/f = \tan(\alpha/2) \quad \text{(Equation 1)}$$

First Embodiment

Referring to FIGS. 8 to 36D, the image capturing system according to a first embodiment of the present invention is described.

<Overview of Image Capturing System>

Figure 8:
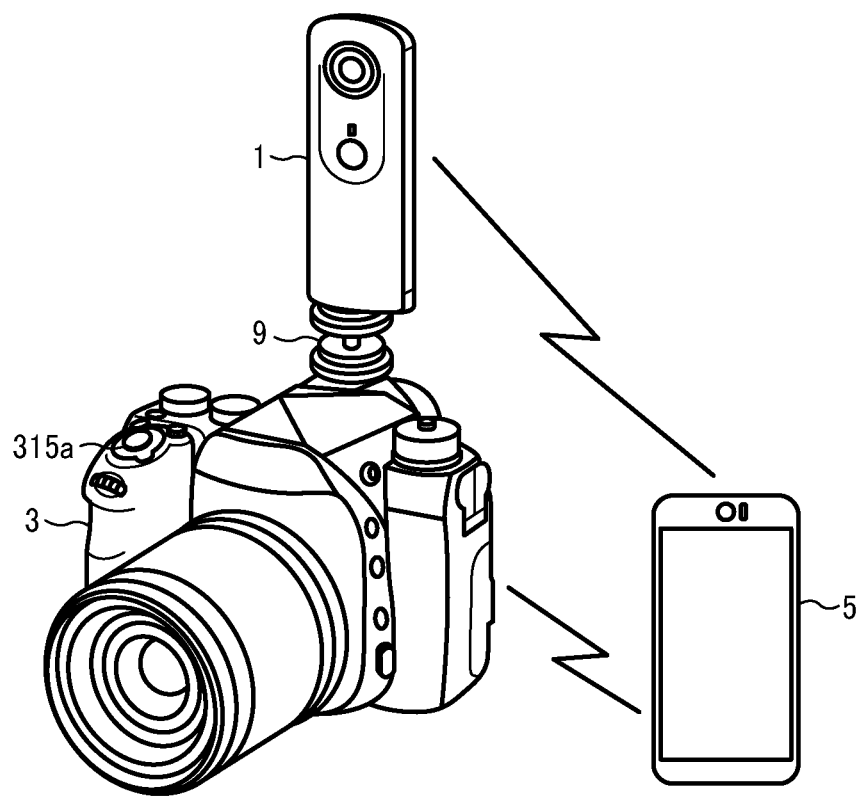
FIG. 8 is a schematic view illustrating an image capturing system according to a first embodiment.

First, referring to FIG. 8, an overview of the image capturing system is described according to the first embodiment. FIG. 8 is a schematic diagram illustrating a configuration of the image capturing system according to the embodiment.

As illustrated in FIG. 8, the image capturing system includes the special image capturing device 1, a general-purpose (generic) capturing device 3, a smart phone 5, and an adapter 9. The special image capturing device 1 is connected to the generic image capturing device 3 via the adapter 9.

The special image capturing device 1 is a special digital camera, which captures an image of an object or surroundings such as scenery to obtain two hemispherical images, from which a spherical (panoramic) image is generated, as described above referring to FIGS. 1 to 7.

The generic image capturing device 3 is a digital single-lens reflex camera, however, it may be implemented as a compact digital camera. The generic image capturing device 3 is provided with a shutter button 315a, which is a part of an operation unit 315 described below.

The smart phone 5 is wirelessly communicable with the special image capturing device 1 and the generic image capturing device 3 using short-range wireless communication, such as Wi-Fi, Bluetooth (Registered Trademark), and Near Field Communication (NFC). The smart phone 5 is capable of displaying the images obtained respectively from the special image capturing device 1 and the generic image capturing device 3, on a display 517 provided for the smart phone 5 as described below.

The smart phone 5 may communicate with the special image capturing device 1 and the generic image capturing device 3, without using the short-range wireless communication, but using wired communication such as a cable. The smart phone 5 is an example of an image processing apparatus capable of processing images being captured. Other examples of the image processing apparatus include, but not limited to, a tablet personal computer (PC), a note PC, and a desktop PC. The smart phone 5 may operate as a communication terminal described below.

Figure 9:
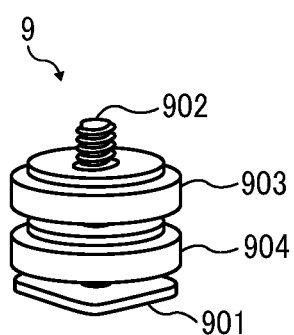
FIG. 9 is a perspective view illustrating an adapter, according to the first embodiment.

FIG. 9 is a perspective view illustrating the adapter 9 according to the embodiment. As illustrated in FIG. 9, the adapter 9 includes a shoe adapter 901, a bolt 902, an upper adjuster 903, and a lower adjuster 904. The shoe adapter 901 is attached to an accessory shoe of the generic image capturing device 3 as it slides. The bolt 902 is provided at a center of the shoe adapter 901, which is to be screwed into the tripod mount hole 151 of the special image capturing device 1. The bolt 902 is provided with the upper adjuster 903 and the lower adjuster 904, each of which is rotatable around the central axis of the bolt 902. The upper adjuster 903 secures the object attached with the bolt 902 (such as the special image capturing device 1). The lower adjuster 904 secures the object attached with the shoe adapter 901 (such as the generic image capturing device 3).

Figure 10:
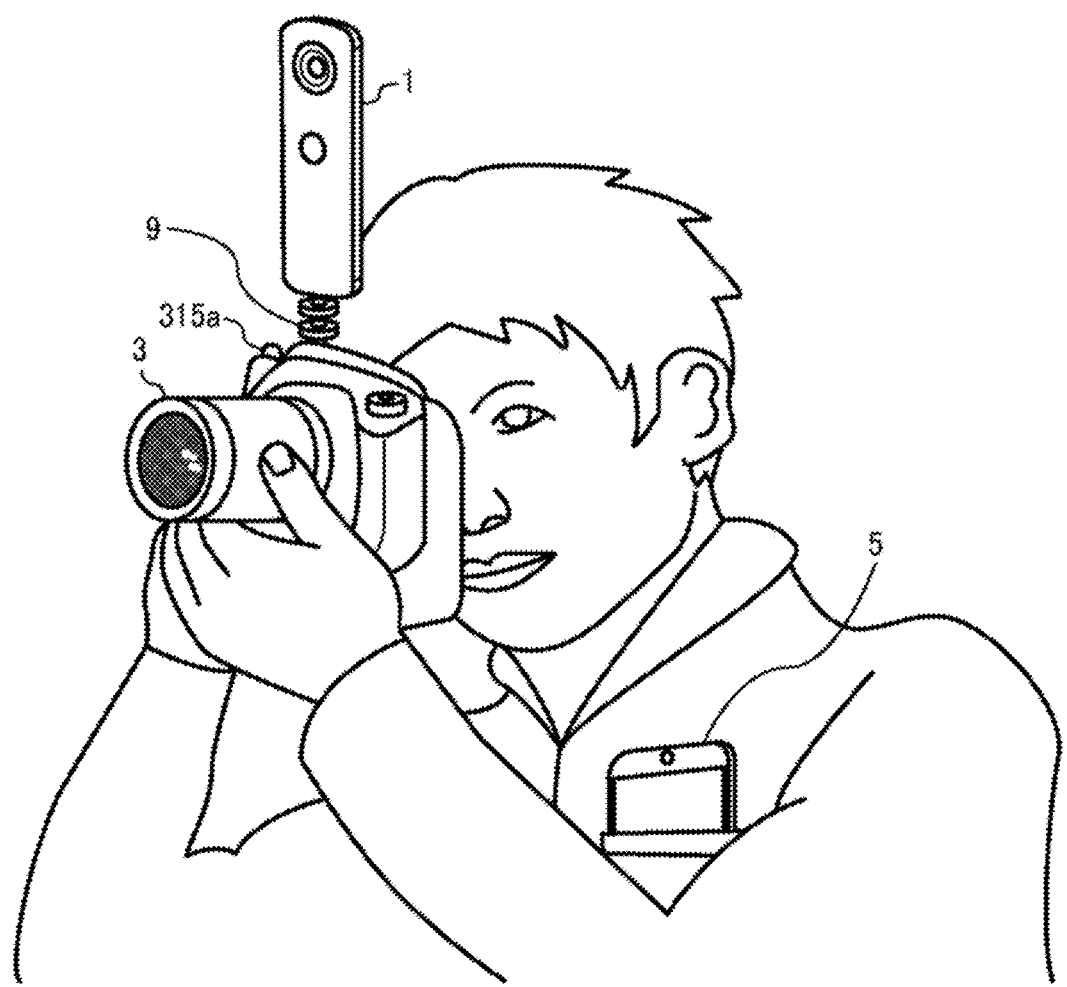
FIG. 10 illustrates how a user uses the image capturing system, according to the first embodiment.

FIG. 10 illustrates how a user uses the image capturing device, according to the embodiment. As illustrated in FIG. 10, the user puts his or her smart phone 5 into his or her pocket. The user captures an image of an object using the generic image capturing device 3 to which the special image capturing device 1 is attached by the adapter 9. While the smart phone 5 is placed in the pocket of the user's shirt, the smart phone 5 may be placed in any area as long as it is wirelessly communicable with the special image capturing device 1 and the generic image capturing device 3.

Hardware Configuration

Figure 11:
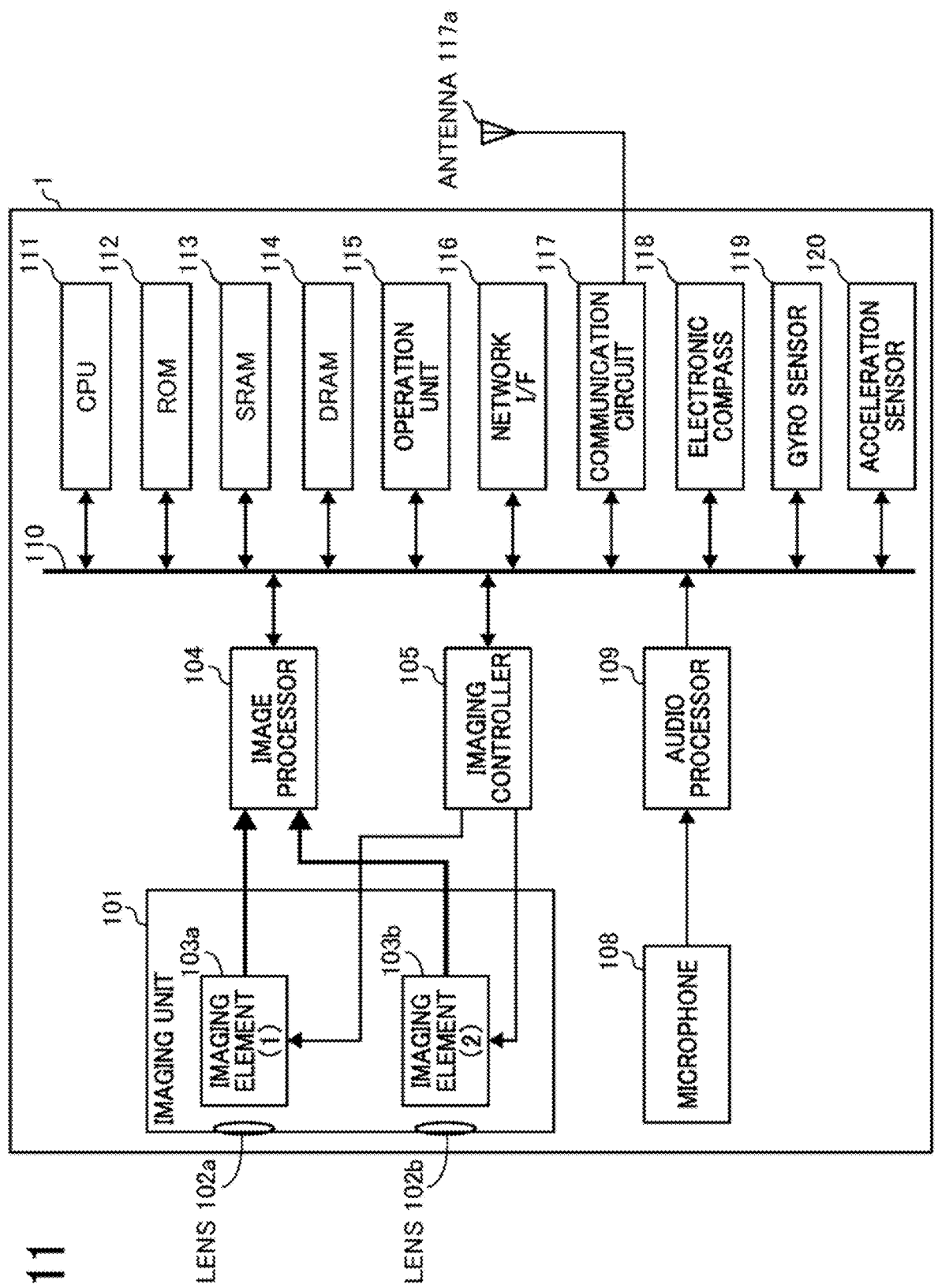
FIG. 11 is a schematic block diagram illustrating a hardware configuration of a special-purpose image capturing device according to the first embodiment.
Figure 12:
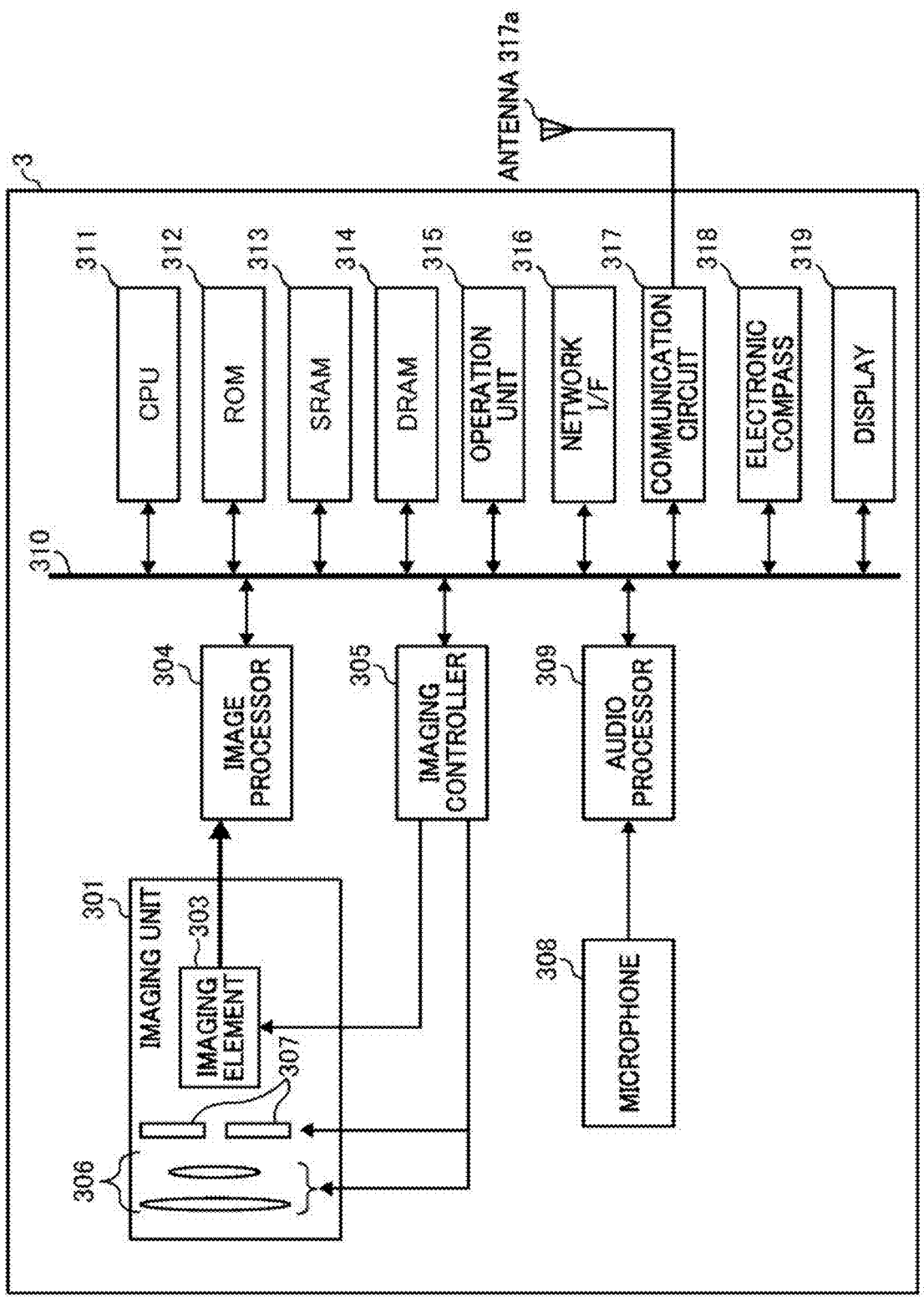
FIG. 12 is a schematic block diagram illustrating a hardware configuration of a general-purpose image capturing device according to the first embodiment.
Figure 13:
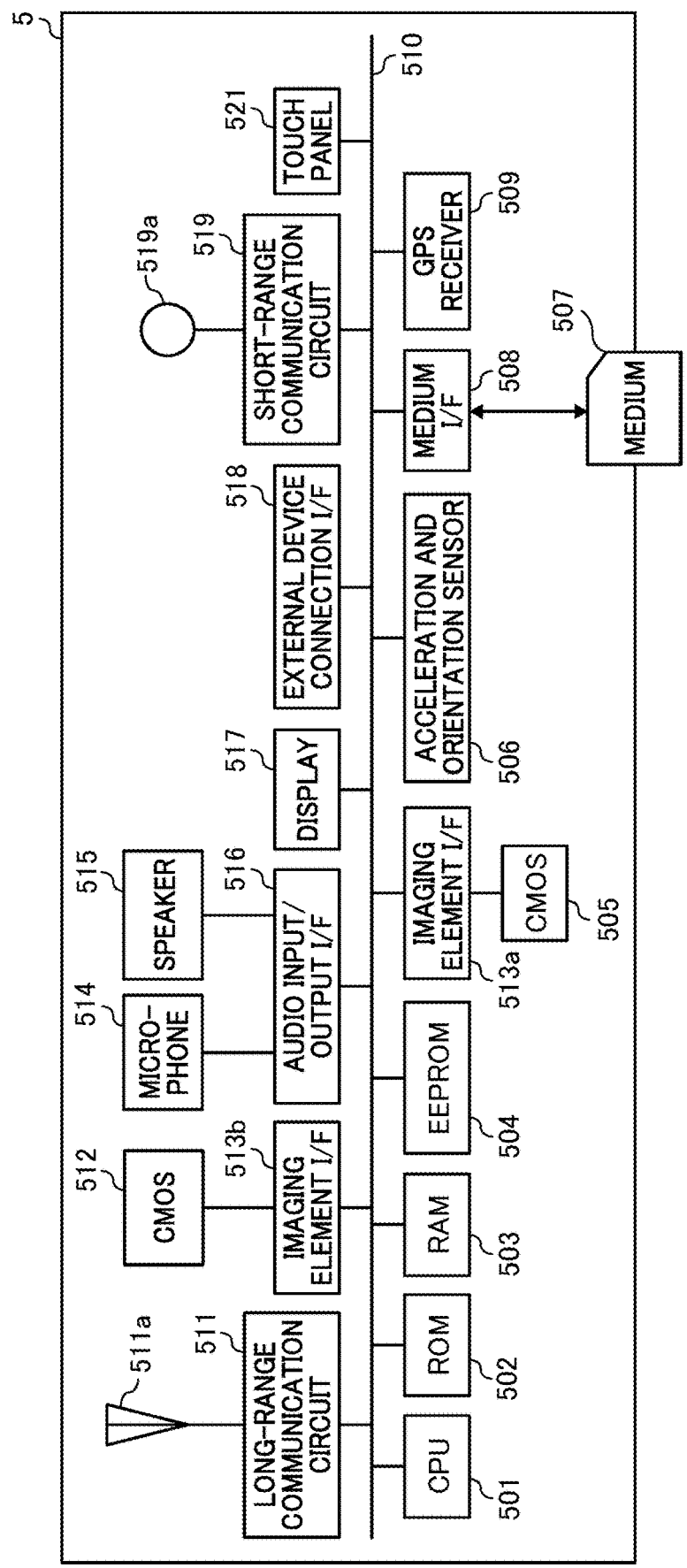
FIG. 13 is a schematic block diagram illustrating a hardware configuration of a smart phone, according to the first embodiment.

Next, referring to FIGS. 11 to 13, hardware configurations of the special image capturing device 1, generic image capturing device 3, and smart phone 5 are described according to the embodiment.

<Hardware Configuration of Special Image Capturing Device>

First, referring to FIG. 11, a hardware configuration of the special image capturing device 1 is described according to the embodiment. FIG. 11 illustrates the hardware configuration of the special image capturing device 1. The following describes a case in which the special image capturing device 1 is a spherical (omnidirectional) image capturing device having two imaging elements. However, the special image capturing device 1 may include any suitable number of imaging elements, providing that it includes at least two imaging elements. In addition, the special image capturing device 1 is not necessarily an image capturing device dedicated to omnidirectional image capturing. Alternatively, an external omnidirectional image capturing unit may be attached to a general-purpose digital camera or a smartphone to implement an image capturing device having substantially the same function as that of the special image capturing device 1.

As illustrated in FIG. 11, the special image capturing device 1 includes an imaging unit 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, the operation unit 115, a network interface (I/F) 116, a communication circuit 117, an antenna 117a, an electronic compass 118, a gyro sensor 119, and an acceleration sensor 120.

The imaging unit 101 includes two wide-angle lenses (so-called fish-eye lenses) 102a and 102b, each having an angle of view of equal to or greater than 180 degrees so as to form a hemispherical image. The imaging unit 101 further includes the two imaging elements 103a and 103b corresponding to the wide-angle lenses 102a and 102b respectively. The imaging elements 103a and 103b each includes an imaging sensor such as a complementary metal oxide semiconductor (CMOS) sensor and a charge-coupled device (CCD) sensor, a timing generation circuit, and a group of registers. The imaging sensor converts an optical image formed by the wide-angle lenses 102a and 102b into electric signals to output image data. The timing generation circuit generates horizontal or vertical synchronization signals, pixel clocks and the like for the imaging sensor. Various commands, parameters and the like for operations of the imaging elements 103a and 103b are set in the group of registers.

Each of the imaging elements 103a and 103b of the imaging unit 101 is connected to the image processor 104 via a parallel I/F bus. In addition, each of the imaging elements 103a and 103b of the imaging unit 101 is connected to the imaging controller 105 via a serial I/F bus such as an I2C bus. The image processor 104, the imaging controller 105, and the audio processor 109 are each connected to the CPU 111 via a bus 110. Furthermore, the ROM 112, the SRAM 113, the DRAM 114, the operation unit 115, the network I/F 116, the communication circuit 117, the electronic compass 118, and the terminal 121 are also connected to the bus 110.

The image processor 104 acquires image data from each of the imaging elements 103a and 103b via the parallel I/F bus and performs predetermined processing on each image data. Thereafter, the image processor 104 combines these image data to generate data of the equirectangular projection image as illustrated in FIG. 3C.

The imaging controller 105 usually functions as a master device while the imaging elements 103a and 103b each usually functions as a slave device. The imaging controller 105 sets commands and the like in the group of registers of the imaging elements 103a and 103b via the serial I/F bus such as the I2C bus. The imaging controller 105 receives various commands from the CPU 111. Further, the imaging controller 105 acquires status data and the like of the group of registers of the imaging elements 103a and 103b via the serial I/F bus such as the I2C bus. The imaging controller 105 sends the acquired status data and the like to the CPU 111.

The imaging controller 105 instructs the imaging elements 103a and 103b to output the image data at a time when the shutter button 115a of the operation unit 115 is pressed. In some cases, the special image capturing device 1 is capable of displaying a preview image on a display (e.g., the display of the smart phone 5) or displaying a moving image (movie). In case of displaying movie, the image data are continuously output from the imaging elements 103a and 103b at a predetermined frame rate (frames per minute).

Furthermore, the imaging controller 105 operates in cooperation with the CPU 111 to synchronize the time when the imaging element 103a outputs image data and the time when the imaging element 103b outputs the image data. It should be noted that, although the special image capturing device 1 does not include a display in this embodiment, the special image capturing device 1 may include the display.

The microphone 108 converts sounds to audio data (signal). The audio processor 109 acquires the audio data output from the microphone 108 via an I/F bus and performs predetermined processing on the audio data.

The CPU 111 controls entire operation of the special image capturing device 1, for example, by performing predetermined processing. The ROM 112 stores various programs for execution by the CPU 111. The SRAM 113 and the DRAM 114 each operates as a work memory to store programs loaded from the ROM 112 for execution by the CPU 111 or data in current processing. More specifically, in one example, the DRAM 114 stores image data currently processed by the image processor 104 and data of the equirectangular projection image on which processing has been performed.

The operation unit 115 collectively refers to various operation keys, such as the shutter button 115a. In addition to the hardware keys, the operation unit 115 may also include a touch panel. The user operates the operation unit 115 to input various image capturing (photographing) modes or image capturing (photographing) conditions.

The network IIF 116 collectively refers to an interface circuit such as a USB I/F that allows the special image capturing device 1 to communicate data with an external medium such as an SD card or an external personal computer. The network I/F 116 supports at least one of wired and wireless communications. The data of the equirectangular projection image, which is stored in the DRAM 114, is stored in the external medium via the network I/F 116 or transmitted to the external device such as the smart phone 5 via the network I/F 116, at any desired time.

The communication circuit 117 communicates data with the external device such as the smart phone 5 via the antenna 117a of the special image capturing device 1 by short-range wireless communication such as Wi-Fi, NFC, and Bluetooth. The communication circuit 117 is also capable of transmitting the data of equirectangular projection image to the external device such as the smart phone 5.

The electronic compass 118 calculates an orientation of the special image capturing device 1 from the Earth's magnetism to output orientation information. This orientation information is an example of related information, which is metadata described in compliance with Exif. This information is used for image processing such as image correction of captured images. The related information also includes a date and time when the image is captured by the special image capturing device 1, and a size of the image data.

The gyro sensor 119 detects the change in tilt of the special image capturing device 1 (roll, pitch, yaw) with movement of the special image capturing device 1. The change in angle is one example of related information (metadata) described in compliance with Exif. This information is used for image processing such as image correction of captured images.

The acceleration sensor 120 detects acceleration in three axial directions. The position (an angle with respect to the direction of gravity) of the special image capturing device 1 is determined, based on the detected acceleration. With the gyro sensor 119 and the acceleration sensor 120, accuracy in image correction improves.

<Hardware Configuration of Generic Image Capturing Device>

Next, referring to FIG. 12, a hardware configuration of the generic image capturing device 3 is described according to the embodiment. FIG. 12 illustrates the hardware configuration of the generic image capturing device 3. As illustrated in FIG. 12, the generic image capturing device 3 includes an imaging unit 301, an image processor 304, an imaging controller 305, a microphone 308, an audio processor 309, a bus 310, a CPU 311, a ROM 312, a SRAM 313, a DRAM 314, an operation unit 315, a network I/F 316, a communication circuit 317, an antenna 317a, an electronic compass 318, and a display 319. The image processor 304 and the imaging controller 305 are each connected to the CPU 311 via the bus 310.

The elements 304, 310, 311, 312, 313, 314, 315, 316, 317, 317a, and 318 of the generic image capturing device 3 are substantially similar in structure and function to the elements 104, 110, 111, 112, 113, 114, 115, 116, 117, 117a, and 118 of the special image capturing device 1, such that the description thereof is omitted.

Further, as illustrated in FIG. 12, in the imaging unit 301 of the generic image capturing device 3, a lens unit 306 having a plurality of lenses, a mechanical shutter button 307, and the imaging element 303 are disposed in this order from a side facing the outside (that is, a side to face the object to be captured).

The imaging controller 305 is substantially similar in structure and function to the imaging controller 105. The imaging controller 305 further controls operation of the lens unit 306 and the mechanical shutter button 307, according to user operation input through the operation unit 315.

The display 319 is capable of displaying an operational menu, an image being captured, or an image that has been captured, etc.

<Hardware Configuration of Smart Phone>

Referring to FIG. 13, a hardware configuration of the smart phone 5 is described according to the embodiment. FIG. 13 illustrates the hardware configuration of the smart phone 5. As illustrated in FIG. 13, the smart phone 5 includes a CPU 501, a ROM 502, a RAM 503, an EEPROM 504, a Complementary Metal Oxide Semiconductor (CMOS) sensor 505, an imaging element I/F 513a, an acceleration and orientation sensor 506, a medium I/F 508, and a GPS receiver 509.

The CPU 501 controls entire operation of the smart phone 5. The ROM 502 stores a control program for controlling the CPU 501 such as an IPL. The RAM 503 is used as a work area for the CPU 501. The EEPROM 504 reads or writes various data such as a control program for the smart phone 5 under control of the CPU 501. The CMOS sensor 505 captures an object (for example, the user operating the smart phone 5) under control of the CPU 501 to obtain captured image data. The imaging element I/F 513a is a circuit that controls driving of the CMOS sensor 505. The acceleration and orientation sensor 506 includes various sensors such as an electromagnetic compass for detecting geomagnetism, a gyrocompass, and an acceleration sensor. The medium I/F 508 controls reading or writing of data with respect to a recording medium 507 such as a flash memory. The GPS receiver 509 receives a GPS signal from a GPS satellite.

The smart phone 5 further includes a long-range communication circuit 511, an antenna 511a for the long-range communication circuit 511, a CMOS sensor 512, an imaging element I/F 513b, a microphone 514, a speaker 515, an audio input/output I/F 516, a display 517, an external device connection I/F 518, a short-range communication circuit 519, an antenna 519a for the short-range communication circuit 519, and a touch panel 521.

The long-range communication circuit 511 is a circuit that communicates with other device through the communication network 100. The CMOS sensor 512 is an example of a built-in imaging device capable of capturing a subject under control of the CPU 501. The imaging element I/F 513a is a circuit that controls driving of the CMOS sensor 512. The microphone 514 is an example of built-in audio collecting device capable of inputting audio under control of the CPU 501. The audio I/O I/F 516 is a circuit for inputting or outputting an audio signal between the microphone 514 and the speaker 515 under control of the CPU 501. The display 517 may be a liquid crystal or organic electro luminescence (EL) display that displays an image of a subject, an operation icon, or the like. The external device connection I/F 518 is an interface circuit that connects the smart phone 5 to various external devices. The short-range communication circuit 519 is a communication circuit that communicates in compliance with the Wi-Fi, NFC, Bluetooth, and the like. The touch panel 521 is an example of input device that enables the user to input a user instruction through touching a screen of the display 517.

The smart phone 5 further includes a bus line 510. Examples of the bus line 510 include an address bus and a data bus, which electrically connects the elements such as the CPU 501.

It should be noted that a recording medium such as a CD-ROM or HD storing any of the above-described programs may be distributed domestically or overseas as a program product.

<Functional Configuration of Image Capturing System>

Figure 14:
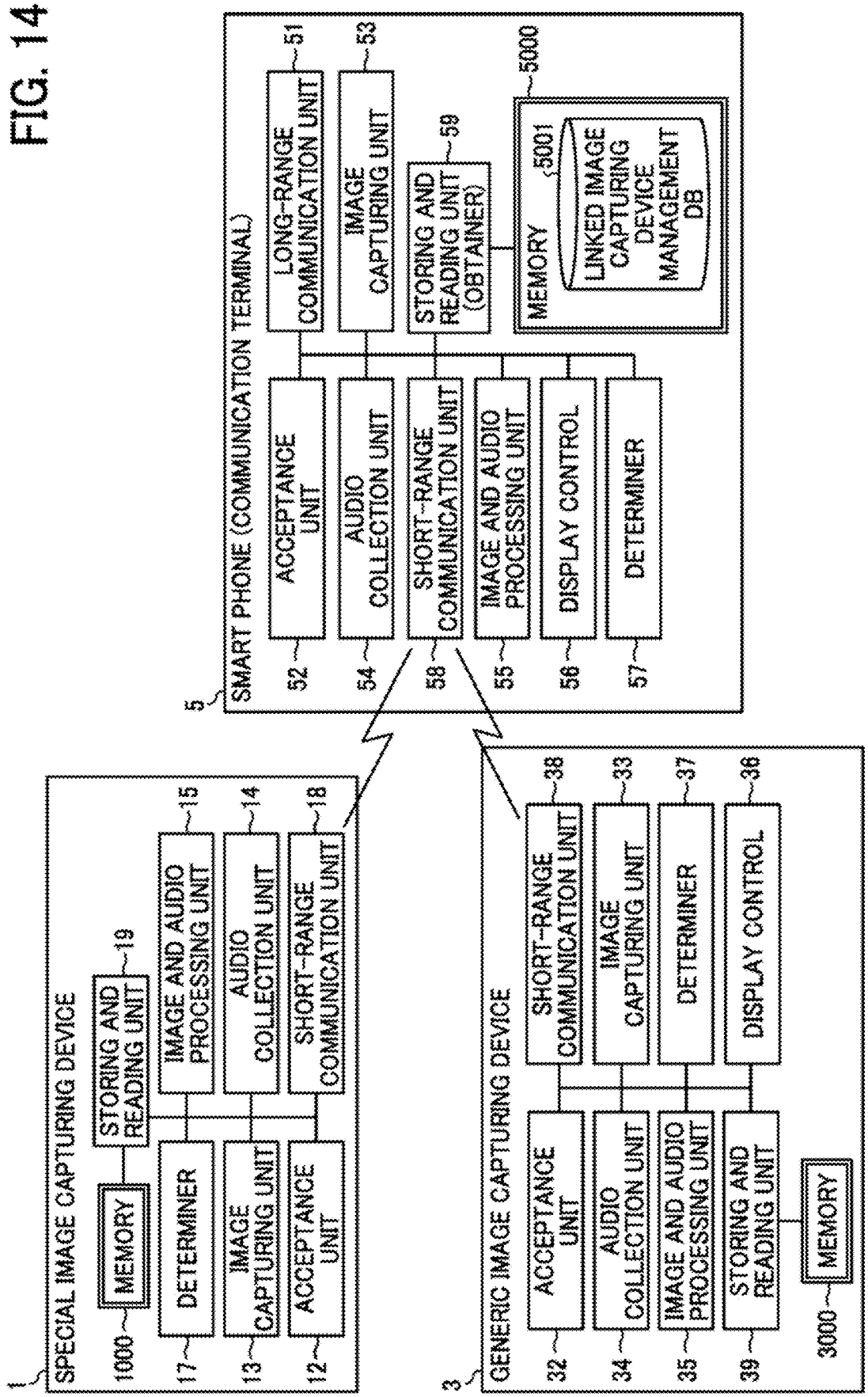
FIG. 14 is a functional block diagram of the image capturing system according to the first embodiment.

Referring now to FIGS. 11 to 14, a functional configuration of the image capturing system is described according to the embodiment. FIG. 14 is a schematic block diagram illustrating functional configurations of the special image capturing device 1, generic image capturing device 3, and smart phone 5, in the image capturing system, according to the embodiment.

<Functional Configuration of Special Image Capturing Device>

Referring to FIGS. 11 and 14, a functional configuration of the special image capturing device 1 is described according to the embodiment. As illustrated in FIG. 14, the special image capturing device 1 includes an acceptance unit 12, an image capturing unit 13, an audio collection unit 14, an image and audio processing unit 15, a determiner 17, a short-range communication unit 18, and a storing and reading unit 19. These units are functions that are implemented by or that are caused to function by operating any of the elements illustrated in FIG. 11 in cooperation with the instructions of the CPU 111 according to the special image capturing device control program expanded from the SRAM 113 to the DRAM 114.

The special image capturing device 1 further includes a memory 1000, which is implemented by the ROM 112, the SRAM 113, and the DRAM 114 illustrated in FIG. 11.

Still referring to FIGS. 11 and 14, each functional unit of the special image capturing device 1 is described according to the embodiment.

The acceptance unit 12 of the special image capturing device 1 is implemented by the operation unit 115 illustrated in FIG. 11, which operates under control of the CPU 111. The acceptance unit 12 receives an instruction input from the operation unit 115 according to a user operation.

The image capturing unit 13 is implemented by the imaging unit 101, the image processor 104, and the imaging controller 105, illustrated in FIG. 11, each operating under control of the CPU 111. The image capturing unit 13 captures an image of the object or surroundings to obtain captured image data. As the captured image data, the two hemispherical images, from which the spherical image is generated, are obtained as illustrated in FIGS. 3A and 3B.

The audio collection unit 14 is implemented by the microphone 108 and the audio processor 109 illustrated in FIG. 11, each of which operates under control of the CPU 111. The audio collection unit 14 collects sounds around the special image capturing device 1.

The image and audio processing unit 15 is implemented by the instructions of the CPU 111, illustrated in FIG. 11. The image and audio processing unit 15 applies image processing to the captured image data obtained by the image capturing unit 13. The image and audio processing unit 15 applies audio processing to audio obtained by the audio collection unit 14. For example, the image and audio processing unit 15 generates data of the equirectangular projection image (FIG. 3C), using two hemispherical images (FIGS. 3A and 3B) respectively obtained by the imaging elements 103a and 103b.

The determiner 17, which is implemented by instructions of the CPU 111, performs various determinations.

The short-range communication unit 18, which is implemented by instructions of the CPU 111, and the communication circuit 117 with the antenna 117a, communicates data with a short-range communication unit 58 of the smart phone 5 using the short-range wireless communication in compliance with such as Wi-Fi.

The storing and reading unit 19, which is implemented by instructions of the CPU 111 illustrated in FIG. 11, stores various data or information in the memory 1000 or reads out various data or information from the memory 1000.

<Functional Configuration of Generic Image Capturing Device>

Next, referring to FIGS. 12 and 14, a functional configuration of the generic image capturing device 3 is described according to the embodiment. As illustrated in FIG. 14, the generic image capturing device 3 includes an acceptance unit 32, an image capturing unit 33, an audio collection unit 34, an image and audio processing unit 35, a display control 36, a determiner 37, a short-range communication unit 38, and a storing and reading unit 39. These units are functions that are implemented by or that are caused to function by operating any of the elements illustrated in FIG. 12 in cooperation with the instructions of the CPU 311 according to the image capturing device control program expanded from the SRAM 313 to the DRAM 314.

The generic image capturing device 3 further includes a memory 3000, which is implemented by the ROM 312, the SRAM 313, and the DRAM 314 illustrated in FIG. 12.

The acceptance unit 32 of the generic image capturing device 3 is implemented by the operation unit 315 illustrated in FIG. 12, which operates under control of the CPU 311. The acceptance unit 32 receives an instruction input from the operation unit 315 according to a user operation.

The image capturing unit 33 is implemented by the imaging unit 301, the image processor 304, and the imaging controller 305, illustrated in FIG. 12, each of which operates under control of the CPU 311. The image capturing unit 13 captures an image of the object or surroundings to obtain captured image data. In this example, the captured image data is planar image data, captured with a perspective projection method.

The audio collection unit 34 is implemented by the microphone 308 and the audio processor 309 illustrated in FIG. 12, each of which operates under control of the CPU 311. The audio collection unit 34 collects sounds around the generic image capturing device 3.

The image and audio processing unit 35 is implemented by the instructions of the CPU 311, illustrated in FIG. 12. The image and audio processing unit 35 applies image processing to the captured image data obtained by the image capturing unit 33. The image and audio processing unit 35 applies audio processing to audio obtained by the audio collection unit 34.

The display control 36, which is implemented by the instructions of the CPU 311 illustrated in FIG. 12, controls the display 319 to display a planar image P based on the captured image data that is being captured or that has been captured.

The determiner 37, which is implemented by instructions of the CPU 311, performs various determinations. For example, the determiner 37 determines whether the shutter button 315a has been pressed by the user.

The short-range communication unit 38, which is implemented by instructions of the CPU 311, and the communication circuit 317 with the antenna 317a, communicates data with the short-range communication unit 58 of the smart phone 5 using the short-range wireless communication in compliance with such as Wi-Fi.

The storing and reading unit 39, which is implemented by instructions of the CPU 311 illustrated in FIG. 12, stores various data or information in the memory 3000 or reads out various data or information from the memory 3000.

<Functional Configuration of Smart Phone>

Referring now to FIGS. 13 to 16, a functional configuration of the smart phone 5 is described according to the embodiment. As illustrated in FIG. 14, the smart phone 5 includes a long-range communication unit 51, an acceptance unit 52, an image capturing unit 53, an audio collection unit 54, an image and audio processing unit 55, a display control 56, a determiner 57, the short-range communication unit 58, and a storing and reading unit 59. These units are functions that are implemented by or that are caused to function by operating any of the hardware elements illustrated in FIG. 13 in cooperation with the instructions of the CPU 501 according to the control program for the smart phone 5, expanded from the EEPROM 504 to the RAM 503.

Figures 15A, 15B:
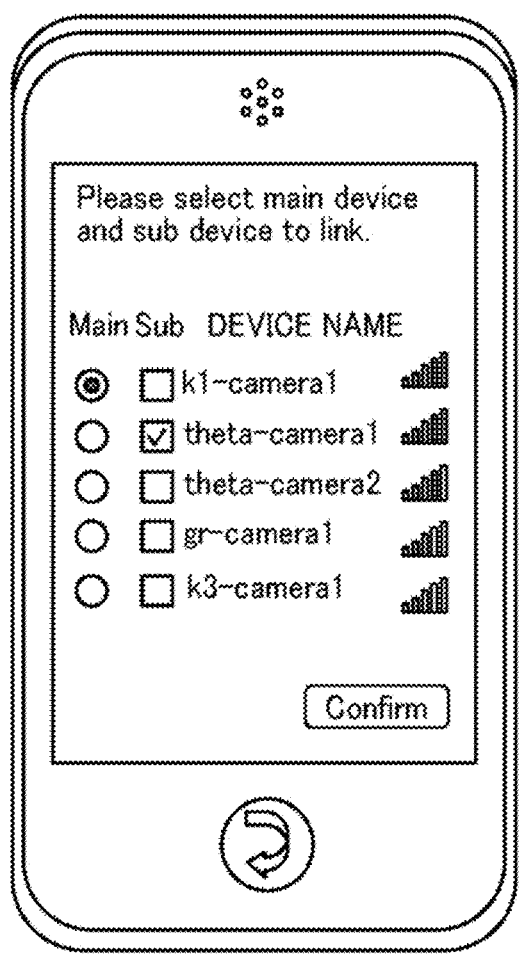
FIGS. 15A and 15B are conceptual diagrams respectively illustrating a linked image capturing device management table, and a linked image capturing device configuration screen, according to the first embodiment.

The smart phone 5 further includes a memory 5000, which is implemented by the ROM 502, RAM 503 and EEPROM 504 illustrated in FIG. 13. The memory 5000 stores a linked image capturing device management DB 5001. The linked image capturing device management DB 5001 is implemented by a linked image capturing device management table illustrated in FIG. 15A. FIG. 15A is a conceptual diagram illustrating the linked image capturing device management table, according to the embodiment.

Referring now to FIG. 15A, the linked image capturing device management table is described according to the embodiment. As illustrated in FIG. 15A, the linked image capturing device management table stores, for each image capturing device, linking information indicating a relation to the linked image capturing device, an IP address of the image capturing device, and a device name of the image capturing device, in association with one another. The linking information indicates whether the image capturing device is "main" device or "sub" device in performing the linking function. The image capturing device as the "main" device, starts capturing the image in response to pressing of the shutter button provided for that device. The image capturing device as the "sub" device, starts capturing the image in response to pressing of the shutter button provided for the "main" device. The IP address is one example of destination information of the image capturing device. The IP address is used in case the image capturing device communicates using Wi-Fi. Alternatively, a manufacturer's identification (ID) or a product ID may be used in case the image capturing device communicates using a wired USB cable. Alternatively, a Bluetooth Device (BD) address is used in case the image capturing device communicates using wireless communication such as Bluetooth.

The long-range communication unit 51 of the smart phone 5 is implemented by the long-range communication circuit 511 that operates under control of the CPU 501, illustrated in FIG. 13, to transmit or receive various data or information to or from other device (for example, other smart phone or server) through a communication network such as the Internet.

The acceptance unit 52 is implement by the touch panel 521, which operates under control of the CPU 501, to receive various selections or inputs from the user. While the touch panel 521 is provided separately from the display 517 in FIG. 13, the display 517 and the touch panel 521 may be integrated as one device. Further, the smart phone 5 may include any hardware key, such as a button, to receive the user instruction, in addition to the touch panel 521.

The image capturing unit 53 is implemented by the CMOS sensors 505 and 512, which operate under control of the CPU 501, illustrated in FIG. 13. The image capturing unit 13 captures an image of the object or surroundings to obtain captured image data.

In this example, the captured image data is planar image data, captured with a perspective projection method.

The audio collection unit 54 is implemented by the microphone 514 that operates under control of the CPU 501. The audio collecting unit 14a collects sounds around the smart phone 5.

The image and audio processing unit 55 is implemented by the instructions of the CPU 501, illustrated in FIG. 13. The image and audio processing unit 55 applies image processing to an image of the object that has been captured by the image capturing unit 53. The image and audio processing unit 15 applies audio processing to audio obtained by the audio collection unit 54.

The display control 56, which is implemented by the instructions of the CPU 501 illustrated in FIG. 13, controls the display 517 to display the planar image P based on the captured image data that is being captured or that has been captured by the image capturing unit 53. The display control 56 superimposes the planar image P, on the spherical image CE, using superimposed display data, generated by the image and audio processing unit 55. With the superimposed display data, each grid area LAA of the planar image P is placed at a location indicated by a location parameter, and is adjusted to have a brightness value and a color value indicated by a correction parameter. This enables the planar image P to be displayed in various display forms, for example, by changing a zoom ratio or a projection method.

In this example, the location parameter is an example of location information. In case a plurality of images to be superimposed is present, the location information is obtained for each image. The location information is thus a general term for first location information such as a first location parameter, and second location information such as a second location parameter.

Further, the correction parameter is an example of correction information. In case a plurality of images to be superimposed is present, the correction parameter is obtained for each image. The correction information is thus a general term for first correction information such as a first correction parameter, and second correction information such as a second correctio parameter.

The determiner 57 is implemented by the instructions of the CPU 501, illustrated in FIG. 13, to perform various determinations.

The short-range communication unit 58, which is implemented by instructions of the CPU 501, and the short-range communication circuit 519 with the antenna 519a, communicates data with the short-range communication unit 18 of the special image capturing device 1, and the short-range communication unit 38 of the generic image capturing device 3, using the short-range wireless communication in compliance with such as Wi-Fi.

The storing and reading unit 59, which is implemented by instructions of the CPU 501 illustrated in FIG. 13, stores various data or information in the memory 5000 or reads out various data or information from the memory 5000. For example, as described below, the superimposition relationship metadata may be stored in the memory 5000. In this embodiment, the storing and reading unit 59 functions as an obtainer that obtains various data from the memory 5000.

Figure 16:
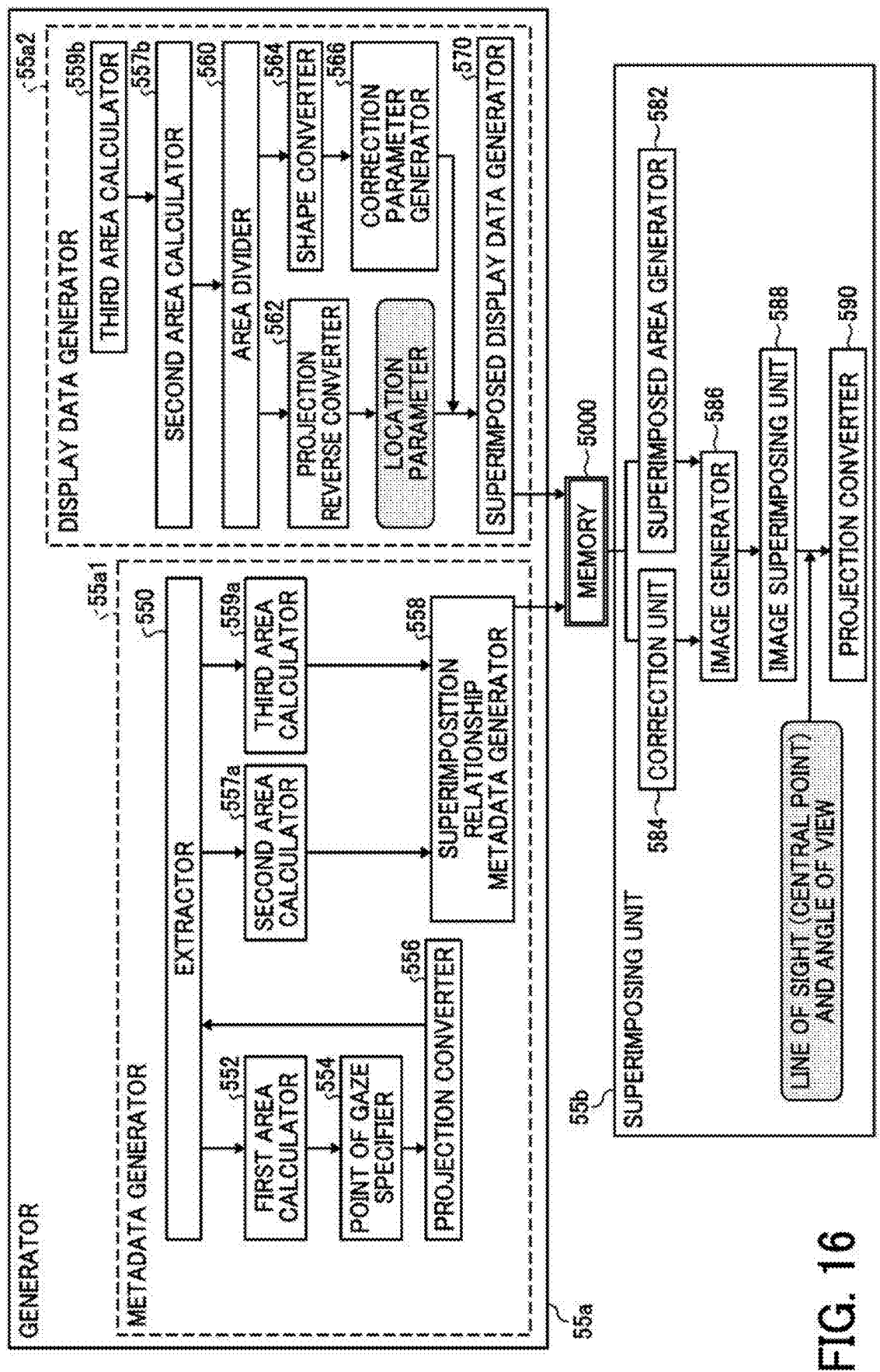
FIG. 16 is a block diagram illustrating a functional configuration of an image and audio processing unit according to the first embodiment.

Referring to FIG. 16, a functional configuration of the image and audio processing unit 55 is described according to the embodiment. FIG. 16 is a block diagram illustrating the functional configuration of the image and audio processing unit 55 according to the embodiment.

Figure 21:
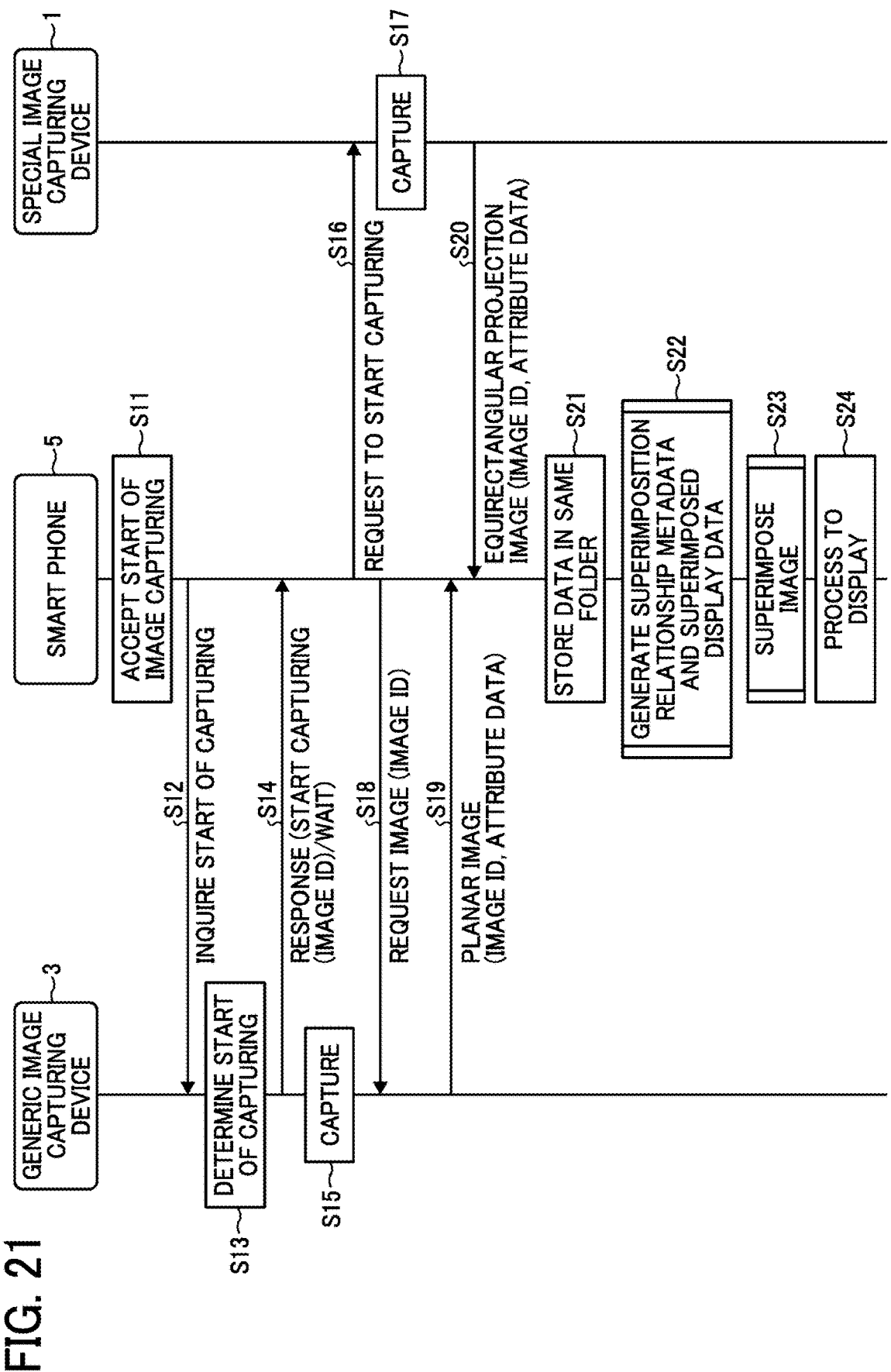
FIG. 21 is a data sequence diagram illustrating operation of capturing the image, performed by the image capturing system, according to the first embodiment.

The image and audio processing unit 55 mainly includes a generator 55a that performs encoding, and a superimposing unit 55b that performs decoding. In this example, the encoding corresponds to processing to generate data to be used for superimposing images for display, such as the superimposition relationship metadata. Further, in this example, the decoding corresponds to processing to generate images for display using such as the superimposition relationship metadata. The generator 55a performs processing of S22, which is processing to generate the superimposition relationship metadata, as illustrated in FIG. 21. The superimposing unit 55b performs processing of S23, which is processing to superimpose the images using the superimposition relationship metadata, as illustrated in FIG. 21.

(Functional Configuration of Generator)

First, a functional configuration of the generator 55a is described. The generator 55a mainly includes a metadata generator 55a1 and a display data generator 55a2.

(Functional Configuration of Metadata Generator)

In case a plurality of planar images are to be superimposed on the equirectangular projection image, as described above, the user viewing the images may feel strangeness, for example, due to the positional shift between two or more of the planar images. To prevent this shift, the metadata generator 55a1 generates superimposition relationship metadata, as described below.

While three or more planar images may be superimposed, in the following, the example case in which two planar images are present is described for simplicity. Specifically, in the following example, the planar image PA and the planar image PB are superimposed on the equirectangular projection image EC. The planar image PB is to be displayed, as a foreground image of the planar image PA. The planar image PA is to be displayed, as a foreground image of the equirectangular projection image EC.

Further, in the following, the equirectangular projection image EC is an example of a first image, the planar image PA is an example of a second image, and the planar image PB is an example of a third image. The term "planar image P" is used to collectively refer to the planar images PA and PB.

The metadata generator 55a1 identifies a pair of images having a parent-child relationship from the planar image PA, the planar image PB, and the equirectangular projection image EC. Images to be paired can be specified by, for example, performing matching processing on two images arbitrarily selected from among input images and calculating a location to be superimposed (that is, where the image to be superimposed, is to be superimposed, which is referred to as a superimposed location) to determine whether one of the two images overlaps with the other image. Metadata may be generated after a parent-child relationship is determined. In this example, the equirectangular projection image EC and the planar image PA have a parent-child relationship, as the equirectangular projection image EC is a background image and the planar image PA is a foreground image. The planar image PA and the planar image PB have a parent-child relationship, as the planar image PA is a background image and the planar image PB is a foreground image. In this case, superimposition relationship metadata is generated for each of the planar image PA and the planar image PB, as describe below referring to FIGS. 17 and 18. In this example, for a set of images (or a group of images; in the foregoing description, the term "pair" is used to indicate two images) having a parent-child relationship, the metadata generator 55a1 may set a parent-child relationship according to, for example a user instruction. For example, the user may previously input with information on which one or more of a plurality of planar images available for use, are to be superimposed on which one of a plurality of spherical images available for use. Further, the user may input with information on which one of the planar images is to be superimposed on which one of the planar images. Alternatively, the images may be rearranged according to the angle of view to determine a set of images having a parent-child relationship. Whether correct parent and child images can be suitably obtained from a set of images having a parent-child relationship is determined by, as described above, performing matching processing, calculating a superimposed location to determine whether one of the images overlaps with another image, and checking the parent-child relationship of the set of images.

Figure 22:
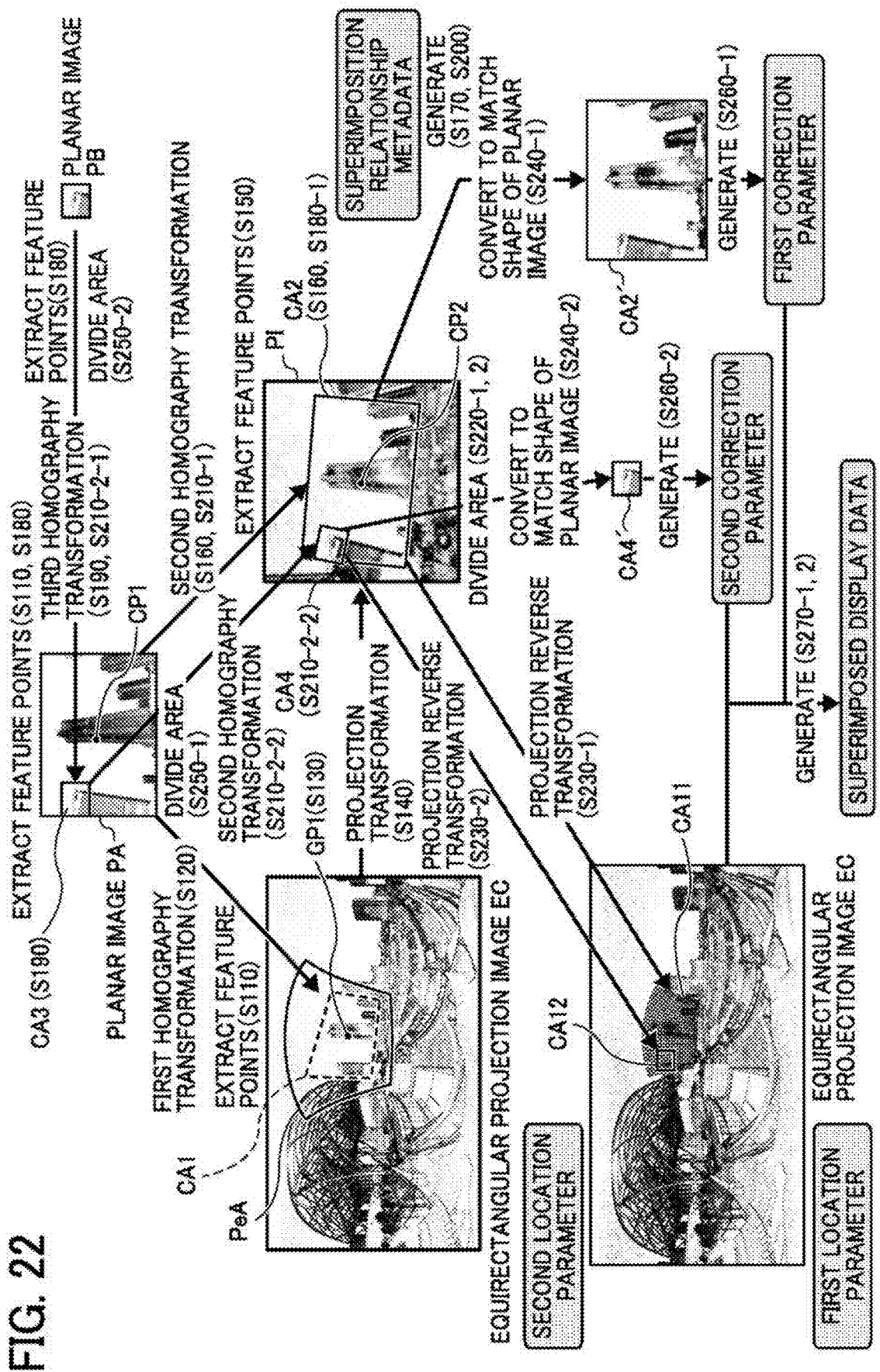
FIG. 22 is a conceptual diagram illustrating operation of generating superimposition relationship metadata and superimposed display data, according to the first embodiment.

The metadata generator 55a1 includes an extractor 550, a first area calculator 552, a point of gaze specifier 554, a projection converter 556, a second area calculator 557a, a third area calculator 559a, and a superimposition relationship metadata generator 558. Numerals and symbols designating images and areas described below are provided in FIG. 22. FIG. 22 is a conceptual diagram of images obtained in the process of generating superimposition relationship metadata and superimposed display data.

Further, a number of corresponding area calculators (such as the second area calculator 557a and the third area calculator 559a) may not only be limited to two, as the number depends on a number of images to be processed.

The extractor 550 extracts feature points according to local features of each image. The feature points are distinctive keypoints in both images. The local features correspond to a pattern or structure detected in the image such as an edge or blob. In this embodiment, the extractor 550 extracts the features points for each of two images that are different from each other. These two images to be processed by the extractor 550 may be the images that have been generated using different image projection methods, or using the same image projection method. Unless the difference in projection methods cause highly distorted images, any desired image projection methods may be used.

The first area calculator 552 calculates the feature value fv1 based on the plurality of feature points fp1 in the equirectangular projection image EC. The first area calculator 552 further calculates the feature value fv2A based on the plurality of feature points fp2A in the planar image PA. The feature values, or feature points, may be detected in any desired method. However, it is desirable that feature values, or feature points, are invariant or robust to changes in scale or image rotation. The first area calculator 552 specifies corresponding points between the images, based on similarity between the feature value fv1 of the feature points fp1 in the equirectangular projection image EC, and the feature value fv2A of the feature points fp2A in the planar image PA. Here, the corresponding points are a plurality of feature points selected from the equirectangular projection image EC and the planar image PA in accordance with the similarity. Based on the corresponding points between the images, the first area calculator 552 calculates the homography for transformation between the equirectangular projection image EC and the planar image PA. The first area calculator 552 then applies first homography transformation to the planar image PA (S120). Accordingly, the first area calculator 552 obtains a first corresponding area CA1 ("first area CA1"), in the equirectangular projection image EC, which corresponds to the planar image PA. In such case, a central point CP1 of a rectangle (quadrilateral) defined by four vertices of the planar image PA, is converted to the point of gaze GP1 in the equirectangular projection image EC, by the first homography transformation.

Here, the coordinates of four vertices p1, p2, p3, and p4 of the planar image PA are p1=(x1, y1), p2=(x2, y2), p3=(x3, y3), and p4=(x4, y4). The first area calculator 552 calculates the central point CP1 (x, y) using the equation 2 below.

$$S1=\{(x4-x2)*(y1-y2)-(y4-y2)*(x1-x2)\}/2, S2=\{(x4-x2)*(y2-y3)-(y4-y2)*(x2-x3)\}/2, x=x1+(x3-x1)*S1/(S1+S2), y=y1+(y3-y1)*S1/(S1+S2)$$ (Equation 2)

While the planar image PA is a rectangle in the case of FIG. 22, the central point CP1 may be calculated using the equation 2 with an intersection of diagonal lines of the planar image PA, even when the planar image PA is a square, trapezoid, or rhombus. When the planar image PA has a shape of rectangle or square, the central point of the diagonal line may be set as the central point CP1. In such case, the central points of the diagonal lines of the vertices p1 and p3 are calculated, respectively, using the equation 3 below.

$$x=(x1+x3)/2, y=(y1+y3)/2$$ (Equation 3)

The point of gaze specifier 554 specifies the point (referred to as the point of gaze) in the equirectangular projection image EC, which corresponds to the central point CP1 of the planar image PA after the first homography transformation (S130).

Here, the point of gaze GP1 is expressed as a coordinate on the equirectangular projection image EC. The coordinate of the point of gaze GP1 may be transformed to the latitude and longitude. Specifically, a coordinate in the vertical direction of the equirectangular projection image EC is expressed as a latitude in the range of −90 degree (−0.5π) to +90 degree (+0.5π). Further, a coordinate in the horizontal direction of the equirectangular projection image EC is expressed as a longitude in the range of −180 degree (−π) to +180 degree (+π). With this transformation, the coordinate of each pixel, according to the image size of the equirectangular projection image EC, can be calculated from the latitude and longitude system.

The projection converter 556 extracts a peripheral area PeA, which is a portion surrounding the point of gaze GP1, from the equirectangular projection image EC. The projection converter 556 converts the peripheral area PeA, from the equirectangular projection to the perspective projection, to generate a peripheral area image PI (S140). The peripheral area PeA is determined, such that, after projection transformation, the square-shaped, peripheral area image PI has a vertical angle of view (or a horizontal angle of view), which is the same as the diagonal angle of view α of the planar image PA. Here, the central point CP2 of the peripheral area image PT corresponds to the point of gaze GP1.

(Transformation of Projection)

The following describes transformation of a projection, performed at S140 of FIG. 22, in detail. As described above referring to FIGS. 3 to 5, the equirectangular projection image EC covers a surface of the sphere CS, to generate the spherical image CE. Therefore, each pixel in the equirectangular projection image EC corresponds to each pixel in the surface of the sphere CS, that is, the three-dimensional, spherical image. The projection converter 556 applies the following transformation equation. Here, the coordinate system used for the equirectangular projection image EC is expressed with (latitude, longitude)=(ea, aa), and the rectangular coordinate system used for the three-dimensional sphere CS is expressed with (x, y, z).

$$(x,y,z)=(\cos(ea)\times\cos(aa),\cos(ea)\times\sin(aa),\sin(ea)),$$
wherein the sphere CS has a radius of 1. (Equation 4)

The planar image PA in perspective projection, is a two-dimensional image. When the planar image PA is represented by the two-dimensional polar coordinate system (moving radius, argument)=(r, a), the moving radius r, which corresponds to the diagonal angle of view α, has a value in the range from 0 to tan (diagonal angle view/2). That is, 0<=r<=tan(diagonal angle view/2). The planar image PA, which is represented by the two-dimensional rectangular coordinate system (u, v), can be expressed using the polar coordinate system (moving radius, argument)=(r, a) using the following transformation equation 5.

$$u=r\times\cos(a), v=r\times\sin(a)$$ (Equation 5)

The equation 5 is represented by the three-dimensional coordinate system (moving radius, polar angle, azimuth). For the surface of the sphere CS, the moving radius in the three-dimensional coordinate system is "1". The equirectangular projection image, which covers the surface of the sphere CS, is converted from the equirectangular projection to the perspective projection, using the following equations 6 and 7. Here, the equirectangular projection image is represented by the above-described two-dimensional polar coordinate system (moving radius, azimuth)=(r, a), and the virtual camera IC is located at the center of the sphere.

$$r=\tan(\text{polar angle})$$ (Equation 6)

$$a=\text{azimuth}$$ (Equation 7)

Assuming that the polar angle is t, Equation 6 can be expressed as: t=arctan(r).

Accordingly, the three-dimensional polar coordinate (moving radius, polar angle, azimuth) is expressed as (1, arctan(r),a).

The three-dimensional polar coordinate system is transformed into the rectangle coordinate system (x, y, z), using Equation 8.

$$(x,y,z)=(\sin(t)\times\cos(a),\sin(t)=\sin(a),\cos(t))$$ (Equation 8)

Equation 8 is applied to convert between the equirectangular projection image EC in equirectangular projection, and the planar image PA in perspective projection. More specifically, the moving radius r, which corresponds to the diagonal angle of view α of the planar image PA, is used to calculate transformation map coordinates, which indicate correspondence of a location of each pixel between the planar image PA and the equirectangular projection image EC. With this transformation map coordinates, the equirectangular projection image EC is transformed to generate the peripheral area image PI in perspective projection.

Through the above-described projection transformation, the coordinate (latitude=90°, longitude=0°) in the equirectangular projection image EC becomes the central point CP2 in the peripheral area image PI in perspective projection. In case of applying projection transformation to an arbitrary point in the equirectangular projection image EC as the point of gaze, the sphere CS covered with the equirectangular projection image EC is rotated such that the coordinate (latitude, longitude) of the point of gaze is positioned at (90°, 0°).

The sphere CS may be rotated using any known equation for rotating the coordinate.

(Determination of Peripheral Area Image)

Figure 23A:
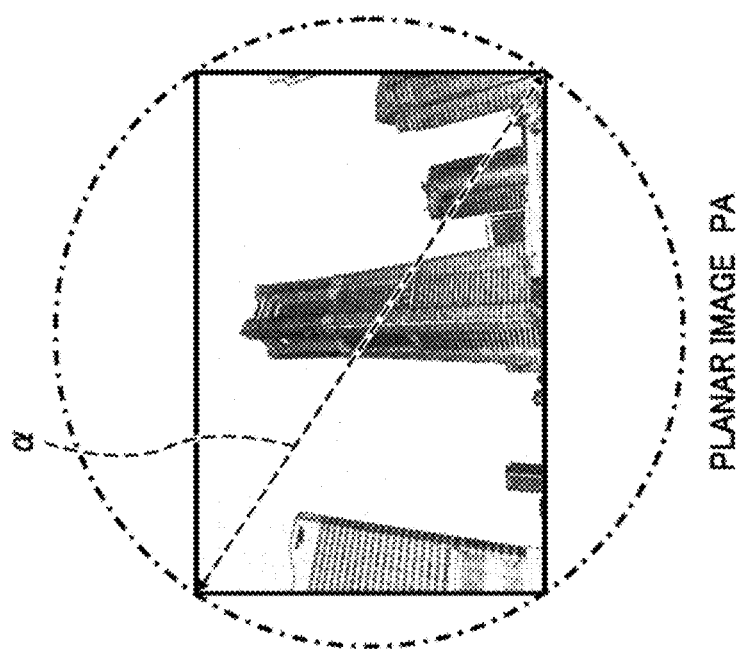
FIGS. 23A and 23B are conceptual diagrams for describing determination of a peripheral area image, according to the first embodiment.
Figure 23B:
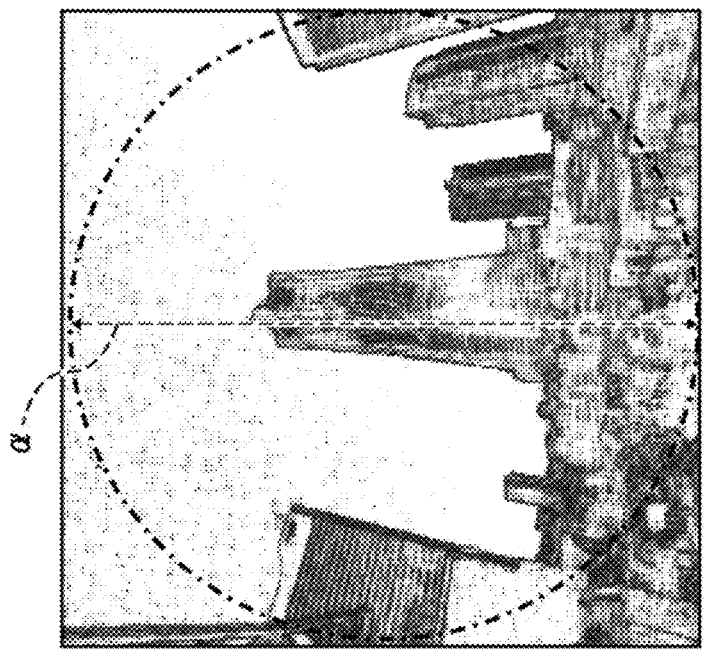

Next, referring to FIGS. 23A and 23B, determination of a peripheral area image P1 is described according to the embodiment. FIGS. 23A and 23B are conceptual diagrams for describing determination of the peripheral area image PI.

To enable the second area calculator 557a to determine correspondence between the planar image PA and the peripheral area image PI, it is desirable that the peripheral area image PI is sufficiently large to include the entire second area CA2. If the peripheral area image PI has a large size, the second area CA2 is included in such large-size area image. With the large-size peripheral area image PI, however, the time required for processing increases as there are a large number of pixels subject to similarity calculation. For this reasons, the peripheral area image PI should be a minimum-size image area including at least the entire second area CA2. In this embodiment, the peripheral area image PI is determined as follows.

More specifically, the peripheral area image PI is determined using the 35 mm equivalent focal length of the planar image, which is obtained from the Exif data recorded when the image is captured. Since the 35 mm equivalent focal length is a focal length corresponding to the 24 mm×36 mm film size, it can be calculated from the diagonal and the focal length of the 24 mm×36 mm film, using Equations 9 and 10.

$$\text{film diagonal}=\text{sqrt}(24*24+36*36)$$ (Equation 9)

angle of view of the image to be combined/2=arctan
((film diagonal/2)/35 mm equivalent focal
length of the image to be combined) (Equation 10)

The image with this angle of view has a circular shape. Since the actual imaging element (film) has a rectangular shape, the image taken with the imaging element is a rectangle that is inscribed in such circle. In this embodiment, the peripheral area image PI is determined such that, a vertical angle of view α of the peripheral area image PI is made equal to a diagonal angle of view α of the planar image PA. That is, the peripheral area image PI illustrated in FIG. 23B is a rectangle, circumscribed around a circle containing the diagonal angle of view α of the planar image PA illustrated in FIG. 23A. The vertical angle of view α is calculated from the diagonal angle of a square and the focal length of the planar image P, using Equations 11 and 12.

angle of view of square=sqrt(film diagonal*film
diagonal+film diagonal*film diagonal) (Equation 11)

vertical angle of view α/2=arctan((angle of view of
square/2)/35 mm equivalent focal length of planar image)) (Equation 12)

The calculated vertical angle of view α is used to obtain the peripheral area image PI in perspective projection, through projection transformation. The obtained peripheral area image PI at least contains an image having the diagonal angle of view α of the planar image PA while centering on the point of gaze, but has the vertical angle of view α that is kept small as possible.

Referring back to FIG. 16, the second area calculator 557a calculates the feature values fv2A of a plurality of feature points fp2A in the planar image PA and feature values fv3A of a plurality of feature points fp3A in the peripheral area image PI. The second area calculator 557a identifies corresponding points between the planar image PA and the peripheral area image PI based on the similarity between the calculated feature values fv2A and the calculated feature values fv3A. Based on the calculated corresponding points between the two images, the second area calculator 557a computes a homography for transformation between the planar image PA and the peripheral area image PI. The second area calculator 557a uses the computed homography for transformation to perform second homography transformation. As a result of the second homography transformation, the second area calculator 557a calculates the second area CA2 (S160). The corresponding points are a plurality of feature points selected from the planar image PA and the peripheral area image PI in accordance with the similarity.

The third area calculator 559a calculates feature values fv2B of a plurality of feature points fp2B in the planar image PB and the feature values fv2A of the plurality of feature points fp2A in the planar image PA. The third area calculator 559a calculates corresponding points between the planar image PB and the planar image PA based on the similarity between the calculated feature values fv2B and the calculated feature values fv2A. Based on the calculated corresponding points between the two images, the third area calculator 559a computes a homography for transformation between the planar image PB and the planar image PA. The third area calculator 559a uses the computed homography for transformation to perform third homography transformation. As a result of the third homography transformation, the third area calculator 559a calculates a third corresponding area CA3 ("third area CA3").

The superimposition relationship metadata generator 558 generates superimposition relationship metadata for the planar image PA illustrated in FIG. 17 (referred to as the superimposition relationship metadata (1)), based on the second area CA2 calculated by the second area calculator 557a. The superimposition relationship metadata generator 558 further generates superimposition relationship metadata for the planar image PB illustrated in FIG. 18 (referred to as the superimposed relationship metadata (2)), based on the third area CA3 calculated by the third area calculator 559a.

(Superimposition Relationship Metadata (1))

FIG. 17 illustrates a data configuration of the superimposition relationship metadata (1), which is generated when the parent image is a spherical image and the child image is a planar image. As illustrated in FIG. 17, the superimposition relationship metadata (1) includes parent image information, target image identification (ID) information, superimposed location calculation information, and metadata generation information. The target image ID information, the superimposed location calculation information, and the metadata generation information are information on the target image (subject image) to be processed.

The parent image information is information on the parent image such as an image on which the target image is to be superimposed. The parent image information includes information identifying the parent image such as the image ID of the parent image, and information on the projection method (projective space) of the parent image.

The target image ID information is information on the target image (subject image) such as the superimposed image. The target image ID information includes information identifying the target image such as the image ID of the target image, and information on the projection method of the target image.

The superimposed location calculation information includes superimposed location calculation image information and superimposed location transformation information. The superimposed location calculation image information includes parent image information and target image information. The parent image information includes the image size of the parent image, and generation information for the parent image in equirectangular projection. The image size is the size of the peripheral area image PI described below, for example, which is obtained when superimposed location transformation information described below is calculated. The generation information includes the point of gaze (in degrees), the angle of view (in degrees), and position correction information (in degrees) (Pitch, Yaw, Roll). The point of gaze (in degrees) is, for example, a point of gaze CP2 illustrated in FIG. 22 described below. The angle of view (in degrees) is, for example, the diagonal angle of view (vertical angle of view) illustrated in FIGS. 23A and 23B described below. The position correction information (in degrees) is zenith correction information of the special image capturing device 1. The target image information indicates, for example, the image size of the target image, which is the planar image PA illustrated in FIG. 22.

The superimposed location transformation information indicates a transformation matrix corresponding to a second homography.

The metadata generation information indicates the version of the superimposition relationship metadata.

The superimposition relationship metadata (1) includes parent image information as information for identifying a parent image, and target image ID information as information for identifying a target image (subject image). Examples of the image identifier include a file name, a universally unique identifier (UUID), and a Uniform Resource Identifier (URI). The file name is available when the image is managed in a computer of an individual. To specify a file from a large number of unspecified images, typically, the unique ID is specified. In this case, UUID may be used or URI may be recorded as a resource on a network. In the illustrated example, the file name is used. The target image ID information (image ID) that identifies the subject image and parent image information (image ID) that identifies the parent image are used to provide information indicating two images as a parent and a child. Further, information on the projection methods of the parent image and the subject image is stored as described below.

Transformation for projecting a certain plane onto another plane is referred to as homography. The transformation is expressed using a simple 33 matrix. Also in this embodiment, homography is used to represent the relationship (projection) between corresponding positions in a parent image and a child image. When the projection types of the parent image and the child image are both perspective projection, the corresponding positions in the parent image and the child image can be represented using plane-to-plane projection, that is, using homography, if parallax between the parent image and the child image or distortion of the parent image and the child image are ignored. For the reason described above, the respective projection methods of the two images are stored as information. In addition, a transformation matrix is stored as superimposed location transformation information for mapping the child image to the parent image. A homography between two perspective projection images may be determined by using a known technique, namely, extracting feature points from the two images and matching corresponding feature points to estimate planes. Alternatively, if the two images have no large parallax, template matching may be applied to estimate the corresponding plane of the child image, which corresponds to the plane of the parent image. The correspondence between the parent image and the child image is represented as homography, which has the following advantage: when the correspondence between the parent image and a parent-of-parent (grandparent) image is also represented by using homography, the correspondence between the child image and the parent-of-parent image is also represented by using homography.

Equirectangular projection is a technique of projection used to represent a 360-degree omnidirectional image. Equirectangular projection is used in map creation or as a form of an image to be output from a 360-degree full spherical camera. When the child image is based on perspective projection and the parent image is based on equirectangular projection, the correspondence between the parent image and the child image is difficult to represent using homography. To address this difficulty, a portion of an equirectangular projection image, which is the parent image, is converted into a perspective projection image, and the homography of the obtained perspective projection image is stored together with parent image information. The parent image information is obtained when a portion of the equirectangular projection image is converted into a perspective projection image, and includes the image size, the point of gaze, the angle of view, and position information ("positioning correction"). The inventors have disclosed a method for calculating and recording the relationship in position between corresponding areas in a background image (a parent image) and a foreground image (child image) when the background image and the foreground image are based on different projection methods. The disclosed method includes mutual transformation between equirectangular projection and perspective projection. Once the point of gaze, the angle of view, and the image size are determined, the position in an equirectangular projection image to which a position in a perspective projection image generated from the equirectangular projection image corresponds can be calculated. When images are actually superimposed on each other, data indicating positions in the background image corresponding to all the pixels in the foreground image is not generated, but the foreground image is divided into a suitable number of horizontal and vertical grids or meshes and the coordinates of each of the grids is calculated as latitude and longitude coordinates on the background image, which is an image based on equirectangular projection.

(Superimposition Relationship Metadata (2))

FIG. 18 illustrates a data configuration of the superimposition relationship metadata (2), which is generated when the parent image is a planar image and the child image is also a planar image. As illustrated in FIG. 18, the superimposition relationship metadata (2) basically has a similar data structure to the superimposition relationship metadata (1). The superimposition relationship metadata (2) includes parent image information, target image ID information, superimposed location calculation information, and metadata generation information. The target image ID information, the superimposed location calculation information, and the metadata generation information are information on the target image.

The image size in the parent image information indicates the image size of the entire planar image PA illustrated in FIG. 22, for example. The generation information for the parent image in equirectangular projection is null, as the parent image is not in equirectangular projection. The image size in the target image information corresponds to the image size of the entire planar image PB illustrated in FIG. 22, for example. The superimposed location transformation information indicates a transformation matrix for a third homography.

In the above-described transformation, in order to increase the calculation speed, an image size of at least one of the planar image PA, the planar image PB, and the equirectangular projection image EC may be changed, before applying the homography transformation. For example, assuming that the planar image PA has 40 million pixels, and the equirectangular projection image EC has 30 million pixels, the planar image PA may be reduced in size to 30 million pixels. Alternatively, both of the planar image PA and the equirectangular projection image EC may be reduced in size to 10 million pixels. Similarly, an image size of at least one of the planar image PA and the peripheral area image PI may be changed, before applying the second homography transformation.

(Functional Configuration of Display Data Generator)

The display data generator 55a2 includes a second area calculator 557b, a third area calculator 559b, an area divider 560, a projection reverse converter 562, a shape converter 564, a correction parameter generator 566, and a superimposed display data generator 570. If the brightness or color is not to be corrected, none of the shape converter 564 and the correction parameter generator 566 has to be provided.

The second area calculator 557b uses a homography similar to that used by the second area calculator 557a for transformation to perform second homography transformation.

Figure 24B:
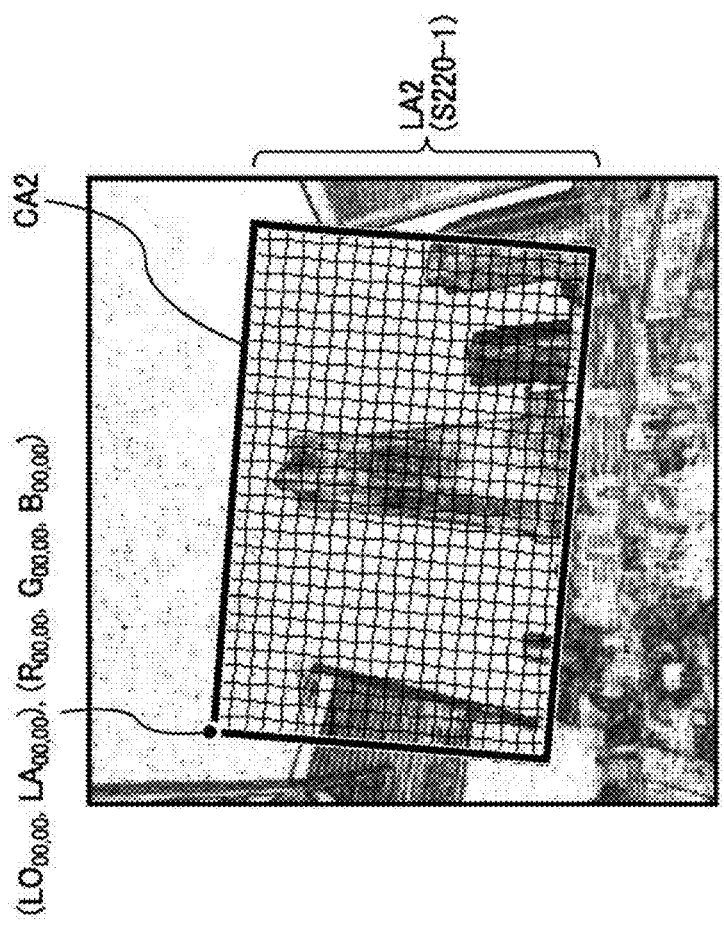
FIGS. 24A and 24B are conceptual diagrams for explaining operation of dividing the second area into a plurality of grid areas, according to the first embodiment.
Figure 24A:
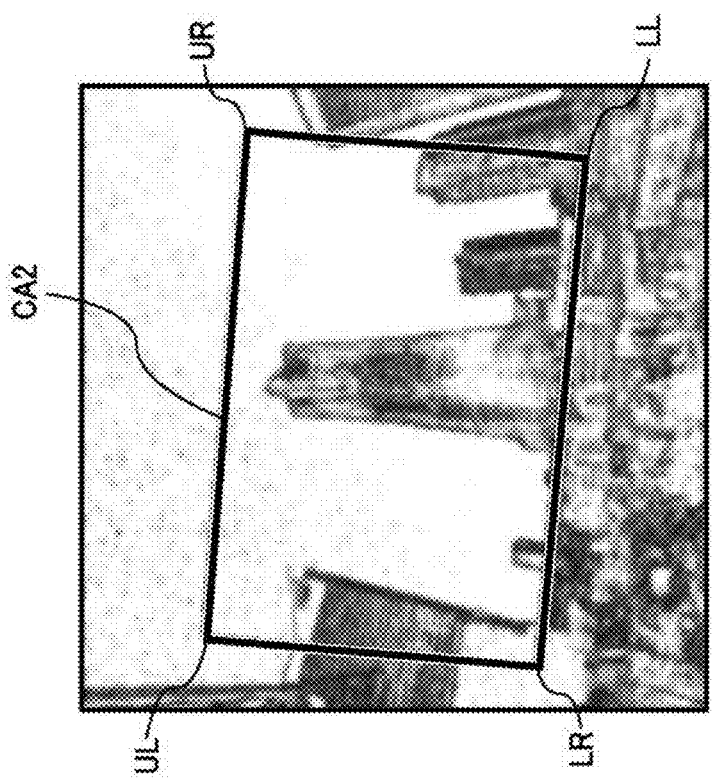

The third area calculator 559b uses a homography similar to that used by the third area calculator 559a for transformation to perform third homography transformation. The area divider 560 divides a part of the image into a plurality of grid areas. A method for dividing the second area CA2 into a plurality of grid areas is described in detail with reference to FIGS. 24A and 24B. FIGS. 24A and 24B are conceptual diagrams illustrating the division of the second area CA2 into a plurality of grid areas.

As illustrated in FIG. 24A, the second area CA2 is a rectangular area having four vertices with coordinates equal to the vertex coordinates of to the second area CA2, which are calculated by the second area calculator 557a through the second homography transformation. As illustrated in FIG. 24B, the area divider 560 divides the second area CA2 into a plurality of grid areas LA2. For example, the second area CA2 is equally divided into about 30 horizontal grid areas and about 20 vertical grid areas.

Next, dividing the second area CA2 into the plurality of grid areas LA2 is explained in detail.

The second area CA2 is equally divided using the following equation. Assuming that a line connecting two points, $A(X1, Y1)$ and $B(X2, Y2)$, is to be equally divided into "n" coordinates, the coordinate of a point Pm that is the "m"th point counted from the point A is calculated using the equation 13.

$$Pm=(X1+(X2-X1)\times m/n, Y1+(Y2-Y1)\times m/n) \quad \text{(Equation 13)}$$

With Equation 13, the line can be equally divided into a plurality of coordinates. The upper line and the lower line of the rectangle are each divided into a plurality of coordinates, to generate a plurality of lines connecting corresponding coordinates of the upper line and the lower line. The generated lines are each divided into a plurality of coordinates, to further generate a plurality of lines. Here, coordinates of points (vertices) of the upper left, upper right, lower right, and lower left of the rectangle are respectively represented by TL, TR, BR, and BL. The line connecting TL and TR, and the line connecting BR and BL are each equally divided into 30 coordinates (0 to 30th coordinates). Next, each of the lines connecting corresponding 0 to 30th coordinates of the TL-TR line and the BR-BL line, is equally divided into 20 coordinates. Accordingly, the rectangular area is divided into 30×20, sub-areas. FIG. 24B shows an example case of the coordinate ($LO_{00,00}$, $LA_{00,00}$) of the upper left point TL. Similar division processing is applied to the fourth area CA4.

Referring back to FIGS. 16 and 22, the projection reverse converter 562 reversely converts the projection (projective space) of the second area CA2 to equirectangular projection, which is the same as the projection of the equirectangular projection image EC. With this projection transformation, a first specific corresponding area CA11 in the equirectangular projection image EC, which corresponds to the second area CA2, is determined. Specifically, the projection reverse converter 562 determines the first specific corresponding area CA11 in the equirectangular projection image EC, which contains a plurality of grid areas LAA corresponding to the plurality of grid areas LA2 in the second area CA2. FIG. 25 illustrates an enlarged view of the first specific corresponding area CA11 illustrated in FIG. 22. FIG. 25 is a conceptual diagram for explaining determination of the first specific corresponding area CA11 in the equirectangular projection image EC. The planar image PA is superimposed on the spherical image CE, which is generated from the equirectangular projection image EC, so as to fit in (or mapped to) the first specific corresponding area CA11. Through the processing performed by the projection reverse converter 562, a location parameter is generated, which indicates the coordinates of each grid in the grid areas LAA. The location parameter is illustrated in FIGS. 19 and 20B. In this example, the gird may be referred to as a single point of a plurality of points.

As described above, the location parameter is generated, which is used to calculate the correspondence of each pixel between the equirectangular projection image EC and the planar image PA.

Although the planar image PA is superimposed on the equirectangular projection image EC at a right location with the location parameter, these image EC and image PA may vary in brightness or color (such as tone), causing an unnatural look. The shape converter 564 and the correction parameter generator 566 are provided to avoid this unnatural look, even when these images that differ in brightness and color, are partly superimposed one above the other.

Figure 26A:
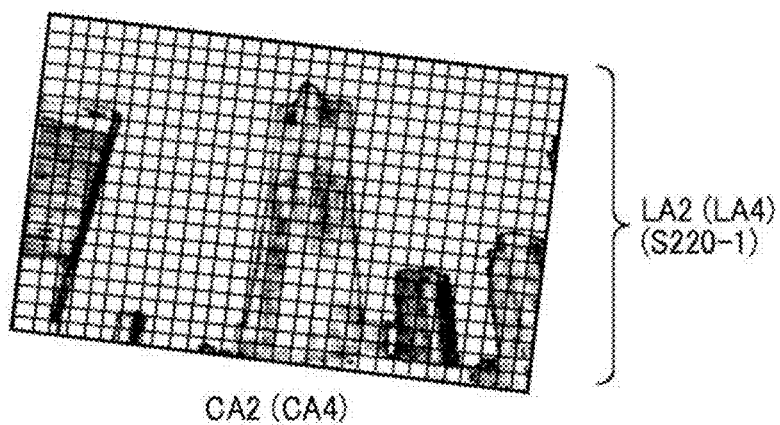
FIGS. 26A, 26B, and 26C are conceptual diagrams illustrating operation of generating a correction parameter, according to the first embodiment.

Before applying color correction, the shape converter 564 converts the second area CA2 to have a shape that is the same as the shape of the planar image PA. To made the shape equal, the shape converter 564 maps four vertices of the second area CA2, on corresponding four vertices of the planar image PA. More specifically, the shape of the second area CA2 is made equal to the shape of the planar image PA, such that each grid area LA2 in the second area CA2 illustrated in FIG. 26A, is located at the same position of each grid area LAA in the planar image PA illustrated in FIG. 26C. That is, a shape of the second area CA2 illustrated in FIG. 26A is converted to a shape of the second area CA2' illustrated in FIG. 26B. As each grid area LA2 is converted to the corresponding grid area LA2', the grid area LA2' becomes equal in shape to the corresponding grid area LAA in the planar image P. Similar conversion processing is applied to the fourth area CA4.

The correction parameter generator 566 generates a correction parameter for correcting the grid areas LA2' in the second area CA2', which has the same shape as the grid areas LAA in the planar image PA, such that the grid areas LA2' and the grid areas LAA are equal in brightness and color. Specifically, the correction parameter generator 566 specifies four grid areas LAA having one common grid, and calculates an average a=($R_{ave}$, $G_{ave}$, $B_{ave}$) of the brightness and color values (R, G, B) of all the pixels included in the specified four grid areas LAA. Similarly, the correction parameter generator 566 specifies four grid areas LA2' having one common grid, and calculates an average a'= ($R'_{ave}$, $G'_{ave}$, $B'_{ave}$) of the brightness and color values (R', G', B') of all the pixels included in the specified four grid areas LA2'. If one grid in each of the grid areas LA2' and one grid in each of the grid areas LAA respectively correspond to one of the four vertices of the second area CA2 and one of the four vertices of the planar image PA, the correction parameter generator 566 calculates the average a of the brightness and color values of the pixels included in one of the grid areas LAA and the average a' of the brightness and color values of the pixels included in one of the grid areas LA2'. If one grid in each of the grid areas LA2' and one grid in each of the grid areas LAA are respectively included in the outer edge of the second area CA2 and the outer edge of the planar image PA, the correction parameter generator 566 calculates the average a and the average a' of the brightness and color values of the pixels included in two inner grid areas. In this embodiment, the correction parameter is used as gain data for correcting the brightness and color value of the planar image PA. Accordingly, as given in Equation 14 below, the average a' is divided by the average a to determine a correction parameter Pa.

$$Pa = a'/a \quad \text{(Equation 14)}$$

When the superimposed image, described below, is displayed, each of the grid areas LAA is multiplied by the gain value represented by the correction parameter. Accordingly, the color tone and brightness of the planar image PA are corrected to be close to those indicated by the pixel values of the equirectangular projection image EC (the spherical image CE). This allows a displayed superimposed image to look natural. In addition to or in alternative to the average, the median or mode of the brightness and color of pixels may be used to calculate the correction parameter.

In this embodiment, the values (R, G, B) are used to calculate the brightness and color of each pixel. Alternatively, any other color space may be used to obtain the brigtness and color, such as brightness and color difference using YUV, and brigtness and color difference using sYCC (YCbCr) according to the JPEG. The color space may be converted from RGB, to YUV, or to sYCC (YCbCr), using any desired known method. For example, RGB, in compliance with JPEG file interchange format (JFIF), may be converted to YCbCr, using Equation 15.

$$\begin{pmatrix} Y \\ Cb \\ Cr \end{pmatrix} = \begin{pmatrix} 0.299 & 0.587 & 0.114 \\ -0.1687 & -0.3313 & 0.5 \\ 0.5 & -0.4187 & -0.0813 \end{pmatrix} \begin{pmatrix} R \\ G \\ B \end{pmatrix} + \begin{pmatrix} 0 \\ 128 \\ 128 \end{pmatrix}$$ (Equation 15)

The superimposed display data generator 570 generates superimposed display data indicating a location at which the planar image P is superimposed on the spherical image CE, and correction values for the brightness and color values of pixels by using the location parameter and the correction parameter. Similar generation processing is applied to the fourth area CA4.

The third area calculator 559b extracts the superimposition relationship metadata (2) indicating the superimposition relationship between the planar images PA and PB, and analyzes the information identifying the parent image, which is included in the superimposition relationship metadata (2), to determine that the parent image is the planar image PA. Further, the third area calculator 559b obtains the superimposed location calculation information (superimposed location calculation image information and superimposed location transformation information) of the planar image PA and the planar image PB. Then, the third area calculator 559b obtains superimposition relationship metadata of the parent image. As described above, the parent image is identified using the file name or ID information stored in the information identifying the parent image, which is included in the superimposition relationship metadata (1). The file name or ID information is used as a key to obtain the superimposition relationship metadata of the parent image. The superimposition relationship metadata, which is managed in a PC of an individual, may be obtained simply as a file. The superimposition relationship metadata, which is managed in a cloud server, may be obtained by using ID information as a key. In this example, the superimposition relationship metadata (1) is obtained and is analyzed. As a result of the analysis, the parent image is identified as the equirectangular projection image EC, and the parent image is determined to be based on equirectangular projection. The parent image information in the superimposed location calculation information includes the point of gaze, the angle of view, and the image size when the perspective projection image (the peripheral area image PI) is generated from the equirectangular projection image EC. Accordingly, the superimposed location transformation information (homography) and the image sizes included in each of the superimposition relationship metadata (1) and the superimposition relationship metadata (2) are used to convert the area information of the planar images PA and PB into area information of a perspective projection image generated from the equirectangular projection image EC. Then, the converted corresponding areas are divided into grids by the area divider 560, and location information of the grids is determined. The determined location information is converted into location information of the equirectangular projection image EC as a first location parameter and a second location parameter by using the points of gaze and the angles of view obtained in the superimposition relationship metadata (1) and the superimposition relationship metadata (2) by the projection reverse converter 562. Then, the shape converter 564 converts the shape into the desired shape by using the location information (that is, the first location parameter and the second location parameter) of the grids obtained by the area divider 560. The correction parameter generator 566 compares corresponding areas between the perspective projection image generated from the equirectangular projection image EC, which is defined by the desired shape, and each one of the planar image PA and the planar image PB in terms of the brightness or color to determine a first correction parameter and second correction parameter, and stores the determined first and second correction parameters in any desired memory. The generated first and second location parameters and the generated first and second correction parameter are used to superimpose images on each other.

(Superimposed Display Data)

The following describes a data structure of the superimposed display data with reference to FIG. 19. FIG. 19 illustrates a data structure of the superimposed display data.

As illustrated in FIG. 19, the superimposed display data includes planar image information and superimposed display information.

The planar image information is information transmitted from the generic image capturing device 3 together with captured image data. The planar image information includes an image identifier (image ID) and attribute data of the captured image data. The image identifier included in the planar image information is used to identify the planar image P (planar image PA or PB). In FIG. 19, the file name of an image is used as an example of an image identifier. Alternatively, an image ID for identifying an image may be used.

The attribute data included in the planar image information is information related to the planar image P. In FIG. 19, the planar image information includes a 35 mm equivalent focal length value as an example of attribute data. The 35 mm equivalent focal length value is optional to superimpose and display the planar image P on the spherical image CE. However, the 35 mm equivalent focal length value may be referred to when an angle of view for displaying a superimposed image is determined, and is used by way of example.

The superimposed display information is information generated by the smart phone 5. The superimposed display information includes area division number information, the coordinates of grids in each grid area (location parameter), and correction values for the brightness and color values (correction parameter). The area division number information indicates the number of horizontal (longitude) grid areas into which the first area CA1 is divided and the number of vertical (latitude) grid areas into which the first area CA1 is divided. The area division number information is referred to when dividing the first area CA1 into a plurality of grid areas.

The location parameter is mapping information, which indicates, for each grid in each grid area of the planar image P, a location in the equirectangular projection image EC. For example, the location parameter associates a location of each grid in each grid area in the equirectangular projection image EC, with each grid in each grid area in the planar image P. The correction parameter, in this example, is gain data for correcting color values of the planar image P. Since the target to be corrected may be a monochrome image, the correction parameter may be used only to correct the brightness value. Accordingly, at least the brightness of the image is to be corrected using the correction parameter.

The perspective projection, which is used for capturing the planar image P, is not applicable to capturing the 360-degree omnidirectional image, such as the spherical image CE. The wide-angle image, such as the spherical image, is often captured in equirectangular projection. In equirectangular projection, like Mercator projection, the distance between lines in the horizontal direction increases away from the standard parallel. This results in generation of the image, which looks very different from the image taken with the general-purpose camera in perspective projection. If the planar image P, superimposed on the spherical image CE, is displayed, the planar image P and the spherical image CE that differ in projection, look different from each other. Even scaling is made equal between these images, the planar image P does not fit in the spherical image CE. In view of the above, the location parameter is generated as described above referring to FIG. 22.

The location parameter and the correction parameter are described in detail with reference to FIGS. 20A and 20B. FIG. 20A is a conceptual diagram illustrating a plurality of grid areas in the second area CA2 according to the embodiment. FIG. 20B is a conceptual diagram illustrating a plurality of grid areas in the first specific corresponding area CA11 according to the embodiment.

The first area CA1, which is a portion of the equirectangular projection image EC, is converted into the second area CA2 in perspective projection, which is the same projection with the projection of the planar image P. As illustrated in FIG. 20A, the second area CA2 is divided into 30 grid areas in the horizontal direction, and 20 grid areas in the vertical direction, resulting in 600 grid areas in total. In FIG. 20A, the coordinates of the grids in the grid areas are denoted by $(LO_{00,00}, LA_{00,00})$, $(LO_{01,00}, LA_{01,00})$, . . . , and $(LO_{30,20}, LA_{30,20})$, and the correction values for the brightness and color values of the grids in the grid areas are denoted by $(R_{00,00}, G_{00,00}, B_{00,00})$, $(R_{00,00}, G_{01,00}, B_{01,00})$, . . . , and $(R_{30,20}, G_{30,20}, B_{30,20})$. For simplicity, in FIG. 20A, only four vertices (grids) are each shown with the coordinate value, and the correction value for brightness and color. However, the coordinate value and the correction value for brightness and color, are assigned to each of all girds. The correction values R, G, B for brightness and color, corresponds to correction gains for red, green, and blue, respectively. In this example, the correction values R, G, B for brightness and color, are generated for a predetermined area centering on a specific grid. The specific grid is selected, such that the predetermined area of such grid does not overlap with a predetermined area of an adjacent specific gird.

As illustrated in FIG. 20B, the second area CA2 is reversely converted to the first specific corresponding area CA11 in equirectangular projection, which is the same projection with the projection of the equirectangular projection image EC. In this embodiment, the first specific corresponding area CA11 is equally divided into 30 grid areas in the horizontal direction, and 20 grid areas in the vertical direction, resulting in 600 grid areas in total. Referring to FIG. 20B, the coordinate of each grid in each area can be expressed by $(LO'_{00,00}, LA'_{00,00})$, $(LO'_{01,00}, LA'_{01,00})$, $(LO'_{30,20}, LA'_{30,20})$. The correction values of brightness and color of each grid in each grid area are the same as the correction values of brightness and color of each grid in each grid area in the second area CA2. For simplicity, in FIG. 20B, only four vertices (grids) are each shown with the coordinate value, and the correction value for brightness and color. However, the coordinate value and the correction value for brightness and color, are assigned to each of all girds.

As described above, the location parameter indicates correspondence of pixel positions, between the planar image P and the equirectangular projection image EC (spherical image CE). If such correspondence information is to be provided for all pixels, data for about 40 million pixels is needed in case the generic image capturing device 3 is a high-resolution digital camera. This increases processing load due to the increased data size of the location parameter. In view of this, in this embodiment, the planar image P is divided into 600 (30×20) grid areas. The location parameter indicates correspondence of each gird in each of 600 grid areas, between the planar image P and the equirectangular projection image EC (spherical image CE). When displaying the superimposed images by the smart phone 5, the smart phone 5 may interpolate the pixels in each grid area based on the coordinate of each grid in that grid area. Accordingly, the smart phone 5 can display the superimposed image. The relationship between a fourth corresponding area CA4 and a second specific corresponding area CA12, described below, is similar to the relationship between the second area CA2 and the first specific corresponding area CA11.

(Functional Configuration of Superimposing Unit)

Referring to FIG. 16, a functional configuration of the superimposing unit 55b is described according to the embodiment. The superimposing unit 55b includes a superimposed area generator 582, a correction unit 584, an image generator 586, an image superimposing unit 588, and a projection converter 590.

The superimposed area generator 582 specifies a portion of the virtual sphere CS, which corresponds to the first specific corresponding area CA11, to generate a partial sphere PS.

The correction unit 584 corrects the brightness and color of the planar image P, using the correction parameter of the superimposed display data, to match the brightness and color of the equirectangular projection image EC. The correction unit 584 may not always perform correction on brightness and color. In one example, the correction unit 584 may only correct the brightness of the planar image P using the correction parameter.

The image generator 586 superimposes (maps) the planar image P (or the corrected image C of the planar image P), on the partial sphere PS to generate an image to be superimposed on the spherical image CE, which is referred to as a superimposed image S for simplicity. The image generator 586 generates mask data M, based on a surface area of the partial sphere PS. The image generator 586 covers (attaches) the equirectangular projection image EC, over the sphere CS, to generate the spherical image CE.

The mask data M, having information indicating the degree of transparency, is referred to when superimposing the superimposed image S on the spherical image CE. The mask data M sets the degree of transparency for each pixel, or a set of pixels, such that the degree of transparency increases from the center of the superimposed image S toward the boundary of the superimposed image S with the spherical image CE. With this mask data M, the pixels around the center of the superimposed image S have brightness and color of the superimposed image S, and the pixels near the boundary between the superimposed image S and the spherical image CE have brightness and color of the spherical image CE. Accordingly, superimposition of the superimposed image S on the spherical image CE is made unnoticeable. However, application of the mask data M can be made optional, such that the mask data M does not have to be generated.

The image superimposing unit 588 superimposes the superimposed image S and the mask data M, on the spherical image CE. The image is generated, in which the high-definition superimposed image S is superimposed on the low-definition spherical image CE.

As illustrated in FIG. 7, the projection converter 590 converts projection, such that the predetermined area T of the spherical image CE, with the superimposed image S being superimposed, is displayed on the display 517, for example, in response to a user instruction for display. The projection transformation is performed based on the line of sight of the user (the direction of the virtual camera IC, represented by the central point CP of the predetermined area T), and the angle of view α of the predetermined area T. In projection transformation, the projection converter 590 converts a resolution of the predetermined area T, to match with a resolution of a display area of the display 517. Specifically, when the resolution of the predetermined area T is less than the resolution of the display area of the display 517, the projection converter 590 enlarges a size of the predetermined area T to match the display area of the display 517. In contrary, when the resolution of the predetermined area T is greater than the resolution of the display area of the display 517, the projection converter 590 reduces a size of the predetermined area T to match the display area of the display 517. Accordingly, the display control 56 displays the predetermined-area image Q, that is, the image of the predetermined area T, in the entire display area of the display 517.

<<Operation According to Embodiment>>

Referring now to FIGS. 21 to 36D, operation of capturing the image and displaying the image, performed by the image capturing system, according to this embodiment is described. First, referring to FIG. 21, operation of capturing the image, performed by the image capturing system, is described according to the embodiment. FIG. 21 is a data sequence diagram illustrating operation of capturing the image, according to the embodiment. The following describes the example case in which the object and surroundings of the object are captured. However, in addition to capturing the object, audio may be recorded by the audio collection unit 14 as the captured image is being generated.

As illustrated in FIG. 21, the acceptance unit 52 of the smart phone 5 accepts a user instruction to start linked image capturing (S11). In response to the user instruction to start linked image capturing, the display control 56 controls the display 517 to display a linked image capturing device configuration screen as illustrated in FIG. 15B. The screen of FIG. 15B includes, for each image capturing device available for use, a radio button to be selected when the image capturing device is selected as a main device, and a check box to be selected when the image capturing device is selected as a sub device. The screen of FIG. 15B further displays, for each image capturing device available for use, a device name and a received signal intensity level of the image capturing device. Assuming that the user selects one image capturing device as a main device, and other image capturing device as a sub device, and presses the "Confirm" key, the acceptance unit 52 of the smart phone 5 accepts the instruction for starting linked image capturing. In this example, more than one image capturing device may be selected as the sub device. For this reasons, more than one check box may be selected.

The short-range communication unit 58 of the smart phone 5 sends a polling inquiry to start image capturing, to the short-range communication unit 38 of the generic image capturing device 3 (S12). The short-range communication unit 38 of the generic image capturing device 3 receives the inquiry to start image capturing.

The determiner 37 of the generic image capturing device 3 determines whether image capturing has started, according to whether the acceptance unit 32 has accepted pressing of the shutter button 315a by the user (S13).

The short-range communication unit 38 of the generic image capturing device 3 transmits a response based on a result of the determination at S13, to the smart phone 5 (S14). When it is determined that image capturing has started at S13, the response indicates that image capturing has started. In such case, the response includes an image identifier of the image being captured with the generic image capturing device 3. In contrary, when it is determined that the image capturing has not started at S13, the response indicates that it is waiting to start image capturing. The short-range communication unit 58 of the smart phone 5 receives the response.

The description continues, assuming that the determination indicates that image capturing has started at S13 and the response indicating that image capturing has started is transmitted at S14.

The generic image capturing device 3 starts capturing the image (S15). The processing of S15, which is performed after pressing of the shutter button 315a, includes capturing the object and surroundings to generate captured image data (planar image data) with the image capturing unit 33, and storing the captured image data in the memory 3000 with the storing and reading unit 39. In this example, it is assumed that more than one planar image is captured.

At the smart phone 5, the short-range communication unit 58 transmits an image capturing start request, which requests to start image capturing, to the special image capturing device 1 (S16). The short-range communication unit 18 of the special image capturing device 1 receives the image capturing start request.

The special image capturing device 1 starts capturing the image (S17). Specifically, at S17, the image capturing unit 13 captures the object and surroundings to generate captured image data, i.e., two hemispherical images as illustrated in FIGS. 3A and 3B. The image and audio processing unit 15 then generates one equirectangular projection image as illustrated in FIG. 3C, based on these two hemispherical images. The storing and reading unit 19 stores data of the equirectangular projection image in the memory 1000.

At the smart phone 5, the short-range communication unit 58 transmits a request to transmit a captured image ("captured image request") to the generic image capturing device 3 (S18). The captured image request includes the image identifier received at S14. The short-range communication unit 38 of the generic image capturing device 3 receives the captured image request.

The short-range communication unit 38 of the generic image capturing device 3 transmits planar image data, obtained at S15, to the smart phone 5 (S19). With the planar image data, the image identifier for identifying the planar image data, and attribute data, are transmitted. The image identifier and attribute data of the planar image, are a part of planar image information illustrated in FIG. 19. The short-range communication unit 58 of the smart phone 5 receives the planar image data, the image identifier, and the attribute data. Since a plurality of planar images is obtained in this example, the image identifier and attribute data are transmitted for each of the planar images.

The short-range communication unit 18 of the special image capturing device 1 transmits the equirectangular projection image data, obtained at S17, to the smart phone 5 (S20). With the equirectangular projection image data, the image identifier for identifying the equirectangular projection image data, and attribute data, are transmitted. As illustrated in FIG. 19, the image identifier and the attribute data are a part of the equirectangular projection image information. The short-range communication unit 58 of the smart phone 5 receives the equirectangular projection image data, the image identifier, and the attribute data.

Next, the storing and reading unit 59 of the smart phone 5 stores the planar image data received at S19, and the equirectangular projection image data received at S20, in the same folder in the memory 5000 (S21).

Next, the image and audio processing unit 55 of the smart phone 5 generates superimposition relationship metadata, which is used to display an image where the planar image P (for example, the planar images PA and PB) is partly superimposed on the spherical image CE (S22). Here, the planar image P (any one of the planar images PA and PB) is a high-definition image, and the spherical image CE is a low-definition image. The storing and reading unit 59 stores the superimposition relationship metadata in the memory 5000.

Referring to FIGS. 22 to 26, operation of generating superimposition relationship metadata and superimposed display data is described in detail, according to the embodiment. Even when the generic image capturing device 3 and the special image capturing device 1 are equal in resolution of imaging element, the imaging element of the special image capturing device 1 captures a wide area to obtain the equirectangular projection image, from which the 360-degree spherical image CE is generated. Accordingly, the image data captured with the special image capturing device 1 tends to be low in definition per unit area.

(Process of Generating Superimposition Relationship Metadata)

First, a process of generating superimposition relationship metadata is described.

(Superimposition Relationship Metadata (1))

First, a process is described for generating the superimposition relationship metadata (see FIG. 17) for superimposing the high-definition planar image PA on the spherical image CE generated from the low-definition equirectangular projection image EC.

The extractor 550 extracts a plurality of feature points fp1 from the rectangular, equirectangular projection image EC, which is generated in equirectangular projection (S110). The extractor 550 further extracts a plurality of feature points fp2A from the rectangular, planar image PA, which is generated in perspective projection (S110) As described above, the feature points are extracted based on local features of each of the images including the same object, for example.

Then, as illustrated in FIG. 22, the first area calculator 552 performs first homography transformation to calculate the rectangular, first area CA1 in the equirectangular projection image EC, which corresponds to the planar image PA, based on the similarity between the feature values fv1 of the plurality of feature points fp1 in the equirectangular projection image EC and the feature values fv2A of the plurality of feature points fp2A in the planar image PA (S120). More specifically, the first area calculator 552 calculates corresponding points between the equirectangular projection image EC and the planar image PA based on the similarity between the calculated feature values fv1 of the plurality of feature points fp1 in the equirectangular projection image EC and the calculated feature values fv2A of the plurality of feature points fp2A in the planar image PA. The first area calculator 552 further applies first homography transformation to the equirectangular projection image EC for determining the homography corresponding to the planar image PA. Accordingly, as illustrated in FIG. 22, the first area calculator 552 calculates the rectangular, first area CA1 in the equirectangular projection image EC, which corresponds to the planar image PA. The processing described above, in which it is difficult to accurately map the planar image PA to the equirectangular projection image EC since the planar image PA and the equirectangular projection image EC are in different projective spaces, is provisional and is used to roughly estimate corresponding positions.

Then, the point of gaze specifier 554 specifies the point (the point of gaze GP1) in the equirectangular projection image EC, which corresponds to the central point CP1 of the planar image PA after the first homography transformation (S130).

Then, as illustrated in FIGS. 23A and 23B, the projection converter 556 converts the peripheral area PeA in the equirectangular projection image EC, which is centered on the point of gaze GP1, to an area in perspective projection, which is the same as the projective space of the planar image PA, to generate the peripheral area image PI such that the vertical angle of view of the peripheral area image PI is equal to the diagonal angle of view of the planar image PA (S140).

Next, the extractor 550 extracts a plurality of feature points fp3A from the peripheral area image PI, which is obtained by the projection converter 556, based on local features of the image (S150).

Then, the second area calculator 557a calculates corresponding points between the planar image PA and the peripheral area image PI based on the similarity between the feature values fv2A of the plurality of feature points fp2A in the planar image PA and the feature values fv3A of the plurality of feature points fp3A in the peripheral area image PI. The second area calculator 557 further estimates a plane on the peripheral area image PI, which corresponds to the planar image PA, based on the calculated corresponding points between the two images to perform second homography transformation. Accordingly, the second area calculator 557a calculates the rectangular, second area CA2 in the peripheral area image PI, which corresponds to the planar image PA (S160). The planar image PA, which is a high-definition image having, for example, 40,000,000 pixels, may be resized to a suitable size in advance.

Then, the superimposition relationship metadata generator 558 generates superimposition relationship metadata (1) for the planar image PA, as illustrated in FIG. 17, based on information on the second area CA2 calculated by the second area calculator 557a and based on the image size of the planar image PA (S170). The storing and reading unit 59 stores the superimposition relationship metadata (1) in the memory 5000.

(Superimposition Relationship Metadata (2))

Next, a process is described for generating the superimposition relationship metadata (see FIG. 18) for superimposing the high-definition planar image PB on the high-definition planar image PA.

First, the extractor 550 extracts the plurality of feature points fp2A from the rectangular, planar image PA, which is generated in perspective projection (S180). The extractor 550 further extracts the plurality of feature points fp2B from the rectangular, planar image PB, which is also generated in perspective projection (S180).

Then, the third area calculator 559a calculates corresponding points between the planar image PB and the planar image PA based on the similarity between the feature values fv2B of the plurality of feature points fp2B in the planar image PB and the feature values fv3A of the plurality of feature points fp3A in the planar image PA. The third area calculator 559a further estimates a plane in the planar image PA, which corresponds to the planar image PB, based on the calculated corresponding points between the two images to perform third homography transformation. Accordingly, the third area calculator 559*a* calculates the rectangular, third area CA3 in the planar image PA, which corresponds to the planar image PB (S190).

Then, the superimposition relationship metadata generator 558 generates superimposition relationship metadata (2) for the planar image B, as illustrated in FIG. 18 based on information on the third area CA3 calculated by the third area calculator 559*a* and the image size of the planar image PB (S200). The storing and reading unit 59 stores the superimposition relationship metadata (2) in the memory 5000.

(Process of Generating Superimposed Display Data)

Next, a process for generating superimposed display data is described.

(Superimposed Display Data (1))

First, a process is described for generating superimposed display parameters (see FIG. 19) for superimposing the high-definition planar image PA on the spherical image CE generated from the low-definition equirectangular projection image EC.

The second area calculator 557*b* performs second homography transformation using the superimposition relationship metadata generated at S170 to calculate the rectangular second area CA2 in the peripheral area image PI, which corresponds to the planar image PA (S210-1).

Then, as illustrated in FIG. 24B, the area divider 560 divides the second area CA2 into the plurality of grid areas LA2 (S220-1).

Then, as illustrated in FIG. 22, the projection reverse converter 562 converts (reversely converts) the projection of the second area CA2 to equirectangular projection, which is the same as the projection of the equirectangular projection image EC (S230-1). Accordingly, as illustrated in FIG. 25, the projection reverse converter 562 determines the first specific corresponding area CA11 in the equirectangular projection image EC, which contains a plurality of grid areas LA11 corresponding to the plurality of grid areas LA2 in the second area CA2. FIG. 25 is a conceptual diagram illustrating the first and second specific corresponding areas CA11 and CA12 in the equirectangular projection image EC. Through the processing performed by the projection reverse converter 562, a first location parameter is generated, which indicates the coordinates of grids in the grid areas LA11.

Figure 26B:
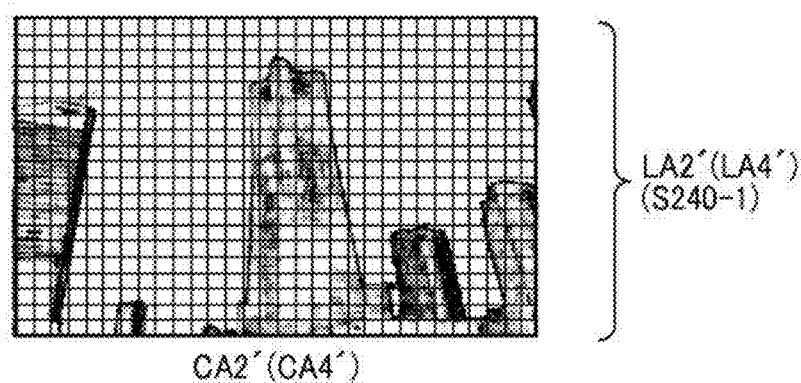
Figure 26C:
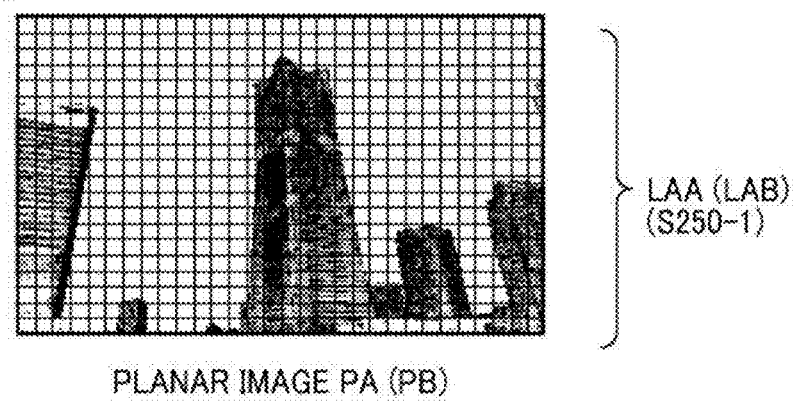

Next, a process of generating a first correction parameter is described with reference to FIGS. 22 and 26A to 26C. FIGS. 26A to 26C are conceptual diagrams of images obtained in the process of generating a first correction parameter.

After the processing of S230-1, the shape converter 564 projects the four vertices of the second area CA2, as illustrated in FIG. 26A, onto the four vertices of the planar image PA to convert the second area CA2 so that the second area CA2 has the same shape as the planar image PA. Accordingly, the shape converter 564 obtains the second area CA2' as illustrated in FIG. 26B (S240-1).

Then, as illustrated in FIG. 26C, the area divider 560 divides the planar image PA into the plurality of grid areas LAA (S250-1). The shape and number of grid areas LAA are equal to the shape and number of grid areas LA2' in the second area CA2', which are obtained as a result of conversion.

Then, the correction parameter generator 566 generates a first correction parameter (S260-1). The first correction parameter is used to match the brightness and color values of the grid areas LAA in the planar image PA, corresponding to the grid areas LA2' in the second area CA2', to the color values of the grid areas LA2'.

Finally, as illustrated in FIG. 19, the superimposed display data generator 570 generates superimposed display data (1) for the planar image PA, based on the planar image information obtained from the generic image capturing device 3, the area division number information set in advance, the first location parameter generated by the projection reverse converter 562, and the first correction parameter generated by the correction parameter generator 566 (S270-1). The storing and reading unit 59 stores the superimposed display data (1) in the memory.

(Superimposed Display Data (2))

Next, a process is described for generating superimposed display data (see FIG. 19) for superimposing the high-definition planar image PB on the high-definition planar image PA.

First, the third area calculator 559*b* performs third homography transformation using the superimposition relationship metadata generated at S200 to calculate the rectangular, third area CA3 in the planar image PA, which corresponds to the planar image PB (S210-2-1).

Then, the second area calculator 557*b* performs second homography transformation using the superimposition relationship metadata generated at S170 to calculate a rectangular, fourth corresponding area CA4 ("fourth area CA4") in the peripheral area image PI, which corresponds to the third area CA3 (S210-2-2).

Then, the area divider 560 divides the fourth area CA4 into a plurality of grid areas LA4 (S220-2). The fourth area CA4 may be divided in a way similar to that in FIG. 24B.

Then, the projection reverse converter 562 converts (reversely converts) the projection of the fourth area CA4 to equirectangular projection, which is the same as the projection of the equirectangular projection image EC (S230-2). Accordingly, as illustrated in FIG. 25, the projection reverse converter 562 determines the second specific corresponding area CA12 in the equirectangular projection image EC, which contains a plurality of grid areas LA12 corresponding to the plurality of grid areas LA4 in the fourth area CA4. Through the processing performed by the projection reverse converter 562, a second location parameter is generated, which indicates the coordinates of grids in the grid areas LA12.

Next, a process is described for generating a second correction parameter. The second correction parameter may be generated in a way similar to that in FIGS. 26A to 26C.

After the processing of S230-2, the shape converter 564 projects the four vertices of the fourth area CA4 onto the four vertices of the planar image PB to convert the fourth area CA4 so that the fourth area CA4 has the same shape as the planar image PB. Accordingly, the shape converter 564 obtains a fourth area CA4' (S240-2).

Then, the area divider 560 divides the planar image PB into a plurality of grid areas LAB (S250-2). The shape and number of grid areas LAB are equal to the shape and number of grid areas LA4' in the fourth area CA4', which are obtained as a result of conversion.

Then, the correction parameter generator 566 generates a second correction parameter (S260-2). The second correction parameter is used to match the brightness and color values of the grid areas LAB in the planar image PB, corresponding to the grid areas LA4' in the fourth area CA4', to the color values of the grid areas LA4'.

Finally, as illustrated in FIG. 19, the superimposed display data generator 570 generates superimposed display data (2) for the planar image PB, based on the planar image information obtained from the generic image capturing device 3, the area division number information set in advance, the second location parameter generated by the projection reverse converter 562, and the second correction parameter generated by the correction parameter generator 566 (S270-2). The storing and reading unit 59 stores the superimposed display data (2) in the memory 5000.

Accordingly, the processing of S22 illustrated in FIG. 21 ends.

Referring now to FIGS. 27A to 30, the superimposition of a plurality of second images on a first image, is described according to examples. In the following, the second image is referred to as a foreground image, which may be a planar image as described above. The first image is referred to as a background image, which may be a spherical image (the equirectangular projection image EC). The plurality of foreground images are displayed one above the other. In the following, an example case in which three or more foreground images are superimposed on the background image is described.

FIG. 27A is a conceptual diagram illustrating the correspondence of foreground images according to a comparative example. FIG. 27B illustrates the correspondence of foreground images according to this example. The background image X is an equirectangular projection image EC, and the foreground images A, B, and C are each a planar image (may be referred to as planar images PA, PB, and PC). The planar image PC is an image of a portion of the object (background) appearing in the planar image PB. The planar image PB is an image of a portion of the object (background) appearing in the planar image PA. Therefore, the planar image PC is also an image of a portion of the object (background) appearing in the planar image PA.

As illustrated in FIG. 27A, in the comparative example, a superimposed location parameter is calculated for each of the three foreground images A, B, and C so as to each match the background image X. That is, a parameter for superimposing each of the foreground images A, B, and C is calculated with respect to the background image X, such that there is no relationship between the foreground images A, B, and C.

As illustrated in FIG. 27B, in this example, a superimposed location parameter is calculated for the foreground image C, so as to match the foreground image B. Similarly, a superimposed location parameter is calculated for the foreground image B, so as to match the foreground image A. Similarly, a superimposed location parameter is calculated for the foreground image A, so as to match the background image X.

Specifically, referring to FIG. 27B, the superimposed location in an image on which the target image is to be superimposed (that is, the parent image), indicated by a pointer of an arrow, is calculated. For example, for the foreground image C, the superimposed location in the foreground image B is calculated. That is, the superimposed location of the foreground image C in the background image X is not determined at least directly. To determine a location at which the foreground image C is to be superimposed on the background image X, first, the superimposed location in the foreground image B, which corresponds to an arbitrary location in the foreground image C, is determined. Then, the superimposed location in the foreground image A, which corresponds to the determined location in the foreground image B, is determined. Finally, the superimposed location in the background image X, which corresponds to the determined location in the foreground image A, is determined.

Since the location of the foreground image C is determined with respect to the foreground image B, and the location of the foreground image B is determined with respect to the foreground image A, the positional shifts between the planar images A, B, and C can be reduced. Further, since the location of the foreground image A is determined with respect to the background image X, the positional shifts between the background image X, and any one of the foreground images A, B, and C can be reduced.

Further, the operation of determining a superimposed location according to this embodiment can effectively reduce computational loads, especially with the increase in number of images to be processed. This will be explained referring to FIGS. 28 and 29.

Figure 28:
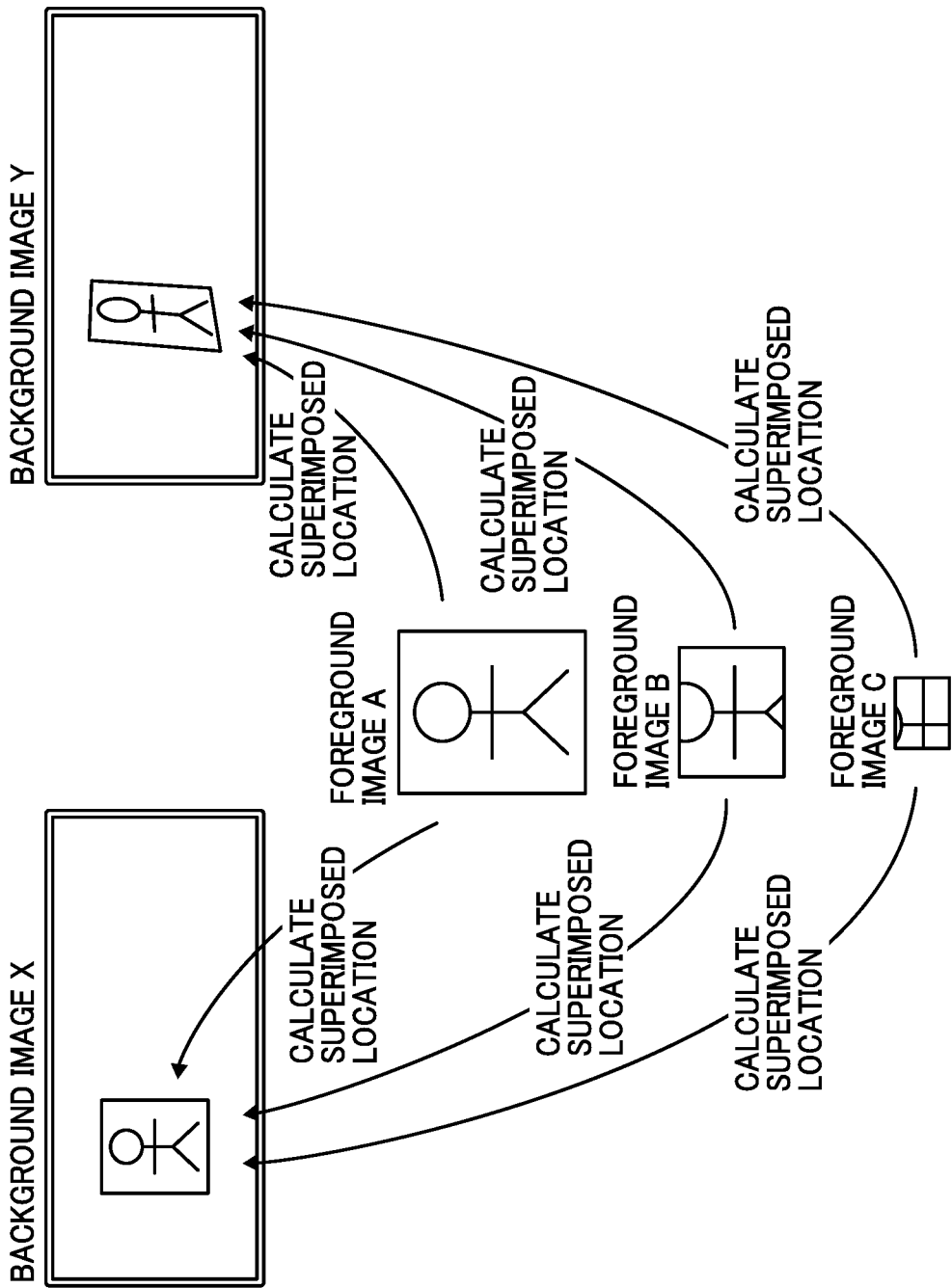
FIG. 28 is a conceptual diagram illustrating operation of calculating superimposed location according to the comparative example.
Figure 29:
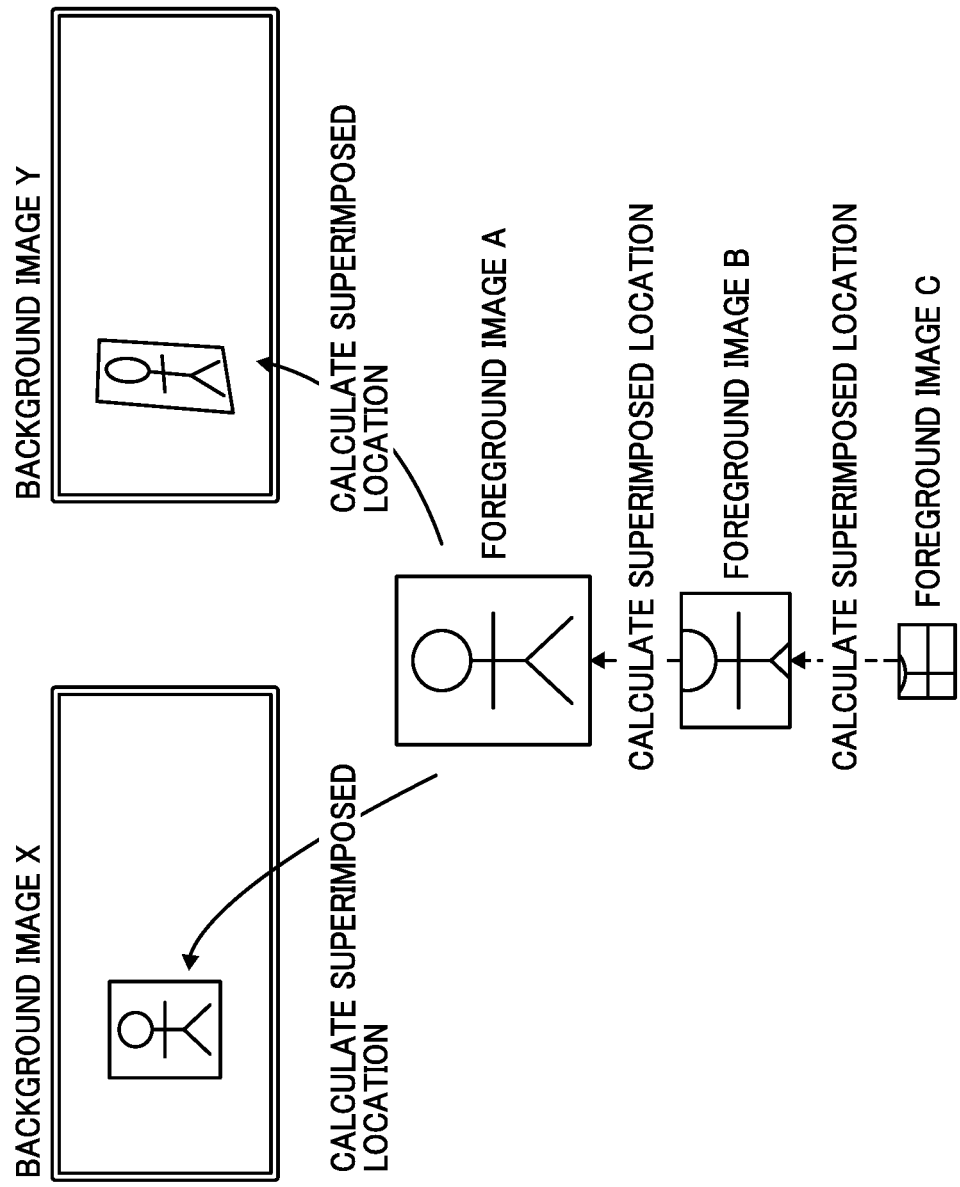
FIG. 29 is a conceptual diagram illustrating operation of calculating superimposed location according to the embodiment.

FIG. 28 is a conceptual diagram illustrating a process for calculating a superimposed location parameter according to the comparative example. FIG. 29 is a conceptual diagram illustrating a process for calculating a superimposed location parameter according to this embodiment.

In FIGS. 28 and 29, locations in background images X and Y are determined at which each of the foreground images A, B, and C is to be superimposed. In the comparative example, to determine superimposed locations in the different background images X and Y, the same foreground image is matched to each of the background images X and Y. Accordingly, the superimposed location calculation operation based on matching processing is performed six times.

In this example, as illustrated in FIG. 29, only one of the foreground images that is placed right above the background image, that is, the foreground image A, is matched to each of the background images X and Y. As described above referring to FIG. 27B, the correspondences in superimposed location between the foreground images A, B, and C are determined through matching processing between the foreground images A, B, and C. Accordingly, the superimposed location calculation operation based on matching processing is performed four times in total, that is, the matching processing between the foreground image A and each of the background images X and Y (2 calculations), between the foreground images A and B, and between the foreground images B and C.

That is, the relationship in location transformation between the foreground images A, B, and C, and information on location transformation of the foreground image A with respect to the background images X and Y, are only needed. For example, the location at which the foreground image C is to be superimposed on the background image X can be determined by converting location information in sequence. Since the superimposed location of the foreground image C on the foreground image A does not change, the superimposed location of the foreground image C on the background image X or Y can be calculated, using a relationship of the foreground image A with respect to the background image X or Y.

The technique described above can reduce the number of times the superimposed location calculation operation is performed based on matching processing, which imposes a large processing load. As the number of foreground images increases, this advantage becomes more noticeable.

Further, since the number of times for calculating the superimposed location for the foreground image with respect to the background image decreases, the overall processing can be simplified, based on assumption that the background image is an equirectangular projection image (spherical image), as matching between the planar image and the equirectangular projection image tends to be more complex compared to matching between the planar images.

Further, as described above referring to FIGS. 17 and 18, these relationships between the foreground images are stored as metadata for each one of the foreground images. In this example, the foreground images A, B, and C are grouped into a single set of foreground images for which mutual relationships are stored as the superimposition relationship metadata. Specifically, information on the relationship between the foreground image A (parent image) and the foreground image B (child image, or target image) is stored as the superimposition relationship metadata for the foreground image B. Information on the relationship between the foreground image B (parent image) and the foreground image C (child image, or target image) is stored as the superimposition relationship metadata for the foreground image C. Therefore, the relationship between the foreground images A and C can also be determined using the foreground image B, or the superimposition relationship metadata. This enables a user to display or hide any one of the foreground images as desired in a simple manner, such as displaying only the foreground image A, only the foreground image C, or both the foreground images B and C on the background image X.

Using information on the relationship between the foreground images, i.e., the superimposition relationship metadata, images can be managed with improved efficiently, especially when a large number of foreground images and/or background images are to be processed. This will be described below referring to FIG. 30.

Figure 30:
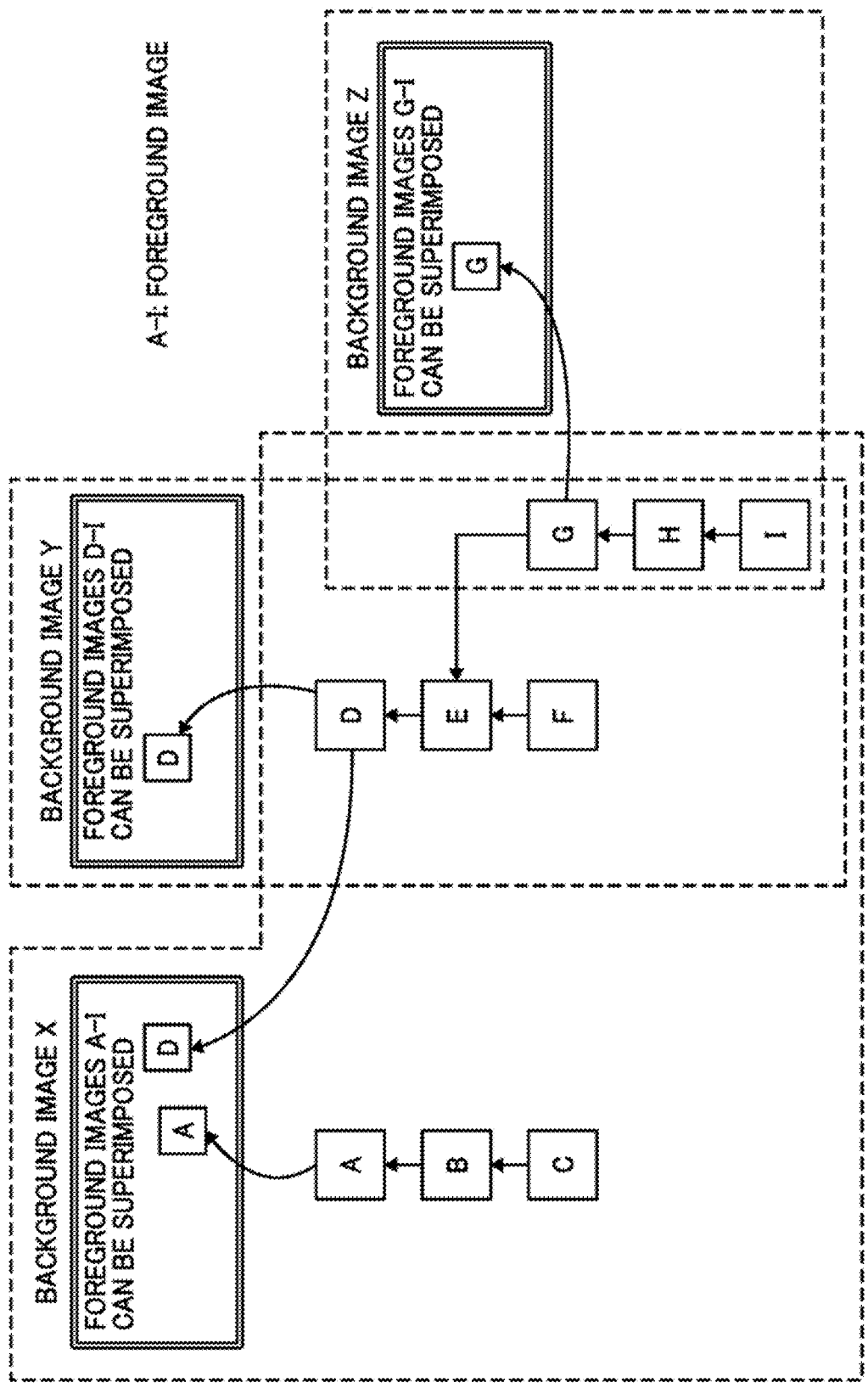
FIG. 30 is a conceptual diagram illustrating correspondences of a group of images, according to an embodiment.

FIG. 30 is a conceptual diagram illustrating groups of images to be superimposed on each one of a plurality of background images. Specifically, FIG. 30 illustrates relationships (correspondences) between foreground images and background images and metadata groups when some of foreground images A to I are superimposed on either one of background images X, Y, and Z.

In this example illustrated in FIG. 30, all of the foreground images A to I are superimposed on the background image X, the foreground image D to I are superimposed on the background image Y, and the foreground image G to I are superimposed on the background image Z. In such case, a group of images can be expressed in the form of a tree structure having a plurality of nodes, each node corresponding to each image. This allows grouping of foreground images, such as grouping of images that are to be superimposed on a background image.

Specifically, referring to the example illustrated in FIG. 30, the foreground images A, B, and C are handled as a group including the foreground images A, B, and C, with the foreground image A designated as the root, with respect to the background image X. The root, in this example, is a foreground image (such as a planar image) that can be superimposed on a background image (such as an equirectangular projection image) right above or on the background image. Similarly, the foreground images D through I may also be handled as a group including the foreground images D through I, with the foreground image D designated as the root, with respect to the background image Y. The group of images D through I is further classified into an E-F group (sub-group) with the foreground image E designated as the parent, and an E-I group (sub-group) with the foreground image E designated as the parent. Similarly, the foreground images G through I may also be handled as a group including the foreground images G through I, with the foreground image G designated as the root, with respect to the background image Z.

The group of foreground images can be managed in a tree structure rooted at a single node of each of the background images X, Y, and Z. That is, the background image X may have a tree structure including the foreground images A and D as children. Likewise, the background image Y has a tree structure including the foreground images D to I as children. The background image Z has a tree structure including the foreground images G to I as children. Further, the grouping of foreground images is represented as a set of superimposition relationship metadata for the corresponding background image. That is, metadata related to each image is not used alone but a metadata group is used to identify foreground images to be superimposed on a certain background image and to determine superimposed locations.

Specifically, simple matrix computation, such as determination of the product of homography, may be performed to calculate a position in a child image corresponding to a position in the predecessor image. As described above referring to FIGS. 17 and 18, the superimposition relationship metadata stores information on the image sizes of the target image and its parent image when homography is calculated. Homography can be used for calculation such that a point in a certain plane is projected onto a point in another plane. This calculation can be performed based on assumption that the sizes of the images (the number of horizontal pixels and the number of vertical pixels) are known.

In some cases, however, the image sizes of the foreground images A and B when homography for the foreground images A and B is determined, and the image sizes of the foreground images B and C when homography for the foreground images B and C is determined, may differ. In such case, to determine the position (projection) relationship between the foreground images A and C, the difference in scale due to the difference in image size should be taken into account. Here, the difference in image size can be represented by using homography due to the plane-to-plane projection. Accordingly, the product of homography is used to determine the projection from the foreground image A to the foreground image C. As described above referring to FIGS. 17 and 18, the respective image sizes are stored as superimposed location calculation image information separately from superimposed location transformation information. In this way, the stored superimposed location transformation information can be used as information separate from the specific image sizes.

With the use of superimposition relationship metadata, computation of superimposed location can be easily handled. For example, for each of a plurality of different background images X and Y, the superimposed location of a target image can be calculated using superimposed location calculation information of a foreground image as the parent image for that target image. That is, in this embodiment, a background image and a plurality of foreground images are represented as nodes in a tree structure, which indicates the parent-child relationship between the images, and are each assigned superimposition relationship metadata. The metadata items of the images are suitably associated (grouped) to identify each foreground image to be superimposed on a background image and to calculate superimposed location of each foreground image.

Since each node, i.e., each image, has information on the superimposed location in its parent node, which is represented as the superimposition relationship metadata. When a certain image is superimposed on a new background image, which does not belong to the current group, not all of the related foreground images are subjected to matching processing but a foreground image set as the root node of a subtree (a portion of the tree structure) including the related foreground images is subjected to matching processing. Accordingly, the superimposed locations of the descendant foreground images associated with the root node can be calculated.

In FIG. 30, the group having the foreground image D as the root (the foreground images D, E, F, G, H, and I) is assumed to be initially associated with the background image Y. To associate this group with the background image X thereafter, the matching processing between the background image X and the foreground image D may be performed without matching processing between the new background image and all the descendant foreground images. This is very beneficial since previously calculated relationships in superimposed locations may be used to determine a new relationship in superimposed locations. In addition, information on superimposed locations can be handled in units of a tree including subtrees. Accordingly, flexible operations are achieved, such as the generation of a new group and the deletion or addition of a foreground image from or to a group.

(Operation of Superimposing Images)

Referring back to FIG. 21, the display control 56 superimposes images by using the superimposition relationship metadata and the superimposed display data, obtained by the storing and reading unit 59 (S23).

Figure 31:
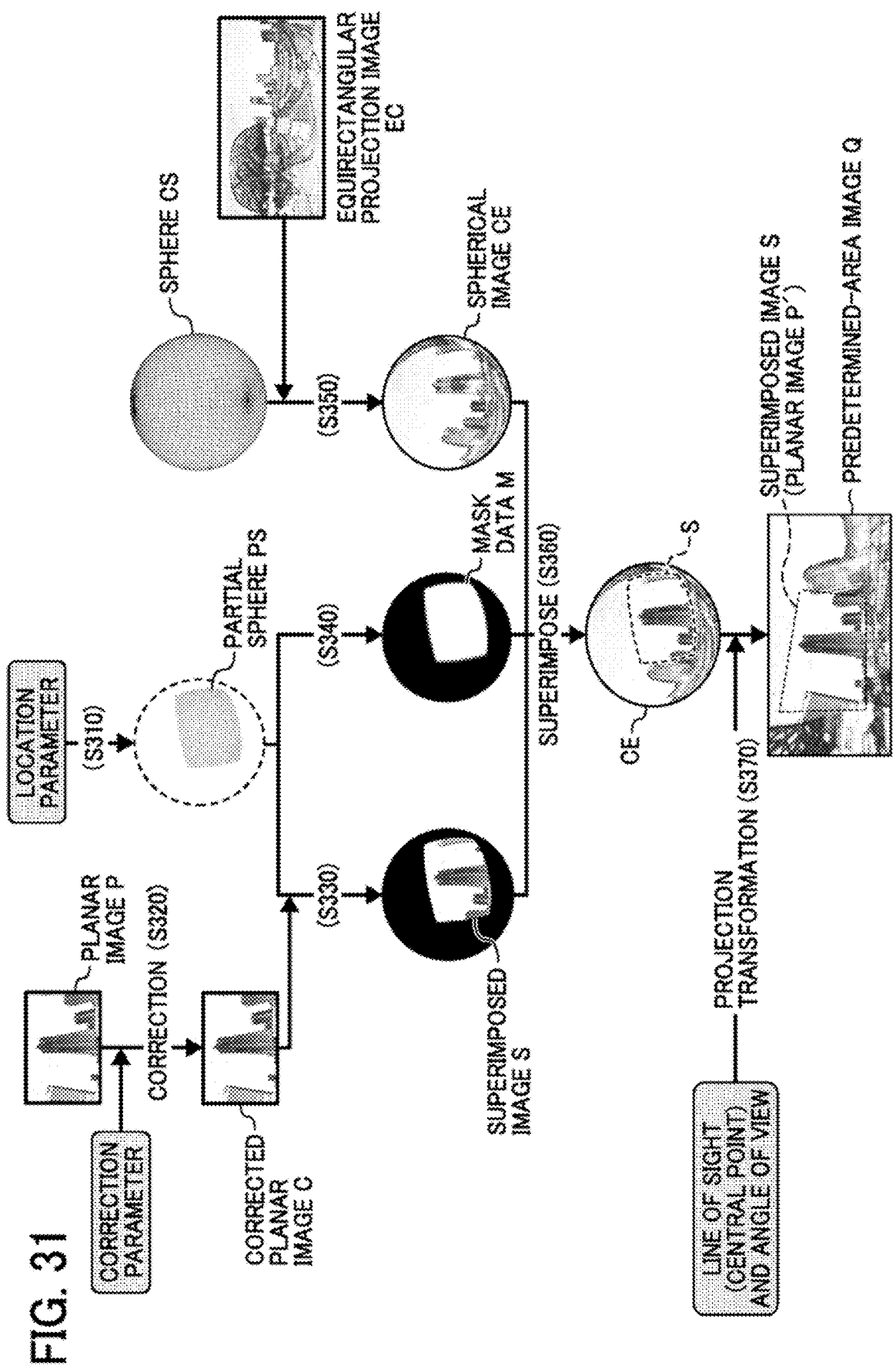
FIG. 31 is a conceptual diagram illustrating operation of superimposing images, with images being processed or generated, according to the first embodiment.

The operation of superimposing images at S23 illustrated in FIG. 21 is described in detail with reference to FIGS. 31 to 36D. FIG. 31 is a conceptual diagram illustrating operation of superimposing images, with images being processed or generated, according to the embodiment. While the planar image PA and the planar image PB are to be superimposed on the equirectangular image EC, the example case in which the planar image P is superimposed is described, based on assumption that the planar image P is the planar image PA superimposed with the planar image PB. However, superimposing one planar image on other planar image may be performed, for example, as described above referring to FIGS. 29 and 30.

The storing and reading unit 59 (obtainer) illustrated in FIG. 14 reads and obtains in advance, from the memory 5000, data of the equirectangular projection image EC in equirectangular projection, data of the planar image P (for example, the planar image PA and the planar image PB) in perspective projection, and the superimposed display data.

Then, as illustrated in FIG. 31, the superimposed area generator 582 specifies, based on the location parameter of the superimposed display data, a portion of the virtual sphere CS, which corresponds to the first specific corresponding area CA11, to generate a partial sphere PS (S310). The pixels other than the pixels corresponding to the grids at the positions defined by the location parameter are interpolated by linear interpolation, for example.

The correction unit 584 corrects the brightness and color of the planar image P, using the correction parameter of the superimposed display data, to match the brightness and color of the equirectangular projection image EC (S320). The planar image P, which has been corrected, is referred to as the "corrected planar image C".

The image generator 586 superimposes the corrected planar image C of the planar image P, on the partial sphere PS to generate the superimposed image S (S330). The pixels other than the pixels corresponding to the grids having the positions defined by the location parameter are interpolated by linear interpolation. The image generator 586 generates mask data M based on the partial sphere PS (S340). The image generator 586 covers (attaches) the equirectangular projection image EC, over a surface of the sphere CS, to generate the spherical image CE (S350). The image superimposing unit 588 superimposes the superimposed image S and the mask data M, on the spherical image CE (S360). The image is generated, in which the high-definition superimposed image S is superimposed on the low-definition spherical image CE. With the mask data, the boundary between the two different images is made unnoticeable.

As illustrated in FIG. 7, the projection converter 590 converts projection, such that the predetermined area T of the spherical image CE, with the superimposed image S being superimposed, is displayed on the display 517, for example, in response to a user instruction for display. The projection transformation is performed based on the line of sight of the user (the direction of the virtual camera IC, represented by the central point CP of the predetermined area T), and the angle of view α of the predetermined area T (S370). The projection converter 590 may further change a size of the predetermined area T according to the resolution of the display area of the display 517. Accordingly, the display control 56 displays the predetermined-area image Q, that is, the image of the predetermined area T, in the entire display area of the display 517 (S24). In this example, the predetermined-area image Q includes the superimposed image S superimposed with the planar image P.

Figure 32:
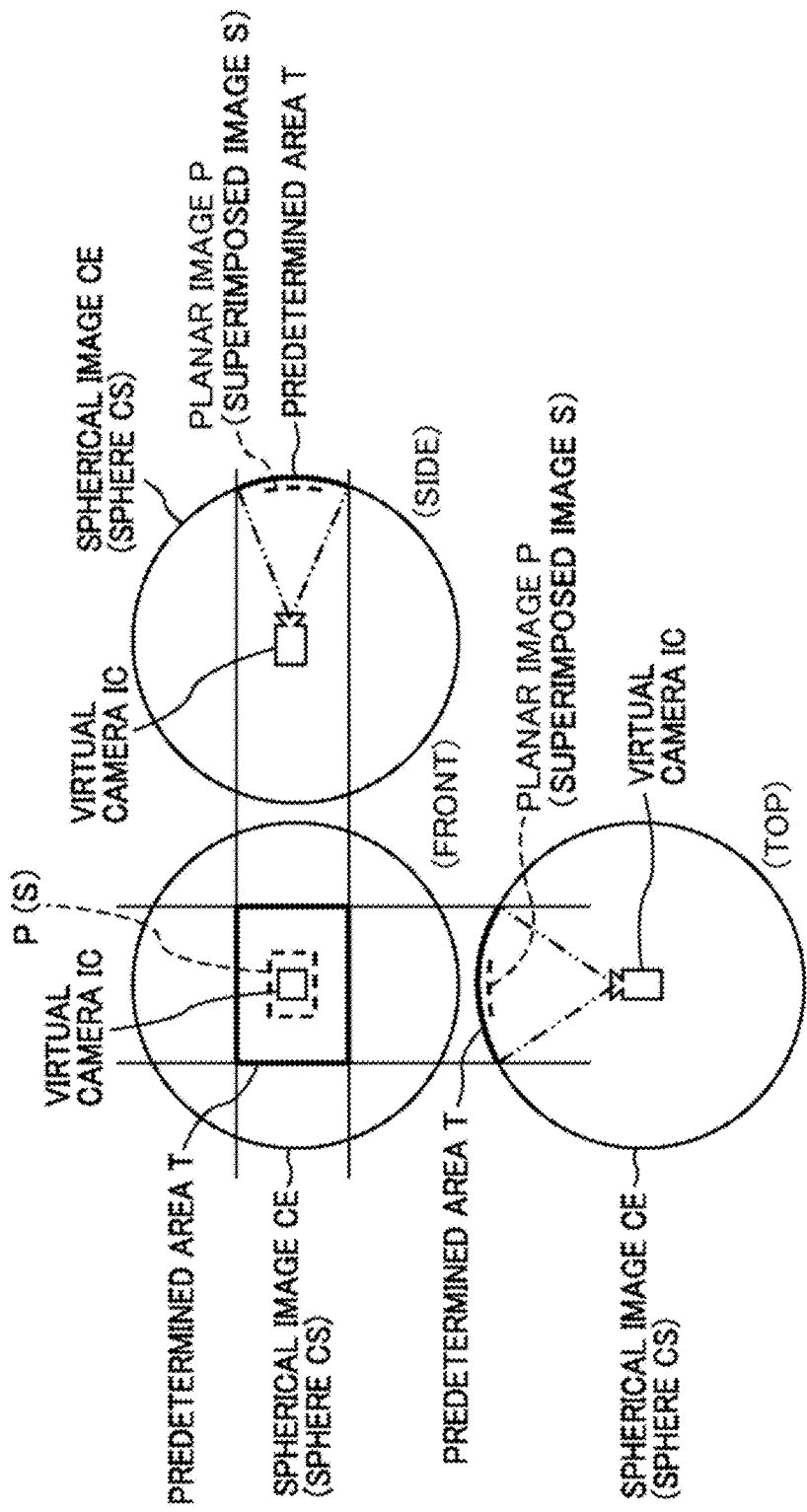
FIG. 32 is a conceptual diagram illustrating a two-dimensional view of the spherical image superimposed with the planar image, according to the first embodiment.

Referring to FIGS. 32 to 36D, display of the superimposed image is described in detail, according to the embodiment. FIG. 32 is a conceptual diagram illustrating a two-dimensional view of the spherical image CE superimposed with the planar image P. The planar image P is superimposed on the spherical image CE illustrated in FIG. 5. As illustrated in FIG. 32, the high-definition superimposed image S is superimposed on the spherical image CE, which covers a surface of the sphere CS, to be within the inner side of the sphere CS, according to the location parameter.

Figure 33:
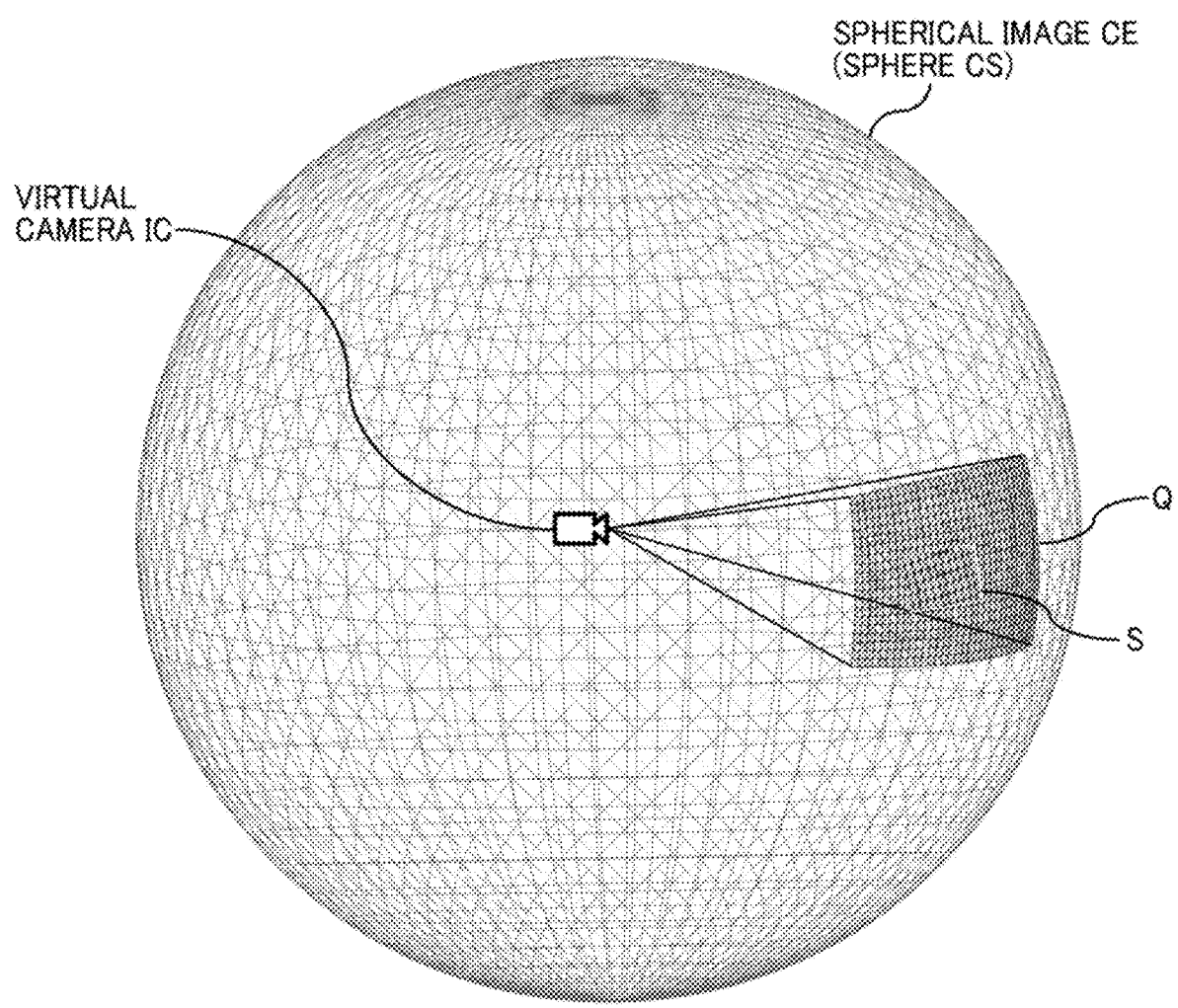
FIG. 33 is a conceptual diagram illustrating a three-dimensional view of the spherical image superimposed with the planar image, according to the first embodiment.

FIG. 33 is a conceptual diagram illustrating a three-dimensional view of the spherical image CE superimposed with the planar image P. FIG. 33 represents a state in which the spherical image CE and the superimposed image S cover a surface of the sphere CS, and the predetermined-area image Q includes the superimposed image S.

Figure 34A:
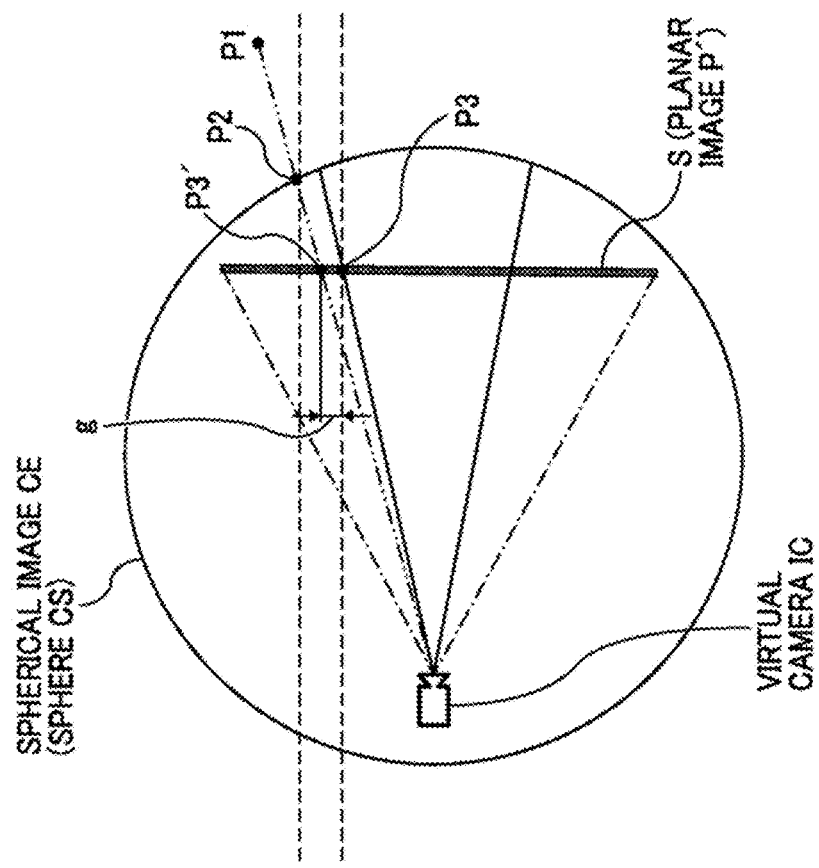
FIGS. 34A and 34B are conceptual diagrams illustrating a two-dimensional view of a spherical image superimposed with a planar image, without using the location parameter, according to a comparative example.
Figure 34B:
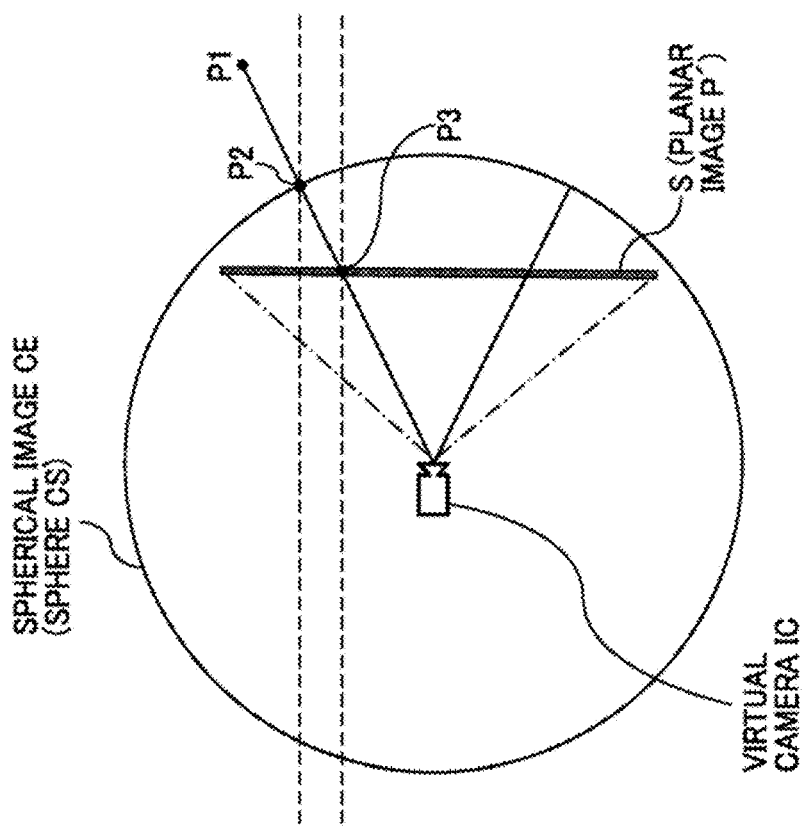
Figure 35A:
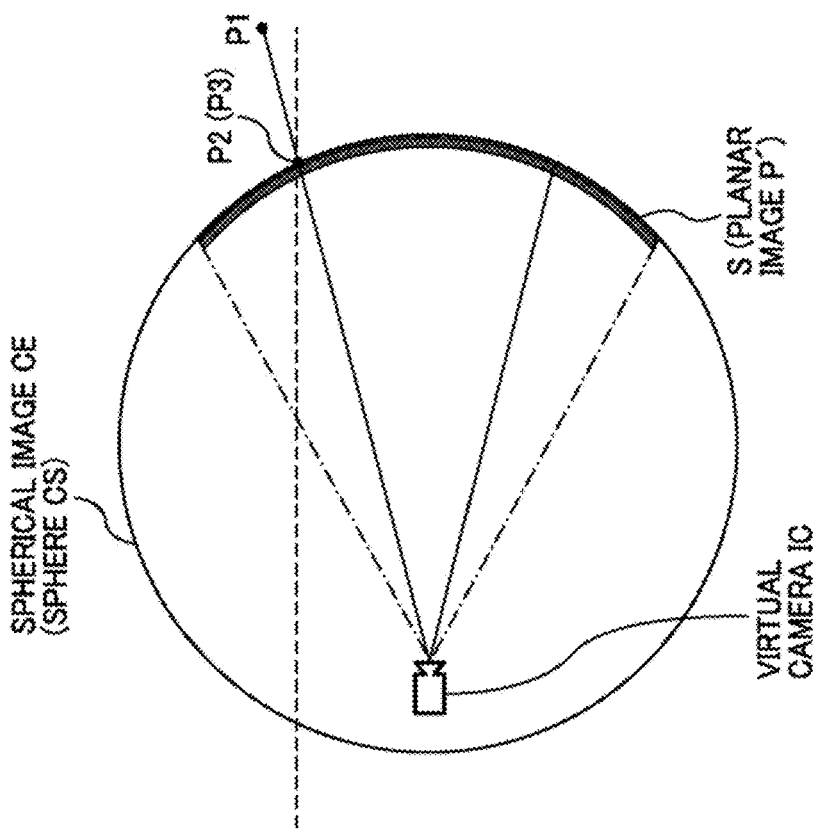
FIGS. 35A and 35B are conceptual diagrams illustrating a two-dimensional view of the spherical image superimposed with the planar image, using the location parameter, in the first embodiment.
Figure 35B:
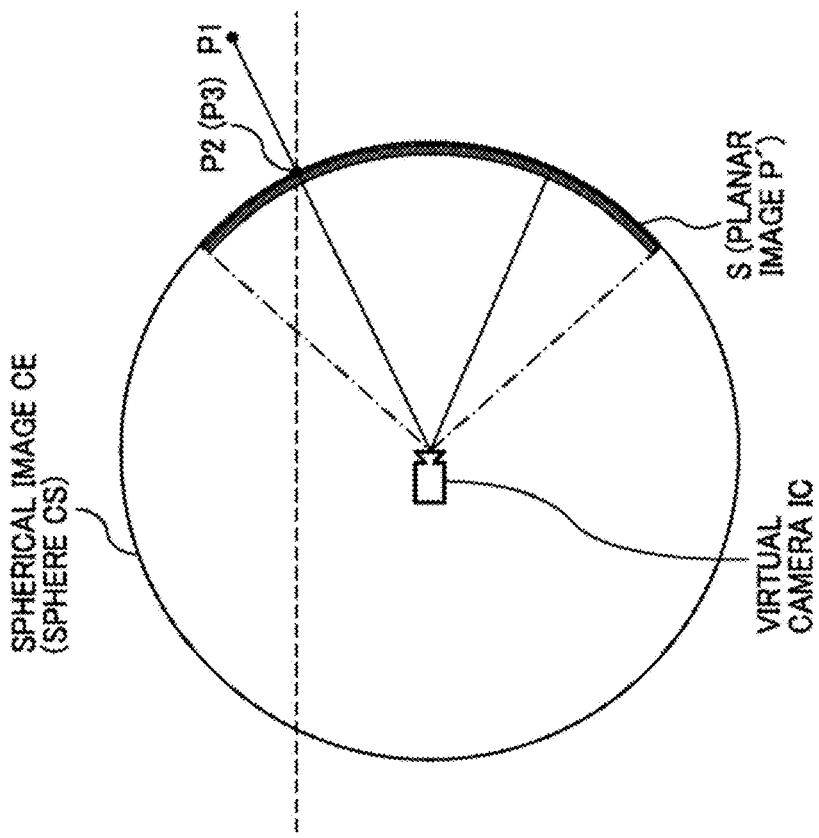

FIGS. 34A and 34B are conceptual diagrams illustrating a two-dimensional view of a spherical image superimposed with a planar image, without using the location parameter, according to a comparative example. FIGS. 35A and 35B are conceptual diagrams illustrating a two-dimensional view of the spherical image CE superimposed with the planar image P, using the location parameter, in this embodiment.

As illustrated in FIG. 34A, it is assumed that the virtual camera IC, which corresponds to the user's point of view, is located at the center of the sphere CS, which is a reference point. The object P1, as an image capturing target, is represented by the object P2 in the spherical image CE. The object P1 is represented by the object P3 in the superimposed image S. Still referring to FIG. 34A, the object P2 and the object P3 are positioned along a straight line connecting the virtual camera IC and the object P1. This indicates that, even when the superimposed image S is displayed as being superimposed on the spherical image CE, the coordinate of the spherical image CE and the coordinate of the superimposed image S match. As illustrated in FIG. 34B, if the virtual camera IC is moved away from the center of the sphere CS, the position of the object P2 stays on the straight line connecting the virtual camera IC and the object P1, but the position of the object P3 is slightly shifted to the position of an object P3'. The object P3' is an object in the superimposed image S, which is positioned along the straight line connecting the virtual camera IC and the object P1. This will cause a difference in grid positions between the spherical image CE and the superimposed image S, by an amount of shift "g" between the object P3 and the object P3'. Accordingly, in displaying the superimposed image S, the coordinate of the superimposed image S is shifted from the coordinate of the spherical image CE.

In view of the above, in this embodiment, the location parameter is generated, which indicates respective positions of a plurality of grid areas in the superimposed image S with respect to the planar image P. With this location parameter, as illustrated in FIGS. 35A and 35B, the superimposed image S is superimposed on the spherical image CE at right positions, while compensating the shift. More specifically, as illustrated in FIG. 35A, when the virtual camera IC is at the center of the sphere CS, the object P2 and the object P3 are positioned along the straight line connecting the virtual camera IC and the object P1. As illustrated in FIG. 35B, even when the virtual camera IC is moved away from the center of the sphere CS, the object P2 and the object P3 are positioned along the straight line connecting the virtual camera IC and the object P1. Even when the superimposed image S is displayed as being superimposed on the spherical image CE, the coordinate of the spherical image CE and the coordinate of the superimposed image S match.

Accordingly, the image capturing system of this embodiment is able to display an image in which the high-definition planar image P is superimposed on the low-definition spherical image CE, with high image quality. This will be explained referring to FIGS. 36A to 36D.

Figure 36A:
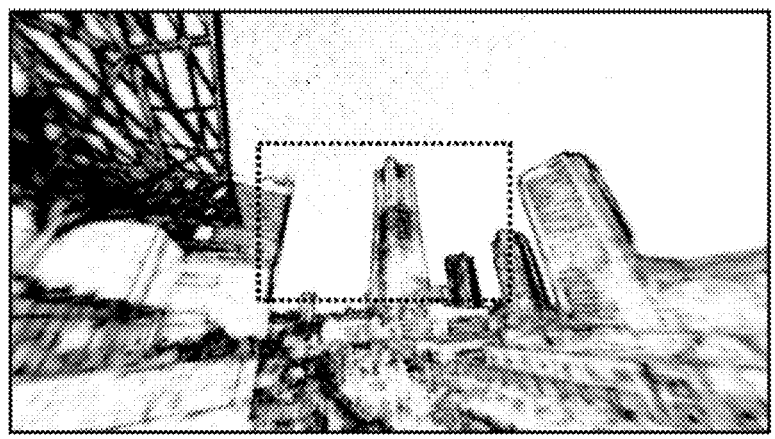
FIGS. 36A, 36B, 36C, and 36D are illustrations of a wide-angle image without superimposed display, a telephoto image without superimposed display, a wide-angle image with superimposed display, and a telephoto image with superimposed display, according to the first embodiment.
Figure 36B:
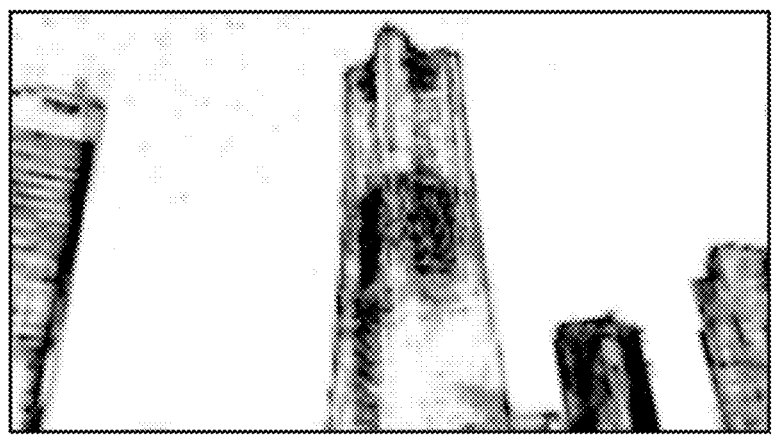
Figure 36C:
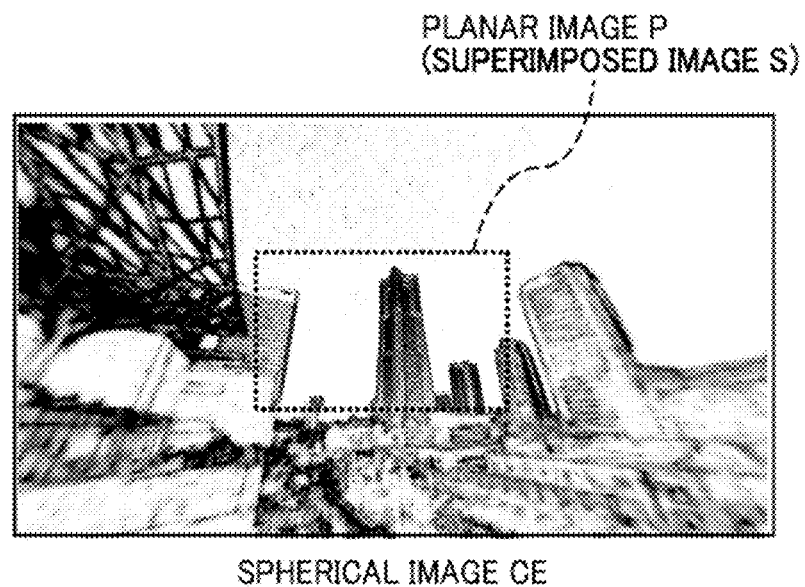
Figure 36D:
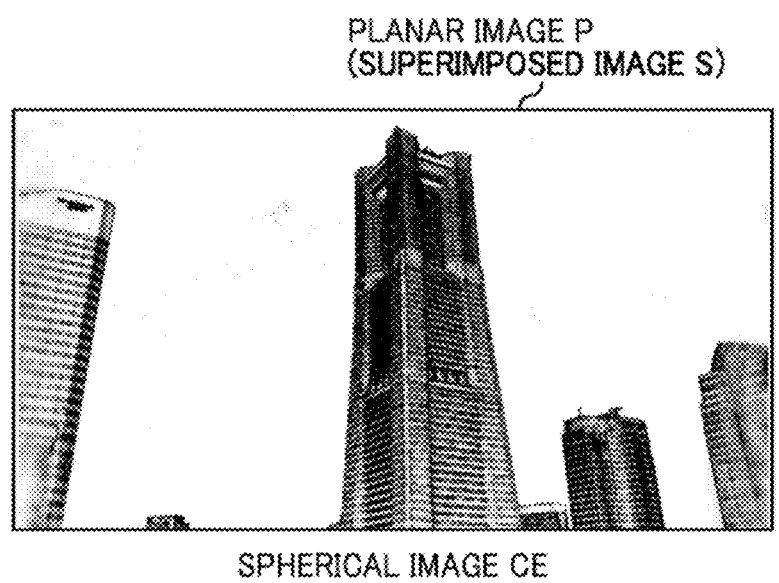

FIG. 36A illustrates the spherical image CE, when displayed as a wide-angle image. Here, the planar image P is not superimposed on the spherical image CE. FIG. 36B illustrates the spherical image CE, when displayed as a telephoto image. Here, the planar image P is not superimposed on the spherical image CE. FIG. 36C illustrates the spherical image CE, superimposed with the planar image P, when displayed as a wide-angle image. FIG. 36D illustrates the spherical image CE, superimposed with the planar image P, when displayed as a telephoto image. The dotted line in each of FIGS. 36A and 36C, which indicates the boundary of the planar image P, is shown for the descriptive purposes. Such dotted line may be displayed, or not displayed, on the display 517 to the user.

It is assumed that, while the spherical image CE without the planar image P being superimposed, is displayed as illustrated in FIG. 36A, a user instruction for enlarging an area indicated by the dotted area is received. In such case, as illustrated in FIG. 36B, the enlarged, low-definition image, which is a blurred image, is displayed to the user. As described above in this embodiment, it is assumed that, while the spherical image CE with the planar image P being superimposed, is displayed as illustrated in FIG. 36C, a user instruction for enlarging an area indicated by the dotted area is received. In such case, as illustrated in FIG. 36D, a high-definition image, which is a clear image, is displayed to the user. For example, assuming that the target object, which is shown within the dotted line, has a sign with some characters, even when the user enlarges that section, the user may not be able to read such characters if the image is blurred. If the high-definition planar image P is superimposed on that section, the high-quality image will be displayed to the user such that the user is able to read those characters.

As described above, when a planar image (foreground image) serving as a second image and a planar image (foreground image) serving as a third image are superimposed on an equirectangular projection image (background image) serving as a first image, the positional shift may be eliminated or reduced between the second image and the third image, while eliminating or reducing the positional shift between the second image and the first image. That is, if the second image and the third image partially or entirely overlap, the positional shift may be noticeable between the second image and the third image, even when there is no positional shift between the second image and the first image. In this embodiment, stepwise matching processing is performed to generate superimposed display data indicating the location at which the third image is to be superimposed on the first image. Accordingly, the positional shift may be eliminated or reduced between the foreground images (the second image and the third image).

When the third image (the foreground image) is superimposed on an area in the second image (another foreground image), the positional shift between the second image and the third image (foreground images) may be reduced by calculating the matched position between the second and third images, rather than by calculating the positions at which the second and third images are superimposed on the background image. In the following, the second image and the third image are each referred to as the foreground image, and the first image is referred to as the background image.

That is, a result of calculation of the locations at which the foreground images are superimposed on the background image tend to include an error, compared to the case in which a result of calculation of the locations at which the foreground image is superimposed on its parent, foreground image. Typically, a foreground image has a smaller angle of view but has higher image resolution than a background image, and is beneficial to extract feature values effective for matching processing. Further, the foreground images that have been captured using the same device (camera) tend to have more similar quality in terms of correlation with lens distortion or image processing than foreground images that have been captured using different devices, which is beneficial to calculate a superimposed location. In addition, with the use of an image having an intermediate angle of view (intermediate-angle-of-view foreground image) having a smaller difference in angle of view from a background image, the final position at which a foreground image (narrow-angle foreground image) having a narrow angle of view is superimposed on the background image can be determined more accurately than that determined by matching the foreground image directly to the background image, which has a larger angle of view and a larger difference in quality than the foreground image, based on fewer feature points or smaller feature values. That is, for example, as illustrated in FIG. 29, with the use of the foreground image A and the foreground image B, the location at which the foreground image C is superimposed on the background image X can be determined more accurately than that determined by directly matching the foreground image C to the background image X.

(2) When the planar image PB (the foreground image B), which is captured with relatively long focal length, is to be matched to the equirectangular projection image EC (background image), due to the large difference in size between the captured areas, it may be difficult to calculate the superimposed location or the planar image PB and the equirectangular projection image EC may be greatly shifted from each other. In contrast, in this embodiment, stepwise matching processing is performed such that the planar image PB is matched to the planar image PA (the foreground image A), which is captured with relatively short focal length, and is finally matched to the equirectangular projection image EC. This stepwise matching processing may advantageously determine the superimposed location or prevent the occurrence of large shift between the planar image PB and the equirectangular projection image EC.

In matching processing to calculate the superimposed location of a foreground image in a background image, if the foreground image has a narrow angle of view, the area in the background image corresponding to the foreground image is also narrow. Accordingly, the number of feature values that can be used for the matching processing is reduced. That is, features can be extracted from each of a background image and a foreground image when the foreground image covers a certain area of the background image. If the foreground image covers a small area of the background image, a small number of feature values can be obtained. This causes a tendency that the accuracy of determination of a superimposed location in the background image is also reduced. In some cases, the detection of the superimposed location may fail. In stepwise matching processing according to this embodiment, a foreground image having an intermediate angle of view (intermediate-angle-of-view foreground image) is used to determine an area in the intermediate-angle-of-view foreground image corresponding to a narrow-angle foreground image by using matching processing. The transformation between the intermediate-angle-of-view foreground image and the narrow-angle foreground image is stored as superimposed location transformation information. A point in the background image corresponding to the intermediate-angle-of-view foreground image is further calculated, and the correspondence between a plurality of points in the intermediate-angle-of-view foreground image and a plurality of corresponding points in the background image is determined. As described above, corresponding areas can be calculated between a background image and a foreground image. Similarly, this technique can be used to identify which area in an intermediate-angle-of-view image a narrow-angle image corresponds, and calculate the location at which the narrow-angle foreground image is to be superimposed on the background image even when the background image and the intermediate-angle-of-view foreground image are based on different projection methods. That is, for example, as illustrated in FIG. 29, the use of the foreground image A and the foreground image B provides higher accuracy in determination of superimposed location of the foreground image C in the background image X than direct matching of the foreground image C to the background image X.

(3) As described above, using superimposition relationship metadata can simplify the calculation process. For example, superimposed location calculation information for a parent foreground image is determined to calculate the superimposed location of a child image in each of a plurality of different background images X and Y.

In this embodiment, a plurality of foreground images and a background image are used as nodes in a tree structure, which indicates the parent-child relationship between the images, and are each assigned superimposition relationship metadata. The metadata items of the images are suitably associated (grouped) to identify foreground images for a background image and to calculate superimposed locations. That is, each node has information on the superimposed location in its parent node. When a certain image is superimposed on a new background image, which does not belong to the current group, not all of the related foreground images are subjected to matching processing but a foreground image set as the root node of a subtree (a portion of the tree structure) including the related foreground images is subjected to matching processing. Accordingly, the superimposed locations of the descendant foreground images associated with the root node can be calculated. That is, not all of the descendant foreground images are to be matched to a new background image, resulting in a reduction in calculation processing load when many foreground images are to be superimposed. Determining feature values of images and performing matching processing to determine corresponding positions impose a large load. Determining a new position relationship by using previously calculated position relationships is very beneficial. In addition, information on superimposition locations can be handled in units of a tree including subtrees. Accordingly, flexible operations are achieved, such as the generation of a new group and the deletion or addition of a foreground image from or to a group.

Second Embodiment

Referring now to FIGS. 37 to 41, an image capturing system is described according to a second embodiment.

<Overview of Image Capturing System>

Figure 37:
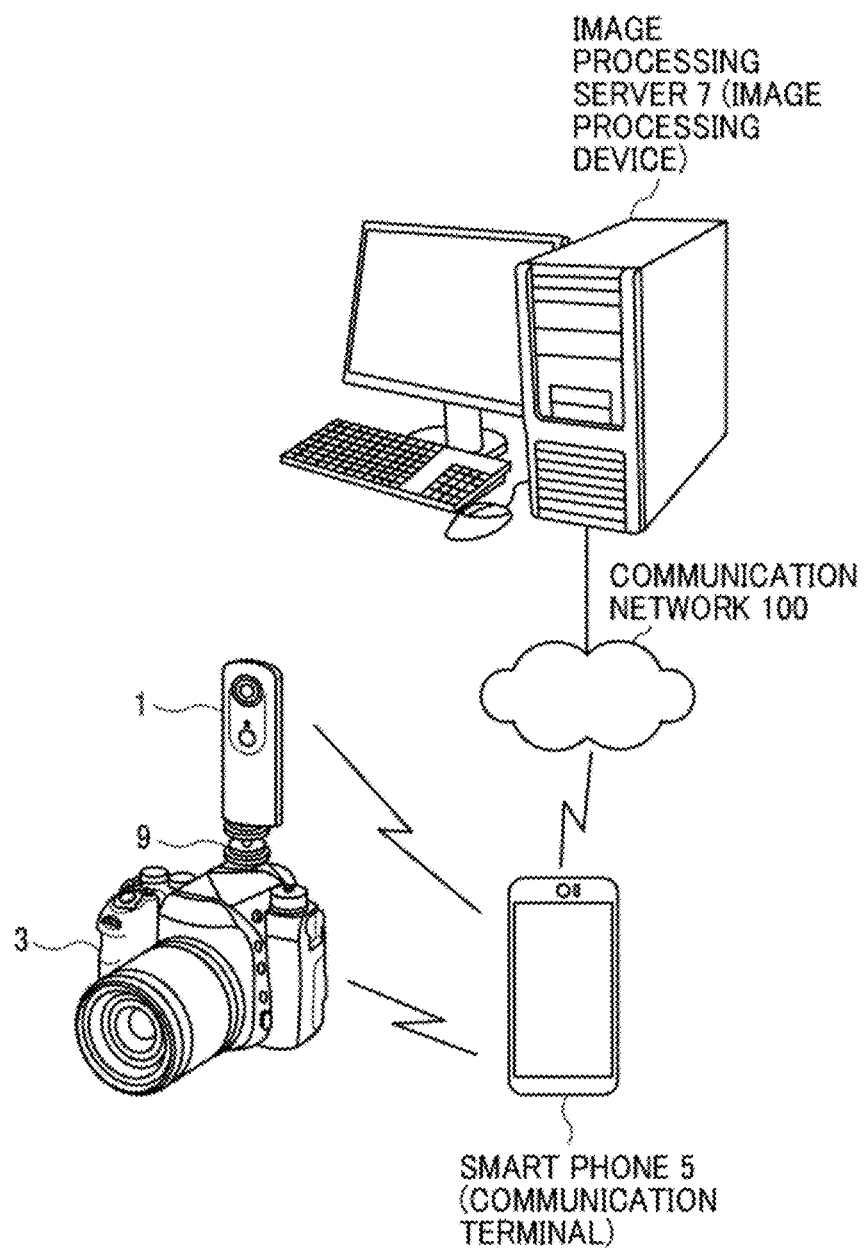
FIG. 37 is a schematic view illustrating an image capturing system according to a second embodiment.

First, referring to FIG. 37, an overview of the image capturing system is described according to the second embodiment. FIG. 37 is a schematic block diagram illustrating a configuration of the image capturing system according to the second embodiment.

As illustrated in FIG. 37, compared to the image capturing system of the first embodiment described above, the image capturing system of this embodiment further includes an image processing server 7. In the second embodiment, the elements that are substantially same to the elements described in the first embodiment are assigned with the same reference numerals. For descriptive purposes, description thereof is omitted. The smart phone 5 and the image processing server 7 communicate with each other through the communication network 100 such as the Internet and the Intranet.

In the first embodiment, the smart phone 5 generates superimposed display data, and processes superimposition of images. In this second embodiment, the image processing server 7 performs such processing, instead of the smart phone 5. The smart phone 5 in this embodiment is one example of the communication terminal, and the image processing server 7 is one example of the image processing apparatus or device.

The image processing server 7 is a server system, which is implemented by a plurality of computers that may be distributed over the network to perform processing such as image processing in cooperation with one another.

<Hardware Configuration>

Figure 38:
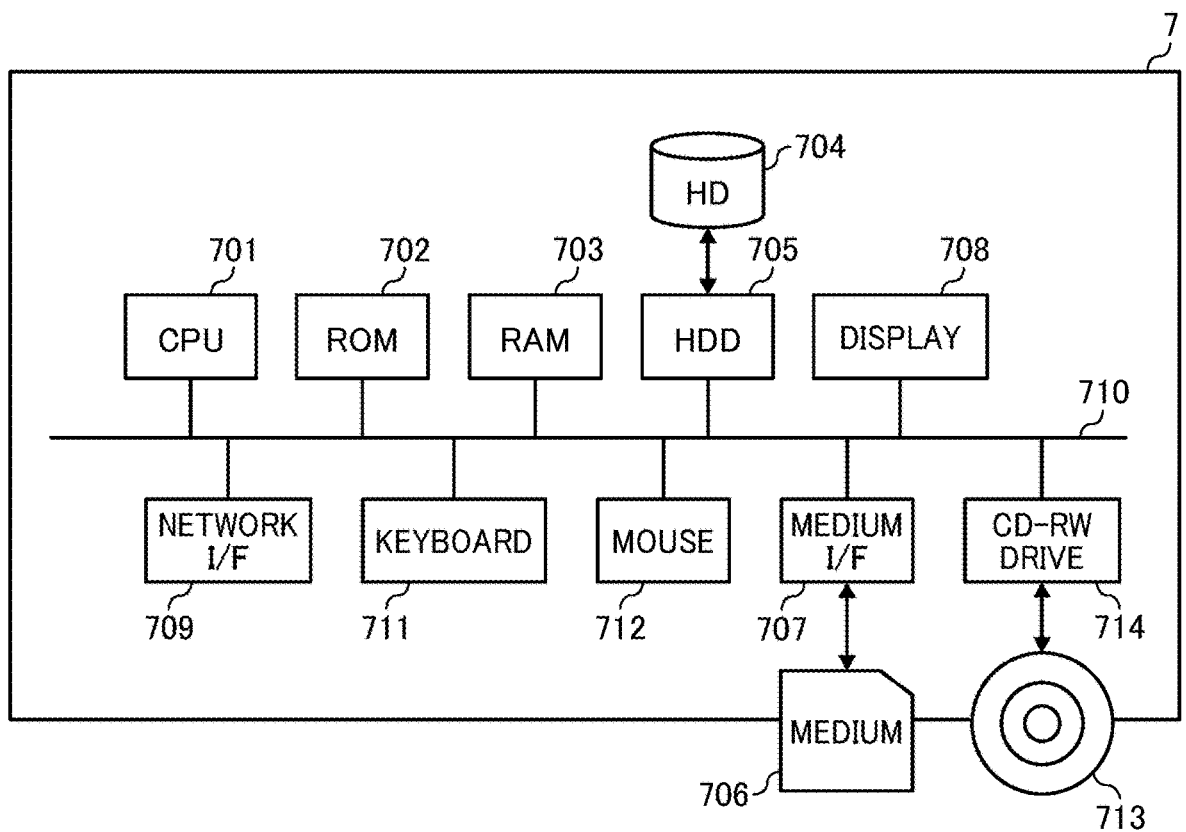
FIG. 38 is a schematic diagram illustrating a hardware configuration of an image processing server according to the second embodiment.

Next, referring to FIG. 38, a hardware configuration of the image processing server 7 is described according to the embodiment. FIG. 38 illustrates a hardware configuration of the image processing server 7 according to the embodiment. Since the special image capturing device 1, the generic image capturing device 3, and the smart phone 5 are substantially the same in hardware configuration, as described in the first embodiment, description thereof is omitted.

<Hardware Configuration of Image Processing Server>

FIG. 38 is a schematic block diagram illustrating a hardware configuration of the image processing server 7, according to the embodiment. Referring to FIG. 38, the image processing server 7, which is implemented by the general-purpose computer, includes a CPU 701, a ROM 702, a RAM 703, a HD 704, a HDD 705, a medium I/F 707, a display 708, a network I/F 709, a keyboard 711, a mouse 712, a CD-RW drive 714, and a bus line 710. Since the image processing server 7 operates as a server, an input device such as the keyboard 711 and the mouse 712, or an output device such as the display 708 does not have to be provided.

The CPU 701 controls entire operation of the image processing server 7. The ROM 702 stores a control program for controlling the CPU 701. The RAM 703 is used as a work area for the CPU 701. The HD 704 stores various data such as programs. The HDD 705 controls reading or writing of various data to or from the HD 704 under control of the CPU 701. The medium I/F 707 controls reading or writing of data with respect to a recording medium 706 such as a flash memory. The display 708 displays various information such as a cursor, menu, window, characters, or image. The network I/F 709 is an interface that controls communication of data with an external device through the communication network 100. The keyboard 711 is one example of input device provided with a plurality of keys for allowing a user to input characters, numerals, or various instructions. The mouse 712 is one example of input device for allowing the user to select a specific instruction or execution, select a target for processing, or move a curser being displayed. The CD-RW drive 714 reads or writes various data with respect to a Compact Disc ReWritable (CD-RW) 713, which is one example of removable recording medium.

The image processing server 7 further includes the bus line 710. The bus line 710 is an address bus or a data bus, which electrically connects the elements in FIG. 38 such as the CPU 701.

<Functional Configuration of Image Capturing System>

Figure 39:
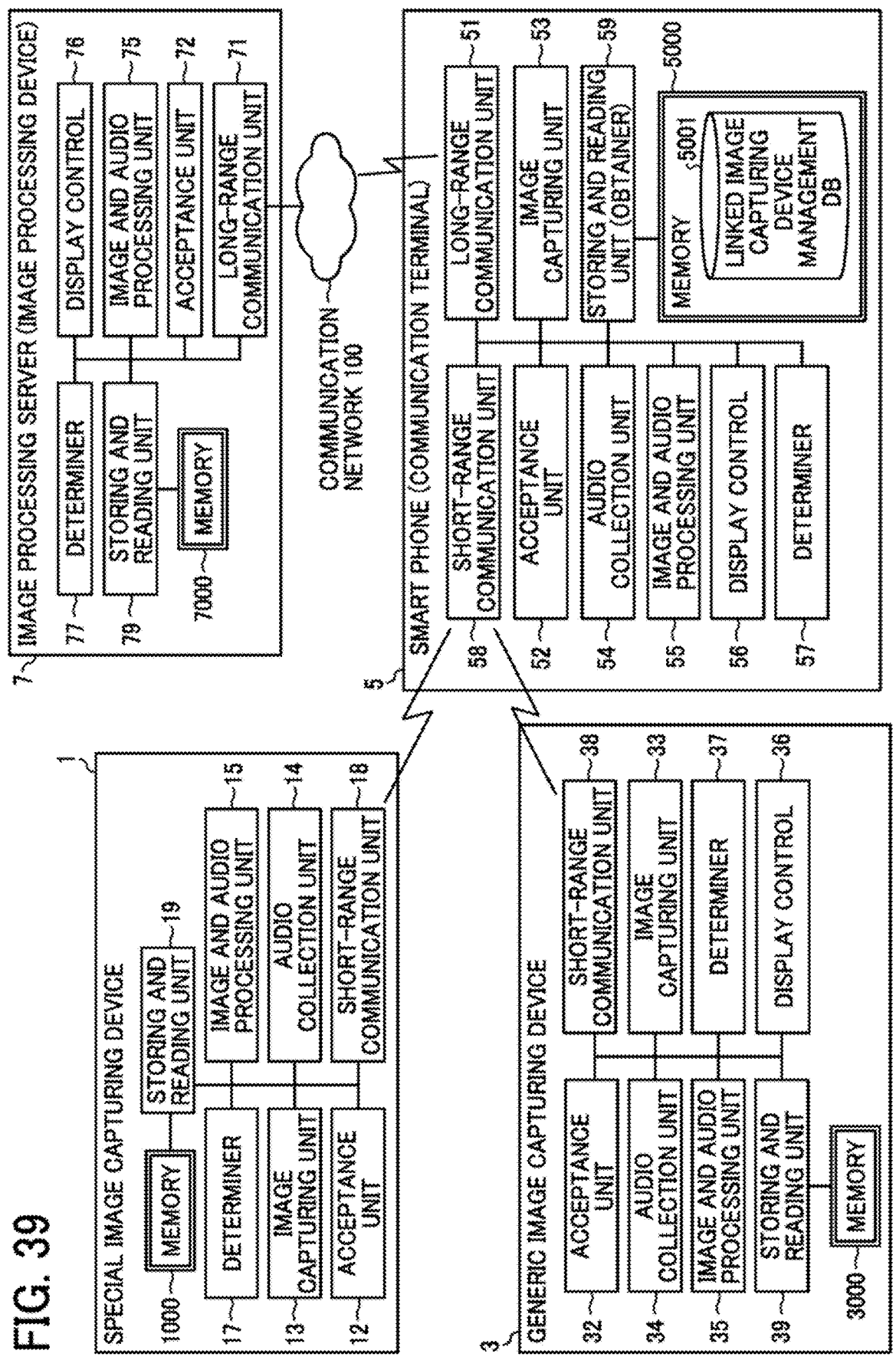
FIG. 39 is a schematic block diagram illustrating a functional configuration of the image capturing system of FIG. 37 according to the second embodiment.
Figure 40:
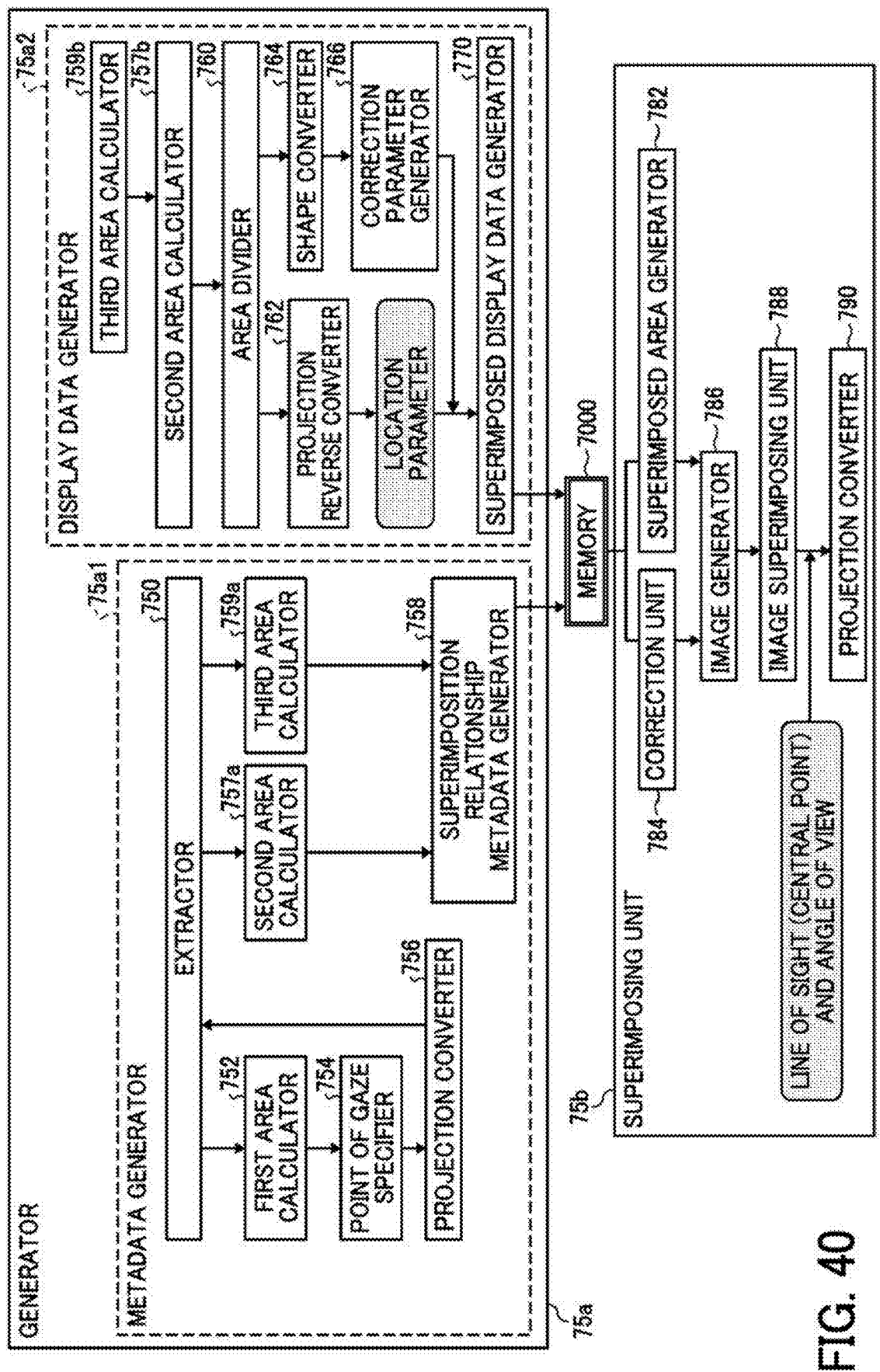
FIG. 40 is a block diagram illustrating a functional configuration of an image and audio processing unit according to the second embodiment.

Referring now to FIGS. 39 and 40, a functional configuration of the image capturing system of FIG. 37 is described according to the second embodiment. FIG. 39 is a schematic block diagram illustrating a functional configuration of the image capturing system of FIG. 37 according to the second embodiment. Since the special image capturing device 1, the generic image capturing device 3, and the smart phone 5 are substantially same in functional configuration, as described in the first embodiment, description thereof is omitted. In this embodiment, however, the image and audio processing unit 55 of the smart phone 5 does not have to be provided with all of the functional units illustrated in FIG. 16.

<Functional Configuration of Image Processing Server>

As illustrated in FIG. 39, the image processing server 7 includes a long-range communication unit 71, an acceptance unit 72, an image and audio processing unit 75, a display control 76, a determiner 77, and a storing and reading unit 79. These units are functions that are implemented by or that are caused to function by operating any of the elements illustrated in FIG. 38 in cooperation with the instructions of the CPU 701 according to the control program expanded from the HD 704 to the RAM 703.

The image processing server 7 further includes a memory 7000, which is implemented by the ROM 702, the RAM 703 and the HD 704 illustrated in FIG. 38.

The long-range communication unit 71 of the image processing server 7 is implemented by the network I/F 709 that operates under control of the CPU 701, illustrated in FIG. 38, to transmit or receive various data or information to or from other device (for example, other smart phone or server) through the communication network such as the Internet.

The acceptance unit 72 is implement by the keyboard 711 or mouse 712, which operates under control of the CPU 701, to receive various selections or inputs from the user.

The image and audio processing unit 75 is implemented by the instructions of the CPU 701. The image and audio processing unit 75 applies various types of processing to various types of data, transmitted from the smart phone 5.

The display control 76, which is implemented by the instructions of the CPU 701, generates data of the predetermined-area image Q, as a part of the planar image P, for display on the display 517 of the smart phone 5. The display control 76 superimposes the planar image P, on the spherical image CE, using superimposed display data, generated by the image and audio processing unit 75. With the superimposed display data, each grid area LAA of the planar image PA is placed at a location indicated by a location parameter, and is adjusted to have a brightness value and a color value indicated by a correction parameter.

The determiner 77 is implemented by the instructions of the CPU 701, illustrated in FIG. 38, to perform various determinations.

The storing and reading unit 79, which is implemented by instructions of the CPU 701 illustrated in FIG. 38, stores various data or information in the memory 7000 and read out various data or information from the memory 7000. For example, the superimposed display data may be stored in the memory 7000. In this embodiment, the storing and reading unit 79 functions as an obtainer that obtains various data from the memory 7000.

(Functional Configuration of Image and Audio Processing Unit)

Referring to FIG. 40, a functional configuration of the image and audio processing unit 75 is described according to the embodiment. FIG. 40 is a block diagram illustrating the functional configuration of the image and audio processing unit 75 according to the embodiment.

Figure 41:
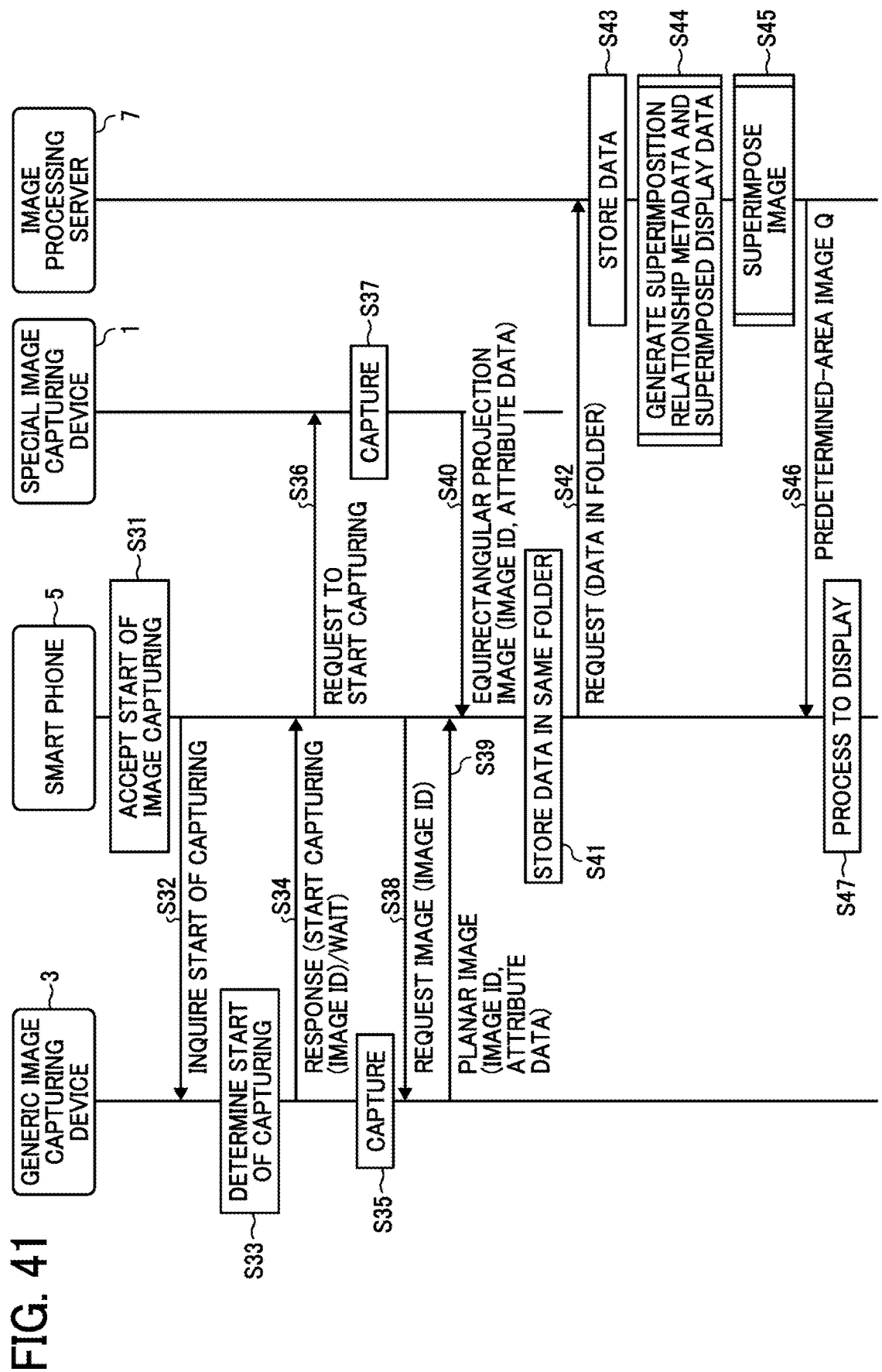
FIG. 41 is a data sequence diagram illustrating operation of capturing the image, performed by the image capturing system, according to the second embodiment.

The image and audio processing unit 75 mainly includes a generator 75a that performs encoding, and a superimposing unit 75b that performs decoding. The generator 75a performs processing of S44, which is processing to generate superimposition relationship metadata, as illustrated in FIG. 41. The superimposing unit 75b performs processing of S45, which is processing to superimpose the images using the superimposition relationship metadata, as illustrated in FIG. 41.

(Functional Configuration of Metadata Generator)

First, a functional configuration of the generator 75a is described according to the embodiment. The generator 75a mainly includes a metadata generator 75a1 and a display data generator 75a2. The metadata generator 75a1 includes an extractor 750, a first area calculator 752, a point of gaze specifier 754, a projection converter 756, a second area calculator 757a, a third area calculator 759a, and a superimposition relationship metadata generator 758. These elements of the metadata generator 75a1 are substantially similar in function to the extractor 550, first area calculator 552, point of gaze specifier 554, projection converter 556, second area calculator 557a, third area calculator 559a, and superimposition relationship metadata generator 558 of the metadata generator 55a1 of the first embodiment. Accordingly, the description thereof is omitted.

The display data generator 75a2 includes a second area calculator 757b, an area divider 760, a projection reverse converter 762, a shape converter 764, a correction parameter generator 766, and a superimposed display data generator 770. These elements of the display data generator 75a2 are substantially similar in function to the second area calculator 557b, third area calculator 559b, area divider 560, projection reverse converter 562, shape converter 564, correction parameter generator 566, and superimposed display data generator 570 of the display data generator 55a2 of the first embodiment, respectively. Accordingly, the description thereof is omitted.

Referring to FIG. 34, a functional configuration of the superimposing unit 75b is described according to the embodiment. The superimposing unit 75b includes a superimposed area generator 782, a correction unit 784, an image generator 786, an image superimposing unit 788, and a projection converter 790. These elements of the superimposing unit 75b are substantially similar in function to the superimposed area generator 582, correction unit 584, image generator 586, image superimposing unit 588, and projection converter 590 of the superimposing unit 55b, respectively. Accordingly, the description thereof is omitted.

<Operation>

Referring to FIG. 41, operation of capturing the image, performed by the image capturing system of FIG. 37, is described according to the second embodiment. Referring to FIG. 41, operation of capturing the image, performed by the image capturing system of FIG. 37, is described according to the second embodiment. FIG. 41 is a data sequence diagram illustrating operation of capturing the image, according to the second embodiment. S31 to S41 are performed in a substantially similar manner as described above referring to S11 to S21 according to the first embodiment, and description thereof is omitted.

At the smart phone 5, the long-range communication unit 51 transmits a superimposing request, which requests for superimposing one image on other image, to the image processing server 7, through the communication network 100 (S42). The superimposing request includes image data to be processed, which has been stored in the memory 5000. In this example, the image data to be processed includes planar image data (for example, the planar images A and B), and equirectangular projection image data, which are stored in the same folder. The long-range communication unit 71 of the image processing server 7 receives the image data to be processed.

Next, at the image processing server 7, the storing and reading unit 79 stores the image data to be processed (planar image data and equirectangular projection image data), which is received at S42, in the memory 7000 (S43). The generator 75a illustrated in FIG. 40 generates superimposition relationship metadata and superimposed display data (S44). Further, the superimposing unit 75b superimposes images using the superimposition relationship metadata and the superimposed display data (S45). More specifically, the superimposing unit 75b superimposes the planar images on the equirectangular projection image. S44 and S45 are performed in a substantially similar manner as described above referring to S22 and S23 of FIG. 19, and description thereof is omitted.

Next, the display control 76 generates data of the predetermined-area image Q, which corresponds to the predetermined area T, to be displayed in a display area of the display 517 of the smart phone 5. As described above in this example, the predetermined-area image Q is displayed so as to cover the entire display area of the display 517. In this example, the predetermined-area image Q includes the superimposed image S superimposed with the planar image P (such as planar images PA and PB). The long-range communication unit 71 transmits data of the predetermined-area image Q, which is generated by the display control 76, to the smart phone 5 (S46). The long-range communication unit 51 of the smart phone 5 receives the data of the predetermined-area image Q.

The display control 56 of the smart phone 5 controls the display 517 to display the predetermined-area image Q including the superimposed image S (S47).

Accordingly, the image capturing system of this embodiment can achieve the advantages described above referring to the first embodiment.

Further, in this embodiment, the smart phone 5 performs image capturing, and the image processing server 7 performs image processing such as generation of superimposed display data and generation of superimposed images. This results in decrease in processing load on the smart phone 5. Accordingly, high image processing capability is not required for the smart phone 5.

Any one of the above-described embodiments may be implemented in various other ways. For example, as illustrated in FIG. 14, the equirectangular projection image data, planar image data, superimposition relationship metadata, and superimposed display data, may not be stored in a memory of the smart phone 5. For example, any of the equirectangular projection image data, planar image data, superimposition relationship metadata, and superimposed display data may be stored in any server on the network.

In any of the above-described embodiments, the planar image P is superimposed on the spherical image CE. Alternatively, the planar image P to be superimposed may be replaced by a part of the spherical image CE. In another example, after deleting a part of the spherical image CE, the planar image P may be embedded in that part having no image.

Furthermore, in the second embodiment, the image processing server 7 performs superimposition of images (S45). For example, the image processing server 7 may transmit the superimposition relationship metadata to the smart phone 5, to instruct the smart phone 5 to perform superimposition of images and display the superimposed images. In such case, at the image processing server 7, the generator 75a illustrated in FIG. 40 generates the superimposition relationship metadata. At the smart phone 5, the superimposing unit 75b illustrated in FIG. 40 superimposes one image on other image, in a substantially similar manner in the case of the superimposing unit 55b in FIG. 16. The display control 56 illustrated in FIG. 14 processes display of the superimposed images.

Further, in some of the above-described embodiments, the location parameter (that is, the superimposed display data illustrated in FIG. 19) is calculated and stored in the memory, when the superimposition relationship metadata (that is, the superimposition relationship metadata illustrated in FIGS. 17 and 18) is stored. Alternatively, only the superimposition relationship metadata may be stored, for example, in association with each image to be processed at the time of encoding. When displaying images, a location of the image at the root (that is, the second image to be superimposed on the first image) is calculated using information from the superimposition relationship metadata, to generate a first location parameter (first information). Once the first location parameter is calculated, the first location parameter may be stored in a memory, in the form of superimposed display data for the first image. Similarly, a second location parameter can be calculated for the third image, which is to be superimposed on the second image, using the superimposition relationship metadata. Accordingly, the display data generator 55a2 or 75a2 may be provided in the superimposing unit 55*b* or 75*b*. Further, in operation, generation of superimposed display data may be performed at S45.

As described above referring to FIG. 30, for example, the first image, which is the background image, may be changed, while the second image and the third image remain the same. In such case, at least the superimposition relationship metadata for the third image does not have to be re-calculated again. Storing the superimposition relationship metadata, separately from the superimposed display data, for each image can thus reduce computational load.

In this disclosure, examples of superimposition of images include, but not limited to, placement of one image on top of other image entirely or partly, laying one image over other image entirely or partly, mapping one image on other image entirely or partly, pasting one image on other image entirely or partly, combining one image with other image, and integrating one image with other image. That is, as long as the user can perceive a plurality of images (such as the spherical image and the planar image) being displayed on a display as they were one image, processing to be performed on those images for display is not limited to the above-described examples.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The present invention can be implemented in any convenient form, for example using dedicated hardware, or a mixture of dedicated hardware and software. The present invention may be implemented as computer software implemented by one or more networked processing apparatuses. The processing apparatuses can compromise any suitably programmed apparatuses such as a general-purpose computer, personal digital assistant, mobile telephone (such as a WAP or 3G-compliant phone) and so on, depending on the functional structure. Since the present invention can be implemented as software, each and every aspect of the present invention thus encompasses computer software implementable on a programmable device. The computer software can be provided to the programmable device using any recording medium. Examples of such recording medium include, but not limited to, a memory on a server such as a ROM or RAM, and a removable memory such as a USB memory, an optical disc, or a magnetic disk. Such recording medium storing any of the above-described programs may be distributed domestically or overseas as a program product.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus comprising processing circuitry configured to:
   obtain a first image in first projection, a second image in second projection, and a third image in the second projection that is the same as the projection of the second image;
   calculate a first corresponding area in the first image, which corresponds to the second image, through first homography transformation, based on similarity between a plurality of feature points in the first image, and a plurality of features points in the second image;
   transform a projection of a peripheral area including the first corresponding area from the first projection to the second projection, to generate a peripheral area image;
   calculate a second corresponding area in the peripheral area image, which corresponds to the second image, through second homography transformation, based on similarity between a plurality of feature points in the second image, and a plurality of feature points in the peripheral area image;
   calculate a third corresponding area in the second image, which corresponds to the third image, through third homography transformation, based on similarity between a plurality of feature points in the second image, and a plurality of feature points in the third image;
   reversely transform a projection of the second corresponding area, from the second projection to the first projection, to generate first location information based on a first specific corresponding area in the first image, which corresponds to the second corresponding area;
   calculate a fourth corresponding area in the peripheral area image, which corresponds to the third image, through the second homography transformation; and
   reversely transform a projection of the fourth corresponding area, from the second projection to the first projection, to generate second location information based on a second specific corresponding area in the first image, which corresponds to the fourth corresponding area.

2. The information processing apparatus of claim 1, wherein the processing circuitry is configured to display the first image, the second image, and the third image,
   the second image being superimposed on the first image according to the first location information,
   the third image being superimposed on the second image according to the second location information.

3. The information processing apparatus of claim 1, wherein the processing circuitry is configured to:
   store, in a memory, information on the second corresponding area as superimposed relationship metadata for the second image, and information on the third corresponding area as superimposed relationship metadata for the third image,
   calculate the first location information using the superimposed relationship metadata for the second image, and the second location information using the superimposed relationship metadata for the third image, when displaying the first image with the second image and the third image.

4. The information processing apparatus of claim 3, wherein, when the processing circuitry is configured to:
   obtain another first image different from the first image from which the second corresponding area and the third corresponding area are each generated, as an image to be superimposed with the second image and the third image; and
   use the superimposition relationship metadata stored in the memory, to calculate another second location information of the third image.

5. The information processing apparatus of claim 1, wherein the processing circuitry is further configured to:

generate at least one of first correction information and second correction information, the first correction information being used to correct at least one of brightness and color of each one of a plurality of points in the second image, and the second correction information being used to correct at least one of brightness and color of each one of a plurality of points in the third image.

6. The information processing apparatus of claim 5, wherein the plurality of points in the second image is a plurality of grids that are obtained by dividing the second image into a plurality of grid areas, and the plurality of points in the third image is a plurality of grids that are obtained by dividing the third image into a plurality of grid areas.

7. The information processing apparatus of claim 6, wherein the processing circuitry is further configured to:

in generating the first correction information, convert a shape of the second corresponding area so at to match a shape of the second image, the first correction information being obtained so as to compensate differences between the plurality of points in the second image, and a plurality of points in the second corresponding area that has been converted, and in generating the second correction information, convert a shape of the fourth corresponding area so as to match a shape of the third image, the second correction information being obtained so as to compensate differences between the plurality of points in the third image, and a plurality of points in the fourth corresponding area.

8. The information processing apparatus of claim 1, wherein the first image is an equirectangular projection image, and the second image and the third image are each a planar image.

9. The information processing apparatus of claim 1, wherein the first image is a background image, and the second image and the third image are each a foreground image to be superimposed on or above the background image.

10. The image processing apparatus of claim 1, wherein the image processing apparatus includes at least one of a smart phone, tablet personal computer, notebook computer, desktop computer, and server computer.

11. An image capturing system comprising:
the image processing apparatus of claim 1;
a first image capturing device configured to capture surroundings of a target object to obtain the first image in the first projection and transmit the first image in the first projection to the image processing apparatus; and
a second image capturing device configured to capture the target object to obtain the second image in the second projection and transmit the second image in the second projection to the image processing apparatus.

12. The image capturing system of claim 11, wherein the first image capturing device is a camera configured to capture the target object to generate the spherical image as the first image.

13. An information processing system comprising processing circuitry configured to:
obtain a first image in first projection, a second image in second projection, and a third image in the second projection that is the same as the projection of the second image;

calculate a first corresponding area in the first image, which corresponds to the second image, through first homography transformation, based on similarity between a plurality of feature points in the first image, and a plurality of features points in the second image;

transform a projection of a peripheral area including the first corresponding area from the first projection to the second projection, to generate a peripheral area image;

calculate a second corresponding area in the peripheral area image, which corresponds to the second image, through second homography transformation, based on similarity between a plurality of feature points in the second image, and a plurality of feature points in the peripheral area image;

calculate a third corresponding area in the second image, which corresponds to the third image, through third homography transformation, based on similarity between a plurality of feature points in the second image, and a plurality of feature points in the third image;

reversely transform a projection of the second corresponding area, from the second projection to the first projection, to generate first location information based on a first specific corresponding area in the first image, which corresponds to the second corresponding area;

calculate a fourth corresponding area in the peripheral area image, which corresponds to the third image, through the second homography transformation; and reversely transform a projection of the fourth corresponding area, from the second projection to the first projection, to generate second location information based on a second specific corresponding area in the first image, which corresponds to the fourth corresponding area.

14. An information processing method, comprising:
obtaining a first image in first projection, a second image in second projection, and a third image in the second projection that is the same as the projection of the second image;

calculating a first corresponding area in the first image, which corresponds to the second image, through first homography transformation, based on similarity between a plurality of feature points in the first image, and a plurality of features points in the second image;

transforming a projection of a peripheral area including the first corresponding area from the first projection to the second projection, to generate a peripheral area image;

calculating a second corresponding area in the peripheral area image, which corresponds to the second image, through second homography transformation, based on similarity between a plurality of feature points in the second image, and a plurality of feature points in the peripheral area image;

calculating a third corresponding area in the second image, which corresponds to the third image, through third homography transformation, based on similarity between a plurality of feature points in the second image, and a plurality of feature points in the third image;

reversely transforming a projection of the second corresponding area, from the second projection to the first projection, to generate first location information based on a first specific corresponding area in the first image, which corresponds to the second corresponding area;

calculating a fourth corresponding area in the peripheral area image, which corresponds to the third image, through the second homography transformation; and reversely transforming a projection of the fourth corresponding area, from the second projection to the first projection, to generate second location information based on a second specific corresponding area in the first image, which corresponds to the fourth corresponding area.

* * * * *